US012572719B2

(12) United States Patent
Liu et al.

(10) Patent No.: US 12,572,719 B2
(45) Date of Patent: Mar. 10, 2026

(54) INTEGRATED PROCESS-STRUCTURE-PROPERTY MODELING FRAMEWORKS AND METHODS FOR DESIGN OPTIMIZATION AND/OR PERFORMANCE PREDICTION OF MATERIAL SYSTEMS AND APPLICATIONS OF SAME

(71) Applicant: NORTHWESTERN UNIVERSITY, Evanston, IL (US)

(72) Inventors: Wing Kam Liu, Oak Brook, IL (US); Jiaying Gao, Evanston, IL (US); Cheng Yu, Evanston, IL (US); Orion L. Kafka, Enosburg, VT (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 233 days.

(21) Appl. No.: 18/222,576

(22) Filed: Jul. 17, 2023

(65) Prior Publication Data

US 2023/0394196 A1 Dec. 7, 2023

Related U.S. Application Data

(62) Division of application No. 16/571,611, filed on Sep. 16, 2019, now Pat. No. 11,783,100.

(Continued)

(51) Int. Cl.
*G06F 30/23* (2020.01)
*B33Y 50/00* (2015.01)
(Continued)

(52) U.S. Cl.
CPC .............. *G06F 30/23* (2020.01); *G06F 30/20* (2020.01); *G06F 30/27* (2020.01); *G06T 17/20* (2013.01); *B33Y 50/00* (2014.12); *G06F*

*2111/10* (2020.01); *G06F 2113/10* (2020.01); *G06F 2119/08* (2020.01)

(58) Field of Classification Search
CPC ........ G06F 30/23; G06F 30/25; G06F 30/367; G06F 30/398; G06F 30/20; G06F 30/27; G06F 30/28; G06F 2111/10; G06F 2113/10; G06F 2119/08; G06T 17/20; B33Y 50/00
See application file for complete search history.

(56) References Cited

PUBLICATIONS

Panwisawas, Chinnapat, et al. "Mesoscale modelling of selective laser melting: Thermal fluid dynamics and microstructural evolution." Computational Materials Science 126 (2017): 479-490. (Year: 2017).*

(Continued)

*Primary Examiner* — Michael Edward Cocchi
(74) *Attorney, Agent, or Firm* — troutman pepper locke; Tim Tingkang Xia, Esq.

(57) ABSTRACT

An integrated process-structure-property modeling framework for design optimization and/or performance prediction of a material system includes a powder spreading model using a discrete element method (DEM) to generate a powder bed; a thermal-fluid flow model of the powder melting process to predict voids and temperature profile; a cellular automaton (CA) model to simulate grain growth based on the temperature profile; and a reduced-order micromechanics model to predict mechanical properties and fatigue resistance of resultant structures by resolving the voids and grains.

10 Claims, 40 Drawing Sheets
(39 of 40 Drawing Sheet(s) Filed in Color)

Related U.S. Application Data

(60) Provisional application No. 62/731,381, filed on Sep. 14, 2018.

(51) Int. Cl.
   *G06F 30/20*      (2020.01)
   *G06F 30/27*      (2020.01)
   *G06F 111/10*     (2020.01)
   *G06F 113/10*     (2020.01)
   *G06F 119/08*     (2020.01)
   *G06T 17/20*      (2006.01)

(56)              References Cited

PUBLICATIONS

Rai, Abha, Matthias Markl, and Carolin Korner. "A coupled Cellular Automaton-Lattice Boltzmann model for grain structure simulation during additive manufacturing." Computational Materials Science 124 (2016): 37-48. (Year: 2016).*
Yan, Wentao, et al. "Modeling process-structure-property relationships for additive manufacturing." Frontiers of Mechanical Engineering 13.4 (2018): 482-492. (Year: 2017).*
Zhang, Jingwei, et al. "A coupled finite element cellular automaton model to predict thermal history and grain morphology of Ti—6Al—4V during direct metal deposition (DMD)." Additive Manufacturing 11 (2016): 32-39. (Year: 2016).*

* cited by examiner

| x | y | z | T(t=0) | T(t=dt) | ... | T(t=tend) | phase | orientation1 | ... | stress1 | ... |
|---|---|---|--------|---------|-----|-----------|-------|--------------|-----|---------|-----|
| 1 | 1 | 1 | | | | | | | | | |
| 1 | 1 | 2 | | | | | | | | | |
| ... | ... | ... | ... | ... | | ... | ... | ... | ... | ... | ... |
| 1 | m | n | | | | | | | | | |

$a = 25\text{mm}$
$r_c = 2.5\text{mm}$
$r_1 = 5\text{mm}$
$r_2 = 5.625\text{mm}$ Microscale SCA model $k_1 = 64$          $k_1 = 16$          $k_1 = 4$ (a) Hard inclusions with energy regularization.

$k_1 = 64$          $k_1 = 16$          $k_1 = 4$ (b) Soft inclusions with energy regularization.

FIG. 57

INTEGRATED PROCESS-STRUCTURE-PROPERTY MODELING FRAMEWORKS AND METHODS FOR DESIGN OPTIMIZATION AND/OR PERFORMANCE PREDICTION OF MATERIAL SYSTEMS AND APPLICATIONS OF SAME

CROSS-REFERENCE TO RELATED PATENT APPLICATIONS

This invention is a divisional application of U.S. patent application Ser. No. 16/571,611, filed Sep. 16, 2019, now allowed, which itself claims priority to and the benefit of of U.S. provisional patent application Ser. No. 62/731,381, filed Sep. 14, 2018, entitled "MULTISCALE MODELING PLATFORM AND APPLICATIONS OF SAME", by Wing Kam Liu, Jiaying Gao, Cheng Yu and Orion L. Kafka, which are incorporated herein by reference in their entireties.

FIELD OF THE INVENTION

The invention relates generally to materials, and more particularly, to integrated process-structure-property modeling frameworks and methods for design optimization and/or performance prediction of material systems and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Metal-based AM is widely considered a promising technology, with many potential applications due to the flexibility of the process. This flexibility is achieved in part because the process is highly localized; however, these processes lack reproducibility and reliability: the quality of the parts produced are sensitive to build conditions. To overcome the challenges this poses in the production of functional, load-bearing or otherwise practically useful components, significant effort has been expended. Computational modeling is an appealing approach to understand the complex relationships between the processing conditions and part quality. Recent researches have called for the integration of process-structure and structure-property-performance tools for predictive computational modeling to further enable AM. By providing predictive models that mimic the stages of production and use of a part, these tools could allow for higher confidence in AM parts and an integration of part and process design to maximize the potential of AM.

In addition, multiscale simulation methods present significant advantages for computational mechanics due to their ability to analyze macroscopic structural performance while considering the effects of microscopic heterogeneities. While great strides have been made, some core challenges still face multiscale methods, including accurate methods for homogenizing the microstructural representative volume element (RVE) undergoing strain localization, computation of strain localization with variable-sized microstructural features, and the ability to conduct efficient concurrent simulations.

Therefore, a heretofore unaddressed need exists in the art to address the aforementioned deficiencies and inadequacies.

SUMMARY OF THE INVENTION

In one aspect, the invention relates to an integrated process-structure-property modeling framework for design optimization and/or performance prediction of a material system. In one embodiment, the framework includes a database; and a plurality of models coupled with the database, comprising process models and mechanical response models, each model being coupled to the next by passing output information to a subsequent input processor. The process models comprise a powder spreading model, a powder melting model and a grain growth model. The mechanical response models comprise a self-consistent clustering analysis (SCA) model, a finite element method (FEM) model and/or a fatigue prediction model.

The powder spreading model and the powder melting model operably exchange geometry information of a powder bed using a stereolithography (STL)-format surface mesh representation. In one embodiment, the powder spreading model is a discrete element method (DEM) powder spreading model.

The powder melting model operably predicts a temperature profile in each volume of interest (VOI) with a powder melting simulation. The temperature profile is written to the database in a flat file format, and a void space is set to an ambient temperature to distinguish said void space from a dense material. In one embodiment, the powder melting model is a computational fluid dynamics (CFD) powder melting model.

The grain growth model operably accesses the temperature profile and void information from the database, and predicts grain information based on the temperature profile and void information. The grain information is written to the database along with the voids. The dense material and the voids are identified based on the temperature profile, and the voids and free surfaces are thereby included in the grain growth model. In one embodiment, the grain growth model is a cellular automaton (CA) grain growth model. In one embodiment, the grain information comprises phase and orientation.

The SCA and/or FEM models are used, based on the grain and void information provided at each point via the database, to predict stress-strain responses. The stress-strain responses are written to the database. In one embodiment, the SCA model is an SCA crystal plasticity model.

The fatigue prediction model operably accesses the stress-strain responses at each point via the database, and computes a non-local potency estimate based on the stress-strain responses. The fatigue life of the highest potency location is computed to provide a scalar material response metric.

In one embodiment, in operation, the powder spreading model generates a particle packing configuration within one powder layer with a particle spreading simulation, outputs the particle packing configuration as a first STL file, and feeds the particle packing configuration into the powder melting model, thereby reproducing powder spreading and melting; and the powder melting model predicts a solidified shape with the powder melting simulation, outputs the solidified shape as a second STL file, and feeds the solidified shape into the powder spreading model to apply a new powder layer, thereby reproducing powder spreading.

In one embodiment, the manufacturing process of multiple layers and tracks comprises repeating said two simulations and the data exchange between the powder spreading model and the powder melting model.

In one embodiment, for the mechanical response models, a sub-domain of particular interest of the full VOI for grain growth is selected as an input, the grain and void information provided at each point via the database is assigned as the center point of each voxel in a regular, uniform, cuboid mesh, and said mesh is used for the mechanical response models.

In one embodiment, in operation, the powder melting model feeds the temperature profiles and void information to the grain growth model via the database, and the grain growth model feeds the grain and void information to the SCA model via the database.

In one embodiment, a material region is discretized by a set of cubic cells, and the temperature history of each cell is determined from a thermal-CFD simulation using a linear interpolation.

In another aspect, the invention relates to a method of integrated process-structure-property modeling for design optimization and/or performance prediction of a material system. In one embodiment, the method includes exchanging geometry information of a powder bed between a powder spreading model and a powder melting model using an STL-format surface mesh representation; predicting a temperature profile in each VOI by the powder melting model with a powder melting simulation; writing the temperature profile to the database in a flat file format; and setting a void space to an ambient temperature to distinguish said void space from a dense material; accessing the temperature profile and void information from the database and predicting grain information by a grain growth model based on the temperature profile and void information; writing the grain information to the database along with the voids; identifying the dense material and the voids on the temperature profile, thereby including the voids and free surfaces in the grain growth model; predicting stress-strain responses by the SCA and/or FEM models based on the grain and void information provided at each point via the database; and writing the stress-strain responses to the database; and accessing the stress-strain responses at each point via the database and computing a non-local potency estimate by a fatigue prediction model based on the stress-strain responses, wherein the fatigue life of the highest potency location is computed to provide a scalar material response metric.

In one embodiment, said exchanging the geometry information comprises, by the powder spreading model, generating a particle packing configuration within one powder layer with a particle spreading simulation, outputting the particle packing configuration as a first STL file, and feeding the particle packing configuration into the powder melting model, thereby reproducing powder spreading and melting; and, by the powder melting model, predicting a solidified shape with a powder melting simulation, outputting the solidified shape as a second STL file, and feeding the solidified shape into the powder spreading model to apply a new powder layer, thereby reproducing powder spreading.

In one embodiment, said exchanging the geometry information further comprises repeating said two simulations and the data exchange between the powder spreading model and the powder melting model, for forming multiple layers and tracks.

In one embodiment, the particle packing configuration is generated using the DEM.

In one embodiment, the powder melting model is a CFD powder melting model.

In one embodiment, the grain growth model is a CA grain growth model.

In one embodiment, the SCA model is an SCA crystal plasticity model.

In yet another aspect, the invention relates to a non-transitory tangible computer-readable medium storing instructions which, when executed by one or more processors, cause a system to perform the above methods of integrated process-structure-property modeling for design optimization and/or performance prediction of a material system.

In a further aspect, the invention relates to a computational system for design optimization and/or performance prediction of a material system, which includes one or more computing devices comprising one or more processors; and a non-transitory tangible computer-readable medium storing instructions which, when executed by the one or more processors, cause the one or more computing devices to perform the above methods of integrated process-structure-property modeling for design optimization and/or performance prediction of a material system.

In one aspect, the invention relates to an integrated process-structure-property modeling framework for design optimization and/or performance prediction of a material system, comprising a powder spreading model using the DEM to generate a powder bed; a thermal-fluid flow model of the powder melting process to predict voids and temperature profile; a CA model to simulate grain growth based on the temperature profile; and a reduced-order micromechanics model to predict mechanical properties and fatigue resistance of resultant structures by resolving the voids and grains.

In one embodiment, in the CA, a material region is discretized by a set of cubic cells, and the temperature history of each cell is determined from a thermal-CFD simulation using a linear interpolation.

In one embodiment, each model incorporates basic material information and data provided directly from previous models in the framework to predict the mechanical response and estimated fatigue life of critical microstructures given machine-relevant processing conditions.

In another aspect, the invention relates to method for implementation of multiresolution continuum theory (MCT). In one embodiment, the method includes decomposing deformation across different microstructural length scales, by an MCT model; wherein the macroscale deformation is described by conventional degrees of freedom and extra degrees of freedom are introduced to describe the deformation at a microscale; employing a modified homogenization-based Gurson (GTN) model at the macroscale to result in equations for a void volume fraction, an effective plastic strain rate, and a matrix flow stress, wherein an additive decomposition of a rate of deformation tensor into elastic and plastic parts allows for description of an objective rate of Cauchy stress; solving the resulting equations at each scale using an iterative Newton-Raphson scheme to update the void volume fraction, the effective plastic strain rate, and the matrix flow stress based on a new deformation tensor, wherein the homogenized void growth behavior is taken to represent the response of the primary population of voids, including those initiated at inclusions, as the material is deformed; and constructing a plastic potential using microstress and microstress couple at the microscale, wherein a deviatoric strain rate is defined in terms of a relative deformation between the microscale and the macroscale, and solving equations of the plastic potential to obtain stress-strain profiles.

In one embodiment, the material structure and the deformation field are resolved at each scale; the resulting internal power is a multi-field expression with contributions from the average deformation at each scale; and the deformation behavior at each scale is found by testing the micromechanical response.

In one embodiment, the MCT model is implemented with a user element subroutine including a FEA solver; user materials subroutines for micro and macro domains; an auxiliary function subroutine containing functions used by the user materials subroutines needed for the user element subroutine, wherein the auxiliary function subroutine is callable by the user material subroutines to finish the update of the stress and strain; a force subroutine for calculating the internal force by calling the user materials subroutines and the auxiliary function subroutine; a parameter subroutine providing input parameters for the user element subroutine; and a mass subroutine for computing a mass matrix for the user element subroutine, wherein the force subroutine, parameter subroutine and the mass subroutines are called by the user element subroutine for solving the equations at each scale.

In one embodiment, the auxiliary function subroutine comprises Gauss integration, computation of inertia and subroutines to calculate the strain and strain rate.

In one embodiment, the input parameters include number of micro scales, number of Gauss points and number of history variables.

In one embodiment, the method is applicable to prediction of formation and propagation of a shear band in a material system.

In one embodiment, the method is applicable to simulation of high speed metal cutting (HSMC) in a material system.

In another aspect, the invention relates to a non-transitory tangible computer-readable medium storing instructions which, when executed by one or more processors, cause a system to perform the above disclosed methods for implementation of the MCT.

In yet another aspect, the invention relates to a computational system for design optimization and/or performance prediction of a material system, comprising one or more computing devices comprising one or more processors; and a non-transitory tangible computer-readable medium storing instructions which, when executed by the one or more processors, cause the one or more computing devices to perform above disclosed methods for implementation of the MCT.

In a further aspect, the invention relates to a method of data-driven mechanistic modeling of a system for predicting high cycle fatigue (HCF) crack incubation life. In one embodiment, the method comprises generating a representation of the system with matrix, inclusion and void, wherein the representation comprises microstructure volume elements (MVE) that are of building blocks of the system; obtaining strain contours in the matrix from a linear elastic analysis over a predefined set of boundary conditions; generating clusters from a strain solution by assigning voxels with similar strain concentration tensor within the representation of the material system to one of the clusters with a unique ID, using k-means clustering; computing a plastic shear strain field of the material system by solving the Lippmann-Schwinger equation using the generated clusters with a crystal plasticity (CP) model; and predicting the fatigue crack incubation life of the system using a fatigue indicating parameter (FIP) based on the plastic shear strain field.

In one aspect, the invention relates to a non-transitory tangible computer-readable medium storing instructions which, when executed by one or more processors, cause a system to perform the above disclosed data-driven mechanistic modeling methods for predicting high cycle fatigue (HCF) crack incubation life.

In another aspect, the invention relates to computational system for design optimization and/or performance prediction of a material system, comprising one or more computing devices comprising one or more processors; and a non-transitory tangible computer-readable medium storing instructions which, when executed by the one or more processors, cause the one or more computing devices to perform the above disclosed data-driven mechanistic modeling methods for predicting high cycle fatigue (HCF) crack incubation life.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

The following drawings form part of the present specification and are included to further demonstrate certain aspects of the invention. The invention may be better understood by reference to one or more of these drawings in combination with the detailed description of specific embodiments presented herein. The drawings described below are for illustration purposes only. The drawings are not intended to limit the scope of the present teachings in any way.

FIG. 2 shows a schematic of the flat-file database used to store record data for the framework according to embodiments of the invention. The fields are abbreviated to more clearly show the structure of the database.

FIG. 3 shows a schematic of the Z-pattern electron beam scan strategy according to embodiments of the invention.

FIG. 57 shows the von Mises stress distributions and crack patterns of the 3D concurrent simulations at two loading states according to embodiments of the invention. The microscale stress and damage fields inside the RVE are shown in sequence at three different integration points marked in the macroscale model.

DETAILED DESCRIPTION OF THE INVENTION

Figure 1A:
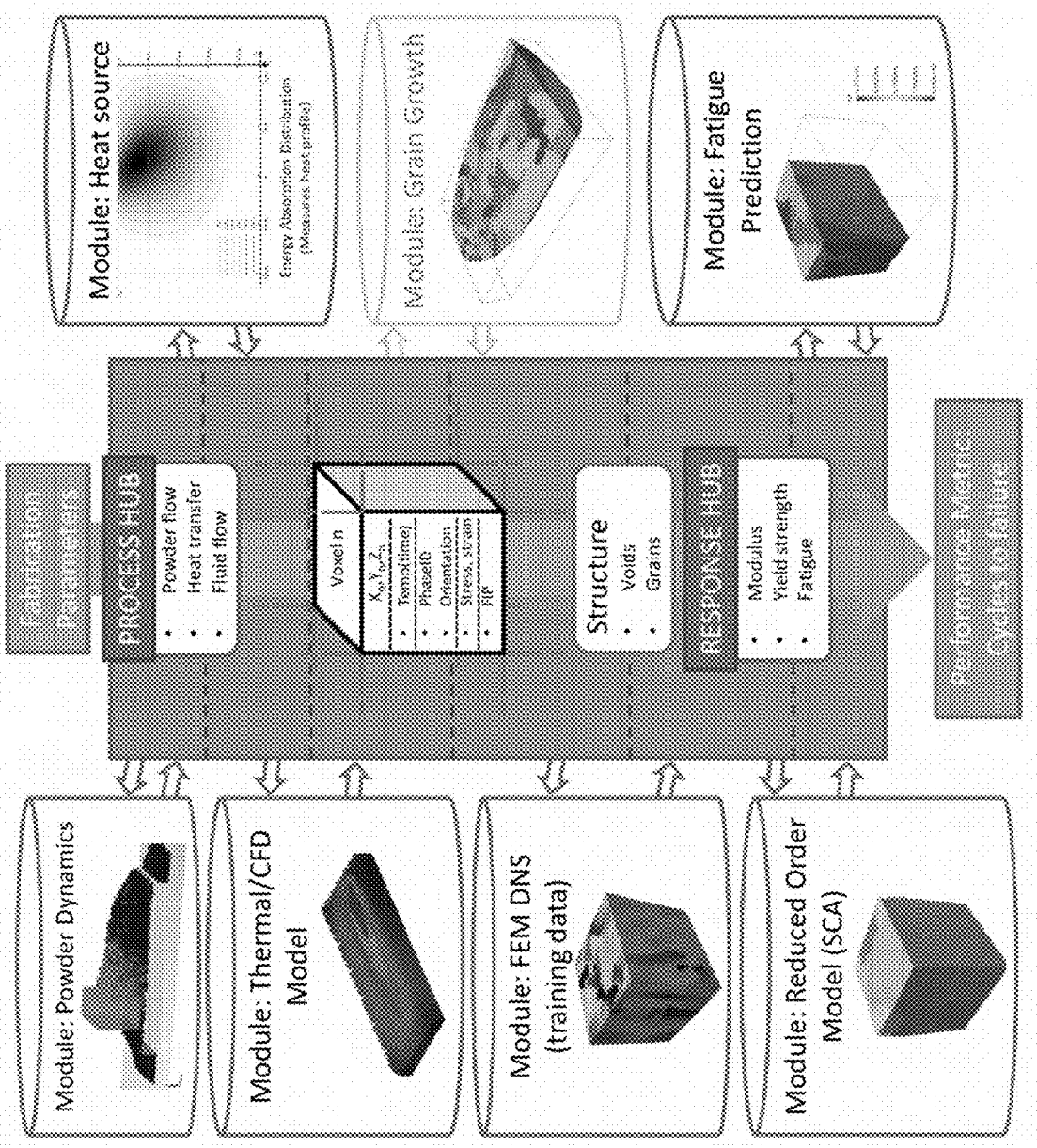
FIG. 1A shows a schematic diagram of the module-hub framework conceptual layout according to embodiments of the invention, with images of our current implementation demonstrating the modules: a SEBM process with microstructure-based fatigue life assessment. The data used by the framework at each point in space is described by spatial coordinates and any relevant field data for the current working modules, as shown graphically by a schematic of a representative voxel. The cellular automata model is shaded gray to indicate that results both with and without it are given, to demonstrate the flexibility of the framework.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that, as used in the description herein and throughout the claims that follow, the meaning of "a", "an", and "the" includes plural reference unless the context clearly dictates otherwise. Also, it will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

The methods and systems will be described in the following detailed description and illustrated in the accompanying drawings by various blocks, components, circuits, processes, algorithms, etc. (collectively referred as "members"). These members may be implemented using electronic hardware, computer software, or any combination thereof. Whether such elements are implemented as hardware or software depends upon the particular application and design constraints imposed on the overall system. By way of example, a member, or any portion of a member, or any combination of members may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory, an electrically erasable programmable read-only memory (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Figure 1B:
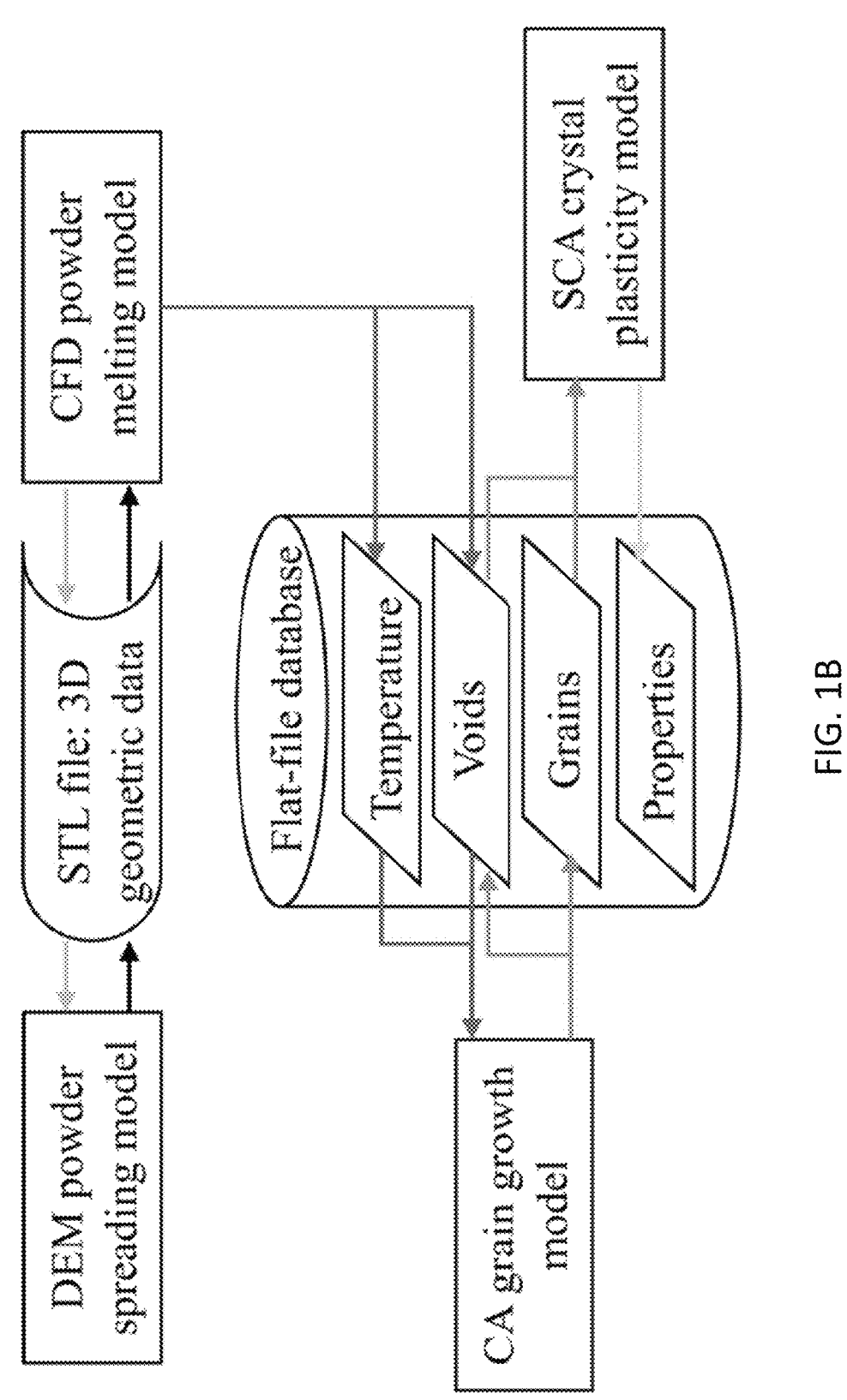
FIG. 1B shows a schematic diagram of data flow within the one-way coupled framework according to embodiments of the invention. Arrows with the same color show the data flow between models.

One aspect of the invention discloses an integrated process-structure-property modeling framework for design optimization and/or performance prediction of a material system. Referring to FIGS. 1A-1B, the one exemplary embodiment, the framework includes a database; and a plurality of models coupled with the database. The plurality of models includes process models and mechanical response models. Each model is coupled to the next by passing output information to a subsequent input processor. The process models comprise a powder spreading model, a powder melting model and a grain growth model. The mechanical response models comprise a self-consistent clustering analysis (SCA) model, a finite element method (FEM) model and/or a fatigue prediction model.

The powder spreading model and the powder melting model operably exchange geometry information of a powder bed using a stereolithography (STL)-format surface mesh representation. In one embodiment, the powder spreading model is a discrete element method (DEM) powder spreading model.

The powder melting model operably predicts a temperature profile in each volume of interest (VOI) with a powder melting simulation. The temperature profile is written to the database in a flat file format, and a void space is set to an ambient temperature to distinguish said void space from a dense material. In one embodiment, the powder melting model is a computational fluid dynamics (CFD) powder melting model.

The grain growth model operably accesses the temperature profile and void information from the database, and predicts grain information based on the temperature profile and void information. The grain information is written to the database along with the voids. The dense material and the voids are identified based on the temperature profile, and the voids and free surfaces are thereby included in the grain growth model. In one embodiment, the grain growth model is a cellular automaton (CA) grain growth model. In one embodiment, the grain information comprises phase and orientation.

The SCA and/or FEM models are used, based on the grain and void information provided at each point via the database, to predict stress-strain responses. The stress-strain responses are written to the database. In one embodiment, the SCA model is an SCA crystal plasticity model.

The fatigue prediction model operably accesses the stress-strain responses at each point via the database, and computes a non-local potency estimate based on the stress-strain responses. The fatigue life of the highest potency location is computed to provide a scalar material response metric.

In one embodiment, in operation, the powder spreading model generates a particle packing configuration within one powder layer with a particle spreading simulation, outputs the particle packing configuration as a first STL file, and feeds the particle packing configuration into the powder melting model, thereby reproducing powder spreading and melting; and the powder melting model predicts a solidified shape with the powder melting simulation, outputs the solidified shape as a second STL file, and feeds the solidified shape into the powder spreading model to apply a new powder layer, thereby reproducing powder spreading. In one embodiment, the manufacturing process of multiple layers and tracks comprises repeating said two simulations and the data exchange between the powder spreading model and the powder melting model.

In one embodiment, in operation, the powder melting model feeds the temperature profiles and void information to the grain growth model via the database, and the grain growth model feeds the grain and void information to the SCA model via the database.

In one embodiment, for the mechanical response models, a sub-domain of particular interest of the full VOI for grain growth is selected as an input, the grain and void information provided at each point via the database is assigned as the center point of each voxel in a regular, uniform, cuboid mesh, and said mesh is used for the mechanical response models.

In one embodiment, a material region is discretized by a set of cubic cells, and the temperature history of each cell is determined from a thermal-CFD simulation using a linear interpolation.

Another aspect of the invention discloses a method of integrated process-structure-property modeling for design optimization and/or performance prediction of a material system. In one embodiment, the method includes exchanging geometry information of a powder bed between a powder spreading model and a powder melting model using a STL-format surface mesh representation; predicting a temperature profile in each VOI by the powder melting model with a powder melting simulation; writing the temperature profile to the database in a flat file format; and setting a void space to an ambient temperature to distinguish said void space from a dense material; accessing the temperature profile and void information from the database and predicting grain information by a grain growth model based on the temperature profile and void information; writing the grain information to the database along with the voids; identifying the dense material and the voids on the temperature profile, thereby including the voids and free surfaces in the grain growth model; predicting stress-strain responses by the SCA and/or FEM models based on the grain and void information provided at each point via the database; and writing the stress-strain responses to the database; and accessing the stress-strain responses at each point via the database and computing a non-local potency estimate by a fatigue prediction model based on the stress-strain responses, wherein the fatigue life of the highest potency location is computed to provide a scalar material response metric.

In one embodiment, said exchanging the geometry information comprises, by the powder spreading model, generating a particle packing configuration within one powder layer with a particle spreading simulation, outputting the particle packing configuration as a first STL file, and feeding the particle packing configuration into the powder melting model, thereby reproducing powder spreading and melting; and, by the powder melting model, predicting a solidified shape with a powder melting simulation, outputting the solidified shape as a second STL file, and feeding the solidified shape into the powder spreading model to apply a new powder layer, thereby reproducing powder spreading.

In one embodiment, said exchanging the geometry information further comprises repeating said two simulations and the data exchange between the powder spreading model and the powder melting model, for forming multiple layers and tracks.

In one embodiment, the particle packing configuration is generated using a discrete element method (DEM).

In one embodiment, the powder melting model is a computational fluid dynamics (CFD) powder melting model.

In one embodiment, the grain growth model is a cellular automaton (CA) grain growth model.

In one embodiment, the SCA model is an SCA crystal plasticity model.

Yet another aspect of the invention discloses a non-transitory tangible computer-readable medium storing instructions which, when executed by one or more processors, cause a system to perform the above methods of integrated process-structure-property modeling for design optimization and/or performance prediction of a material system.

A further aspect of the invention discloses a computational system for design optimization and/or performance prediction of a material system, which includes one or more computing devices comprising one or more processors; and a non-transitory tangible computer-readable medium storing instructions which, when executed by the one or more processors, cause the one or more computing devices to perform the above methods of integrated process-structure-property modeling for design optimization and/or performance prediction of a material system.

In one aspect, the invention relates to an integrated process-structure-property modeling framework for design optimization and/or performance prediction of a material system, comprising a powder spreading model using the DEM to generate a powder bed; a thermal-fluid flow model of the powder melting process to predict voids and temperature profile; a CA model to simulate grain growth based on the temperature profile; and a reduced-order micromechanics model to predict mechanical properties and fatigue resistance of resultant structures by resolving the voids and grains.

In one embodiment, in the CA, a material region is discretized by a set of cubic cells, and the temperature history of each cell is determined from a thermal-CFD simulation using a linear interpolation.

In one embodiment, each model incorporates basic material information and data provided directly from previous models in the framework to predict the mechanical response and estimated fatigue life of critical microstructures given machine-relevant processing conditions.

In another aspect, the invention relates to method for implementation of multiresolution continuum theory (MCT). In one embodiment, the method includes decomposing deformation across different microstructural length scales, by an MCT model; wherein the macroscale deformation is described by conventional degrees of freedom and extra degrees of freedom are introduced to describe the deformation at a microscale; employing a modified homogenization-based Gurson (GTN) model at the macroscale to result in equations for a void volume fraction, an effective plastic strain rate, and a matrix flow stress, wherein an additive decomposition of a rate of deformation tensor into elastic and plastic parts allows for description of an objective rate of Cauchy stress; solving the resulting equations at each scale using an iterative Newton-Raphson scheme to update the void volume fraction, the effective plastic strain rate, and the matrix flow stress based on a new deformation tensor, wherein the homogenized void growth behavior is taken to represent the response of the primary population of voids, including those initiated at inclusions, as the material is deformed; and constructing a plastic potential using microstress and microstress couple at the microscale, wherein a deviatoric strain rate is defined in terms of a relative deformation between the microscale and the macroscale, and solving equations of the plastic potential to obtain stress-strain profiles.

In one embodiment, the material structure and the deformation field are resolved at each scale; the resulting internal power is a multi-field expression with contributions from the average deformation at each scale; and the deformation behavior at each scale is found by testing the micromechanical response.

Figures 13, 14, 15:
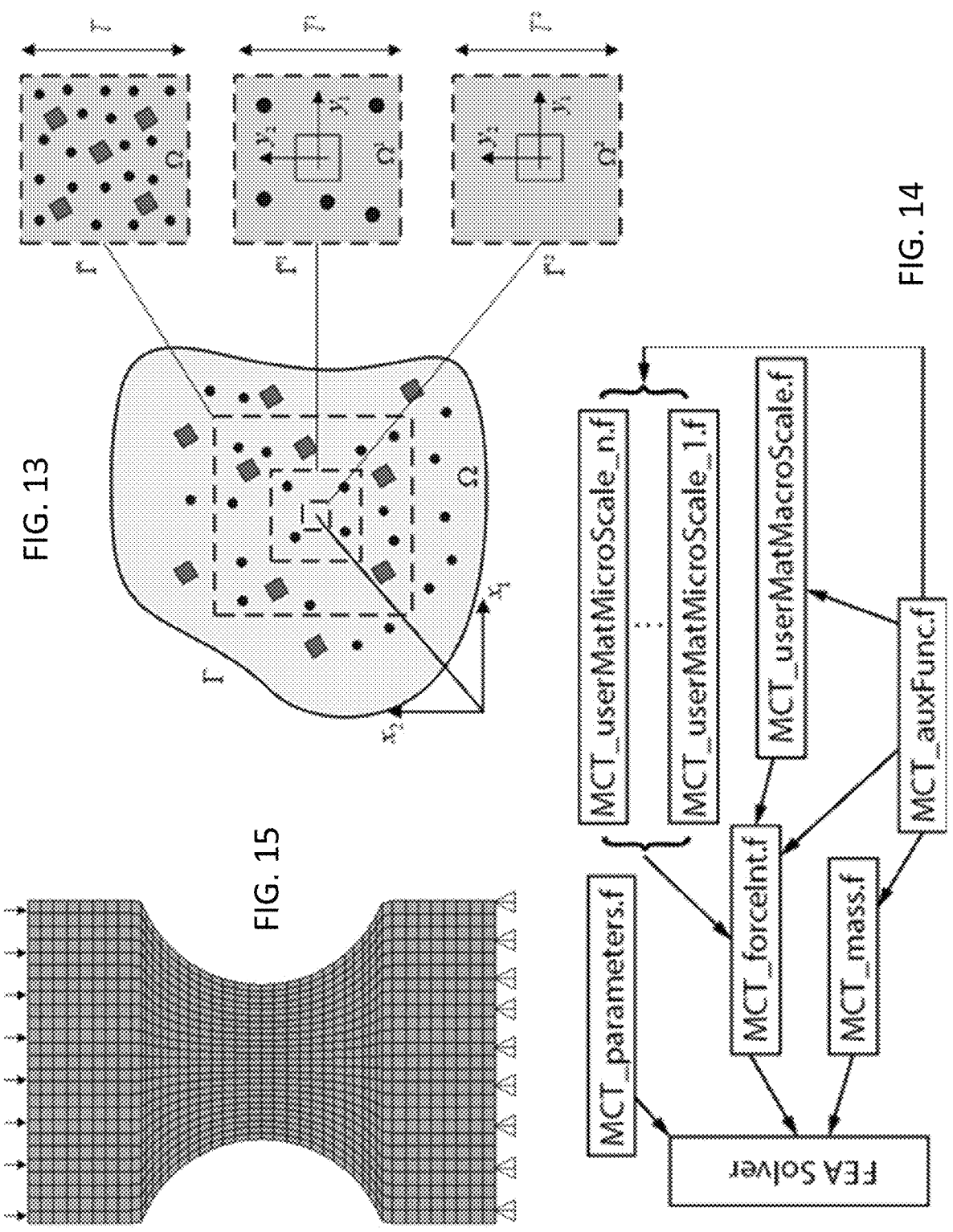
FIG. 13 shows a framework for the three-scale homogenization according to embodiments of the invention.
FIG. 14 shows relationships of subroutines used in MCT implementation according to embodiments of the invention.
FIG. 15 shows a dog-bone model used to test our implementation according to embodiments of the invention. The bottom is fixed and the top is given a displacement.

In one embodiment, as shown in FIG. 14, the MCT model is implemented with a user element subroutine including a FEA solver; user materials subroutines for micro and macro domains; an auxiliary function subroutine containing functions used by the user materials subroutines needed for the user element subroutine, wherein the auxiliary function subroutine is callable by the user material subroutines to finish the update of the stress and strain; a force subroutine for calculating the internal force by calling the user materials subroutines and the auxiliary function subroutine; a parameter subroutine providing input parameters for the user element subroutine; and a mass subroutine for computing a mass matrix for the user element subroutine, wherein the force subroutine, parameter subroutine and the mass subroutines are called by the user element subroutine for solving the equations at each scale. In one embodiment, the auxiliary function subroutine comprises Gauss integration, computation of inertia and subroutines to calculate the strain and strain rate. In one embodiment, the input parameters include number of micro scales, number of Gauss points and number of history variables.

In one embodiment, the method is applicable to prediction of formation and propagation of a shear band in a material system.

In one embodiment, the method is applicable to simulation of high speed metal cutting (HSMC) in a material system.

In another aspect, the invention relates to a non-transitory tangible computer-readable medium storing instructions which, when executed by one or more processors, cause a system to perform the above disclosed methods for implementation of the MCT.

In yet another aspect, the invention relates to a computational system for design optimization and/or performance prediction of a material system, comprising one or more computing devices comprising one or more processors; and a non-transitory tangible computer-readable medium storing instructions which, when executed by the one or more processors, cause the one or more computing devices to perform above disclosed methods for implementation of the MCT.

In a further aspect, the invention relates to a method of data-driven mechanistic modeling of a system for predicting high cycle fatigue (HCF) crack incubation life. In one embodiment, the method comprises generating a representation of the system with matrix, inclusion and void, wherein the representation comprises microstructure volume elements (MVE) that are of building blocks of the system; obtaining strain contours in the matrix from a linear elastic analysis over a predefined set of boundary conditions; generating clusters from a strain solution by assigning voxels with similar strain concentration tensor within the representation of the material system to one of the clusters with a unique ID, using k-means clustering; computing a plastic shear strain field of the material system by solving the Lippmann-Schwinger equation using the generated clusters with a crystal plasticity (CP) model; and predicting the fatigue crack incubation life of the system using a fatigue indicating parameter (FIP) based on the plastic shear strain field.

In one aspect, the invention relates to a non-transitory tangible computer-readable medium storing instructions which, when executed by one or more processors, cause a system to perform the above disclosed data-driven mechanistic modeling methods for predicting high cycle fatigue (HCF) crack incubation life.

In another aspect, the invention relates to computational system for design optimization and/or performance prediction of a material system, comprising one or more computing devices comprising one or more processors; and a non-transitory tangible computer-readable medium storing instructions which, when executed by the one or more processors, cause the one or more computing devices to perform the above disclosed data-driven mechanistic modeling methods for predicting high cycle fatigue (HCF) crack incubation life.

Without intent to limit the scope of the invention, examples according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Integrated Process-Structure-Property Modeling Framework for Additive Manufacturing One objective of modeling for Additive Manufacturing (AM) is to predict the resultant mechanical properties from given manufacturing parameters and intrinsic material properties, thereby reducing uncertainty in the material built. This can dramatically reduce the time and cost for the development of new products using AM. In this exemplary study, we realize the seamless linking of models for the manufacturing process, material structure formation, and mechanical response through an integrated multi-physics modeling framework. The sequentially coupled modeling framework relies on the concept that the results from each model used in the framework are contained in space-filling volume elements using a prescribed structure. The implementation of the framework demonstrated herein includes: (1) a powder spreading model using the discrete element method (DEM) to generate the powder bed and a thermal-fluid flow model of the powder melting process to predict voids and temperature profile, (2) a cellular automaton (CA) model to simulate grain growth based on the temperature profile, and (3) a reduced-order micromechanics model to predict the mechanical properties and fatigue resistance of the resultant structures by resolving voids and grains. The simulation results demonstrate qualitative agreement with experimental observations from literature, showing the appealing potential of the integrated framework.

Additive Manufacturing (AM) Modeling Framework

Here we present a process-structure-property prediction framework for metal additive manufacturing, with an implementation for selective electron beam melting (SEBM) of the commonly used titanium alloy, Ti-6Al-4V. In this framework shown schematically in FIG. 1, each model incorporates basic material information and data provided directly from previous models in the framework to predict the mechanical response and estimated fatigue life of critical microstructures given machine-relevant processing conditions. The key idea of the framework is that structural information, data that can be represented in space using a collection of volume-filling elements, sufficiently describes the system and can thus intermediate models: a simple yet powerful premise.

In an abstract form, the framework includes various "modules" that are aggregated into "hubs"; there may be multiple hubs, each of which collects and passes a complete solution for one stage (e.g., process simulation) to the next stage (e.g., mechanical response prediction). One might think of the modules as discrete processing units capturing a unique facet of the system and the hubs as data management facilities for database queries. To systematize the method we group modules into hubs for (1) material processing and (2) material response.

Each module is stand-alone, designed to answer significant scientific and/or engineering questions independent of the connecting framework. As such, the models that make up the modules are only discussed with sufficient detail to elucidate their purpose: the key points of each model are provided. A detailed description of the framework implementation is given below. The process is captured by models for powder spreading, heat source and paired thermal-fluid modeling, and grain growth during solidification. The mechanical response prediction includes reduced order modeling, constitutive law, and performance metric. The example results are shown with output and discussion for each model. The specific models are selected to capture microstructure-level variations caused by the AM process and the impact of these variations on mechanical properties; these choices are not unique and simply elucidate the framework.

Framework Implementation

Figures 2, 3:
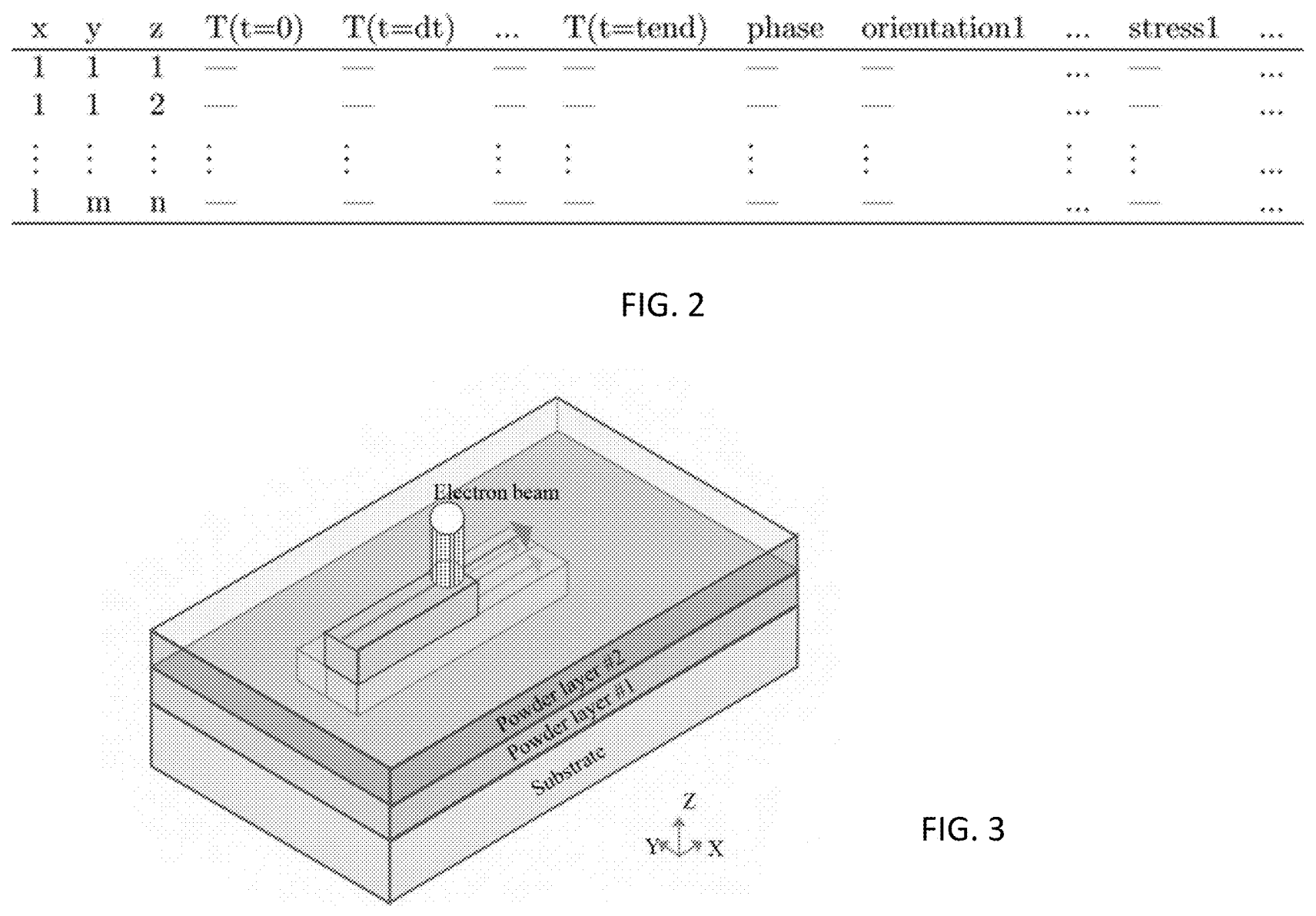

FIG. 1A illustrates a schematic diagram of the module-hub framework conceptual layout, with images of our current implementation demonstrating the modules: a selective electron beam melting process with microstructure-based fatigue life assessment. The data used by the framework at each point in space is described by spatial coordinates and any relevant field data for the current working modules, as shown graphically by a schematic of a representative voxel. The cellular automata model is shaded gray to indicate that results both with and without it are given, to demonstrate the flexibility of the framework. The framework depicted in FIG. 1A contains mechanisms for input and output handling as well as intermediate storage. The solution domain is represented within a fixed format, flat-file database as a regular grid of volume filling points, with each point described by coordinates (x, y, z location) to identify the unique record, each of which has fields that contain a datum: temperature at a point in time, phase, orientation, various stress and strain tensors expressed componentwise, and a fatigue indicating parameter (FIP) in this implementation. These field values are chosen to match the information required by all of the models used, and are not necessarily unique or optimal in their ability to describe the process. FIG. 2 outlines the database format of the flat-file database used to store record data for the framework. The fields are abbreviated to more clearly show the structure of the database.

This integrated framework is mainly based on one-way coupling as illustrated in FIG. 1B, which is relatively straightforward to implement and test. Each model is directly connected to the next by passing output information to a subsequent input processor: the computational fluid dynamics (CFD) powder melting model feeds temperature profiles and voids information to the CA grain growth model through the flat file database, and the CA grain growth model feeds the grains and void information to the self-consistent clustering analysis (SCA) crystal plasticity model, also through the flat file database. In this case, data is promulgated in predominately one direction (process to structure to properties): a "backwards" coupling (e.g., structure to process) is not considered. Latent heat is considered an effective simplification of the influence of microstructure evolution on the temperature field and molten pool flow. Previous thermal or thermal-fluid models with this simplification have shown simulated temperature history and molten pool behavior in good agreement with experiments. The grain growth models have also shown qualitative agreement with experimental results using simple one-way coupling that does not incorporate the influence of mechanical deformation (e.g., thermal stress) on grain growth. Therefore, this sequentially coupled framework should be sufficient to predict the temperature profiles, material structures and mechanical behaviors. From a top-down approach as illustrated below, this framework can be used to derive process-structure-property relationships, while a bottom-up approach could be used to solve design and inverse problems.

In certain embodiments, the framework proceeds as follows:

The powder spreading model and powder melting model exchange high-resolution geometry information of the powder bed, using a stereolithography (STL)-format surface mesh representation. That is, the DEM powder spreading model generates the particle packing configuration within one powder layer, outputs as an STL file, and feeds into the CFD powder melting, thereby reproducing powder spreading and melting, as illustrated by the black arrows in FIG. 1B; the CFD powder melting model predicts the solidified shape, outputs as an STL file, and feeds into the DEM powder spreading model to apply a new powder layer, thereby reproducing powder spreading, as illustrated by the gray arrows in FIG. 1B. The manufacturing process of multiple layers and tracks can be represented by repeating these two simulations and the data exchange between them.

The temperature profile in the volume of interest (VOI) is predicted by the powder melting model and written to a database in the flat file format shown in FIG. 2. By convention, void space is set to an ambient temperature to distinguish it from a dense material.

The grain growth model reads the temperature field history from the database, and interpolates linearly to match the grid spacing when needed. The dense material and voids are identified based on the temperature. Voids and free surfaces are thereby included in the grain growth model.

The grain structure (phase and orientation), as predicted by the grain growth model, is added to the database along with the voids.

For the mechanical response models, a sub-domain of particular interest, e.g., the largest void, of the full VOI for grain growth is selected as the input; the grain and void information provided at each point via the database are interpreted as the center point of each voxel in a regular, uniform, cuboid mesh. This mesh can be used for all three mechanical response modules: FEM, SCA, and fatigue prediction.

The SCA and FEM models are used to predict stress-strain response, which is added to the database.

The fatigue prediction model reads the stress-strain behavior at each point, and computes a non-local potency estimate. The fatigue life of the highest potency location is computed to provide a scalar material response metric.

Process Modeling Hub

The first hub codifies the process models. Inputs include process conditions and material information. Process conditions incorporate a multitude of factors, such as the scan pattern, input power, powder bed thickness, and build chamber conditions (e.g., temperature, degree of vacuum).

In the relatively simple case shown here, the scan pattern is a two-pass, two-layer Z configuration: each layer is added using the same path at the new height. A diagram of the scan pattern is shown in FIG. 3. Between layers the powder spreading model is used to place the new bed of powder particles. The temperature history of each point and the final geometry of the CFD powder melting simulation are output information, which are subsequently used as the input to the grain growth model. The grain growth model input processor identifies the voids and predicts the grain structures based on thermal information from the CFD model. The output of this hub is the overall microstructure information, crystallography and geometry, predicted with the thermal-CFD model and grain growth model.

A continuum-based thermal model using the Finite Element Method (FEM), for example, could replace the thermal predictions of the high-fidelity thermal-CFD model used here. In this study, the high-fidelity models for powder spreading and melting are intended to provide a relatively accurate description of the thermal conditions and void information compared to the simpler models required for part-scale analysis. These high-fidelity models have high computational cost, limiting the total volume of material that can be investigated in the following examples.

Powder Spreading

The arrangement of particles in the powder bed is determined with a particle spreading simulation. The distribution and dynamics of particles within the bed or on a substrate can influence the final build condition, e.g., through surface roughness or defect formation between tracks or layers. Thus, spreading is simulated with accurate process variables such as the rake geometry, substrate geometry, layer thickness, powder size distribution, and frictional contact/collisions between particles and with the rake. In this case, particles are spherical, and have diameters following a Gaussian distribution between 30 and 50 microns. A collection of particles is generated, dropped on the previous layer, and spread with a rake. A surface mesh, stored in an STL-format file, represents the resulting geometry. The parameters used in for the module are listed in Table 1-1, and material parameters of Ti-6Al-4V for the powder spreading model are listed in Table 1-2.

TABLE 1-1

| Input and output for powder spreading model | |
| --- | --- |
| Input | Particle size distribution |
| | Spreading tool geometry/description |
| | Substrate shape/material |
| Output | Powder bed state (STL geometry) after spreading |

TABLE 1-2

| Material parameters of Ti—6Al—4V for the powder spreading model | |
| --- | --- |
| Property | Value |
| Density ($\rho$) | 4000 kg/m$^3$ |
| Young's modulus (E) | 124 GPa |
| Poisson ration ($\upsilon$) | 0.41 |
| Sliding friction coefficient ($\mu_f$) | 0.5 |
| Restitution coefficient ($\theta$) | 0.5 |
| Surface energy density ($\psi$) | 0.0002 J/m$^2$ |

Powder Melting

The powder geometry is passed to a coupled thermal-fluid solver to compute thermal response and material redistribution during melting and subsequent re-solidification. The governing equations are continuity, momentum conservation and energy conservation, given by $$\begin{cases} \nabla \cdot (\rho v) & = 0, \\ \dfrac{\partial}{\partial t}(\rho v) + \nabla \cdot (\rho v \otimes v) & = \nabla \cdot (\mu \nabla v) - \nabla p + \rho g + f_B, \\ \dfrac{\partial}{\partial t}(\rho h) + \nabla \cdot (\rho v h) & = q + \nabla \cdot (k \nabla T), \end{cases} \quad (1\text{-}1)$$

where flow is assumed to be incompressible, laminar, and Newtonian; in the momentum conservation equation, the major driving forces are incorporated, including gravity (g), buoyancy ($f_B$, Boussinesq approximation), viscosity ($\mu$) recoil pressure, surface tension and Marangoni forces. The solid phase is approximated as a fluid with extremely large viscosity. Input energy (q) from an electron beam, heat conduction (k, the thermal conductivity), and latent heat of phase change (captured in the definition of enthalpy h) are incorporated in the energy conservation equation. Surface convection is obviated due to the evacuated environment. An important term is that of the heat source (q), representing an electron beam impinging upon the bed of particles. A volumetric heat source model has been derived based on nano-scale simulations of electron-atom interactions in our previous study, and is given by:

$$q = \eta Q F_{section} F_{pene} \quad (1\text{-}2)$$

where q is the absorbed energy density, $F_{section}$ is the absorbed energy distribution within the beam cross-section, $F_{pene}$ is the absorbed energy distribution along the penetration depth, $\eta$ is the energy absorptivity, and the beam power Q is the product of the acceleration voltage and beam current. The results shown in the following sections are for Case 1 in Table 1-3. The absorptivity, $\eta$, depends strongly upon the local incident angle and thus varies widely.

The fully coupled thermo-fluid flow equations governing the evolution of powder particles are computed with a finite volume method (FVM). Within this, the free surface is tracked using the volume of fluid (VOF) method, $$\frac{\partial F}{\partial t} + \nabla \cdot (Fv) = 0. \quad (1\text{-}3)$$

where F represents the fluid volume fraction. At each time step, the free surface is reconstructed with VOF, the heat source in each computational cell is applied using the heat source model described above, the effects of evaporative mass loss, energy loss and recoil pressure on the free surface are computed on each cell, and the free surface is updated. For these simulations, the material parameters are given in Table 1-4. A list of the inputs and outputs of this module is provided in Table 1-5.

The cell size for this model is 5 µm: sufficient to eliminate mesh sensitivity, based on a previous study. The computation time for the 2-layer, 2-track case (see FIG. 3) is around 700 hours on a desktop computer using an Intel Core i7-2600 CPU.

The temperature history of each computational cell is output into the flat-file database for use in the Cellular Automata (CA) model. To distinguish between a solid/liquid domain and void space, i.e., above the build surface and any voids within the material, void areas are assigned ambient temperature, while the temperature of the solid/liquid domain is no lower than the initial temperature (about 900K) due to the preheating procedure in the SEBM.

TABLE 1-3

| Build parameters for Cases 1 and 2 | | |
| --- | --- | --- |
| Parameter | Case 1 | Case 2 |
| Hatch spacing | 200 µm | 240 µm |
| Laser power | 60 W | 60 W |
| Hatch strategy | Z-pattern | Z-pattern |
| Scan speed | 0.5 m/s | 0.5 m/s |

TABLE 1-4

| Thermal and flow properties of Ti—6Al—4V | |
| --- | --- |
| Property | Value |
| Density ($\rho$) | 4000 kg/m$^3$ |
| Solidus temperature ($T_s$) | 1878K |
| Liquidus temperature ($T_l$) | 1928K |
| Latent heat of melting ($L_m$) | 2.86 × 10$^5$ J/kg |
| Latent heat of evaporation ($L_v$) | 9.7 × 10$^6$ J/kg |
| Saturated vapor pressure ($P_{s0}$) at $T_0 = 3315$K | 1.013 × 10$^5$ Pa |
| Specific heat (c) | 872 J/(K · kg) |

TABLE 1-4-continued

| Thermal and flow properties of Ti—6Al—4V | |
|---|---|
| Property | Value |
| Thermal conductivity at solidus (k) | 16 W/(m · K) |
| Thermal conductivity at liquidus (k) | 32 W/(m · K) |
| Surface radiation coefficient ($\alpha_b$) | 0.4 |
| Surface tension coefficient ($\sigma$) | 1.68 N/m |
| Temperature sensitivity of $\sigma$ ($\sigma_s^T$) | 0.00026 |
| Viscosity ($\mu$) | 0.005 Pa · s |
| Domain size | 0.75 mm × 0.225 mm × 0.055 mm |
| Mesh size | 150 × 45 × 10 |
| Cell size | 0.005 mm |

TABLE 1-5

| Input and output for thermal-CFD model | |
|---|---|
| Input | Powder bed state |
| | Thermal processing conditions |
| | Material properties |
| Output | Thermal history of each point in the volume |
| | Geometry (including voids) |

Grain Growth

Grain formation during solidification may be computed from the temperature field, provided by the thermal-CFD (Computational Fluid Dynamics) module with one-way coupling. The CA model is used in this study. In the CA, the material region is discretized by a set of cubic cells. The temperature history of each cell is determined from the thermal-CFD simulation using a linear interpolation. The input and output of this module is summarized in Table 1-6.

TABLE 1-6

| Input and output for grain growth model | |
|---|---|
| Input | Thermal history at each point |
| | Material properties, parameters |
| Output | Phase ID (includes void phase) |
| | Grain orientation (Bunge Euler angles) |

There are two main sub-models required for the CA. The first, a heterogeneous nucleation model, includes defining the distribution of nucleation sites, the critical undercooling value (the temperature at which nucleation occurs at each site), and the crystal orientation of newly nucleated grains. In this CA model, nucleation occurring at the boundary of a liquid volume is treated differently from nucleation within the bulk of the liquid volume through a "wall" nucleation density $n_{max,w}$ with units of $m^{-2}$ and a "liquid," or bulk, nucleation density $n_{max,l}$ with units of $m^{-3}$. Prior to the simulation, the total number of nucleation sites at the surface and in the bulk are calculated and assigned critical undercooling values. This critical undercooling varies from site to site; the variation is assumed to follow a Gaussian distribution (given by the values of the mean, $\overline{\Delta T}$, and standard derivation, $\Delta T_\sigma$). The surface and bulk nucleation sites may use different values of $\overline{\Delta T}$ and $\Delta T_\sigma$, distinguished by subscripts w and l.

The second sub-model, a model of grain growth during the solidification process, controls the rate and direction for which existing grains grow by assimilating surrounding cells. For a newly nucleated grain, the initial dendritic network within the cell is assumed to be a regular octahedral envelope bounded by ⟨111⟩ planes and to have a random crystallographic orientation defined by a set of Euler angles. The six half-diagonals of the octahedron correspond to the primary dendritic growth directions of the grain. Grain growth is simulated by extending these half-diagonals based on the dendrite tip velocity, $v(\Delta T)$. Here $\Delta T$ is the local undercooling at the center of the cell that owns the envelope; ownership is determined by a decentered octahedron growth algorithm. As time proceeds, the envelope grows and eventually engulfs neighboring cells to propagate the grain. For an active envelope located in a cell, e.g., cell i, the change in length of its diagonal, $\Delta L_i$, is calculated as $$\Delta L_i = v(\Delta T_i)\delta t \tag{1-4}$$

where $\Delta T_i$ is the total undercooling at the center of the cell and $\delta t$ is the current time step. The growth rate, $v(\Delta T_i)$, is usually estimated based on the undercooling by a polynomial formulation. We use $$v(\Delta T) = a_1\Delta T + a_2\Delta T^2 + a_3\Delta T^3, \tag{1-5}$$

where $a_1$, $a_2$ and $a_3$ are fit parameters calibrated to experimental or theoretical results based on the dendrite tip growth kinetics. The parameters for this portion of hub 1 are provided in Table 1-7.

The conditions of AM (high temperature gradient and cooling rate) result in grain growth dominated by epitaxial growth from existing grains surrounding the melt pool. Thus, the grain structure of the substrate and metal powders are obtained first through the nucleation parameters shown in Table 1-7 before the melting process; during the melting and re-solidification process, nucleation is assumed to progress only from the solid material boundary to better capture growth conditions under AM. The prediction results from the CA model are written to the database as a phase ID (a unique integer) and a predicted crystallographic orientation (Euler angle triplet following the Bunge convention) for each voxel in the CA domain. This database can be read directly to construct a voxel mesh, since material properties are associated with phase ID and orientation.

TABLE 1-7

| CA model parameters; material parameters | |
|---|---|
| Parameter(s) | Value(s) |
| $T_{melting}$ | 1928° C. |
| $T_{ambient}$ | 298° C. |
| Domain size | 0.35 mm × 0.225 mm × 0.055 mm |
| Mesh size | 280 × 180 × 44 |
| Cell edge size | $1.25 \times 10^{-3}$ mm |
| Nucleation, wall: $n_{max,w}, \overline{\Delta T}_w, \Delta T_{w,\sigma}$ | $5 \times 10^{10}$ m$^{-2}$, 2° C., 0.5° C. |
| Nucleation, liquid: $n_{max,l}, \overline{\Delta T}_l, \Delta T_{l,\sigma}$ | $5 \times 10^{14}$ m$^{-3}$, 2° C., 0.5° C. |
| Growth rate: $\alpha_3, \alpha_2, \alpha_1$ | 0.0, 2.03 × 10$^{-4}$ m/(s ° C.$^2$), 0.544 × 10$^{-4}$ m/(s ° C.) |

Mechanical Response Prediction Hub

The second hub codifies our mechanical response and performance prediction methods. Input to this hub is crystallographic and geometric microstructure information, as well as material properties for constitutive model calibration. The output of this hub is a prediction of mechanical response, i.e., overall stress-strain curves, local plastic strains and stresses, and the high-cycle fatigue incubation life. All information (phase ID, grain orientation, etc.) is carried by voxels. A state-of-the-art reduced order modeling scheme called Self-consistent Clustering Analysis (SCA) was used to speed up the simulations. Volumes of interest (VOIs) for computing the fatigue indicating parameter (FIP) and predicting fatigue life are selected from the larger thermal-CFD-grain growth region; a subset with known spatial coordinates can simply be queried from the database, which contains the predicted microstructure (void size, shape, location, grain size, shape, orientation, etc.). All the input and output data to and from this module is listed in Table 1-8.

TABLE 1-8

| Input and output for mechanical response model |  |
| --- | --- |
| Input | Phase ID (including voids) |
|  | Grain orientations (if not provided assume single crystal in weakest orientation) |
|  | Material properties |
|  | Boundary/loading conditions (assumes periodic BCs) |
| Output | Stresses |
|  | Strains |

Crystal Plasticity for Material Law

To understand the microscale mechanics, in this case the influence of unusual grain geometry and the relatively frequent occurrence of voids in AM, we apply a crystal plasticity (CP) constitutive law. In the CP framework, deformation is described by summing the shear slip rate of all slip systems in all the crystals under consideration:

$$\bar{L}^P = \Sigma_{\alpha=0}^{N_{slip}} \dot{\gamma}^{(\alpha)}(\bar{s}^{(\alpha)} \otimes \bar{m}^{(\alpha)}) \qquad (1\text{-}6)$$

where $\bar{L}^P$ is the plastic velocity gradient in the intermediate configuration; $\alpha$ is the index of a slip system; $\dot{\gamma}^{(\alpha)}$ is the rate of shear slip in slip system $\alpha$; $\bar{s}^{(\alpha)}$ is the slip direction of that system and $\bar{m}^{(\alpha)}$ is the slip plane normal. In the model used here, a simple rate-dependent power-law with backstress governs the rate of shear slip:

$$\dot{\gamma}^{(\alpha)} = \dot{\gamma}_0 \left| \frac{\tau^{(\alpha)} - a^{(\alpha)}}{\tau_0^{(\alpha)}} \right|^{(m-1)} \left( \frac{\tau^{(\alpha)} - a^{(\alpha)}}{\tau_0^{(\alpha)}} \right) \qquad (1\text{-}7)$$

where $\dot{\gamma}_0$ is a reference shear strain rate, $\tau^{(\alpha)}$ is the resolved shear stress on slip system $\alpha$, $a^{(\alpha)}$ is a backstress for kinematic hardening, and $\tau_0^{(\alpha)}$ is the reference shear strength, the evolution of which depends on the terms for direct hardening and dynamic recovery in a hardening law. The reference shear strength $\tau_0^{(\alpha)}$ evolves based on the expression $$\dot{\tau}_0^{(\alpha)} H \Sigma_{\beta=1}^{N_{slip}} q^{\alpha\beta} \dot{\gamma}^{(\beta)} - R \tau_0^{(\alpha)} \Sigma_{\beta=1}^{N_{slip}} |\dot{\gamma}^{(\beta)}|, \qquad (1\text{-}8)$$

where H is the direct hardening coefficient and R is the dynamic recovery coefficient and $q^{\alpha\beta}$ is the latent hardening ratio given by:

$$q^{\alpha\beta} = \chi + (1-\chi)\delta_{\alpha\beta} \qquad (1\text{-}9)$$

where $\chi$ is a latent hardening parameter (1: without latent hardening, 0: with latent hardening). The backstress $a^{(\alpha)}$ evolves based on the expression:

$$\dot{a}^{(\alpha)} = h\dot{\gamma}^{(\alpha)} - ra \uparrow \dot{\gamma}^{(\alpha)}|, \qquad (1\text{-}10)$$

where h and r are the direct hardening and dynamic recovery factors respectively.

It has been observed that the microstructure of Ti-6Al-4V produced by SEBM is dominated by hexagonal-close-packed (hcp) $\alpha$ grains which are transformed from the prior body-centered-cubic (bcc) $\beta$ grains. The $\alpha$ phases originating from the same parent $\beta$ grain have similar orientation. For this demonstration of the framework we make the simple, though inaccurate, assumption that each parent $\beta$ grain, under thermal processing, produces a single, aligned child $\alpha$ grain. Slip systems used for the dominant $\alpha$-phase of Ti-6Al-4V are $3\langle 11\bar{2}0\rangle\{0001\}$ basal, $3\langle 11\bar{2}0\rangle\{10\bar{1}0\}$ prismatic, $6\langle 11\bar{2}0\rangle\{10\bar{1}1\}$ first order pyramidal and $12\langle 11\bar{2}3\rangle\{10\bar{1}1\}$ second order pyramidal. These are shown in Table 1-9. Parameters for the crystal plasticity material model used both for offline and online stages are also given in Table 1-9, where $C_{ij}$ are the stiffness components in Voigt notation.

TABLE 1-9

Calibrated elastic and plastic crystal plasticity parameters for primary $\alpha$ phase. Parameters with a [#] are from Thomas et al. (*Materials Science and Engineering: A*, 553: 164-175, 2012). Others are selected to match experimental results

| Elasticity: C* | MPa | Phase | Plasticity: |  |  |  |
| --- | --- | --- | --- | --- | --- | --- |
|  |  |  | Basal | Prismatic | Pyramidal $\langle a\rangle$ | Pyramidal $\langle c+a\rangle$ |
| $C_{11} = C_{22}$ | $1.7 \times 10^5$ | $\dot{\gamma}_0^{[\#]}$ s$^{-1}$ | 0.0023 | 0.0023 | 0.0023 | 0.0023 |
| $C_{33}$ | $2.04 \times 10^5$ | m$^{[\#]}$ | 50 | 50 | 50 | 50 |
| $C_{44} = C_{55}$ | $1.02 \times 10^5$ | $\tau_0$ MPa | 284.00 | 282.24 | 395.00 | 623.30 |
| $C_{66}$ | $0.36 \times 10^5$ | $a^{t=0}$ MPa | 0.0 | 0.0 | 0.0 | 0.0 |
| $C_{12} = C_{21}$ | $0.98 \times 10^5$ | H MPa | 1.0 | 1.0 | 1.0 | 1.0 |
| $C_{13} = C_{31}$ | $0.86 \times 10^5$ | R MPa | 0.0 | 0.0 | 0.0 | 0.0 |
| $C_{23} = C_{32}$ | $0.86 \times 10^5$ | h MPa | 500.0 | 500.0 | 500.0 | 500.0 |
| other $C_{ij}$ | 0 | r MPa | 0.0 | 0.0 | 0.0 | 0.0 |
|  |  | $\chi$ | 1.0 | 1.0 | 1.0 | 1.0 |

Self-Consistent Clustering Analysis (SCA)

The boundary value problem of the VOI to be solved can be written in a Lagrangian formulation as:

$$\begin{cases} div\sigma(x) = 0, \forall x \in \Omega \\ \sigma(x) = f(x, \epsilon, \dot{\epsilon}, s) \\ \epsilon = \epsilon^* + \bar{\epsilon} \end{cases} \qquad (1\text{-}11)$$

where x is a point in the VOI $\Omega_0$; $\sigma(x)$ is the local stress tensor, which is a function of the local strain $\epsilon$, its rate $\dot{\epsilon}$ and some internal variables s for a general elasto-viscoplastic material. The local strain $\epsilon$ is the sum of a fluctuating term $\epsilon^*$ and a prescribed overall strain $\bar{\epsilon}$. Assuming periodic boundary conditions, the above boundary value problem is equivalent to the following Lippmann-Schwinger formulation $$\epsilon = -\Gamma^0 * (\sigma - C^0 : \epsilon) + \bar{\epsilon}, \tag{1-12}$$

where $\Gamma^0$ is the Green's operator corresponding to the reference stiffness $C^0$ and $*$ denotes the convolution operation.

The reduced order mechanical modeling scheme used here is based on discretization of the Lippmann-Schwinger formulation. The way this approach differs from other reduced order methods is that the decomposition of the VOI is based on knowledge of the strain concentration. This is used to group regions of material with similar deformation behavior. This information is acquired in the "offline" stage of the SCA approach, where a simple (elastic) direct numerical simulation of the microstructure of interest is conducted. In the "online" stage, any nonlinear material law and/or loading path can be used.

In this case, the strain concentration tensor of each voxel is obtained with a linear elastic finite element model conducted in Abaqus using C3D8R elements. This model computes the elastic response of a VOI with periodic boundary conditions under three uniaxial tensile loading cases corresponding to x, y, z directions respectively. The stretch direction is the same as applied during the online stage. The elastic strains thus obtained are used in a k-means clustering algorithm for domain decomposition, where the squared Euclidean distance measure is used for clustering.

Four fully-reversed unidirectional load cycles at various strain amplitudes with crystal plasticity constitutive law were simulated during the online analysis. These cycles result in a stabilized value of $\Delta\gamma_{max}^P$ and a known $\sigma_{max}^n$, used later to compute a FIP. A full accounting of the parameters used for both the offline and online modules is provided in Table 1-10.

TABLE 1-10

Offline and online model parameters

| Parameter(s) | Value(s) |
| --- | --- |
| Domain size | 0.05 mm × 0.05 mm × 0.05 mm |
| Mesh size size | 40 × 40 × 40 |
| Element edge length | $1.25 \times 10^{-3}$ mm |
| Material law, offline | linear elasticity |
| Material law, online | crystal plasticity |
| Strain amplitude, online | 0.5%, 0.375%, 0.3% |
| of strain cycles | 4 |
| Load ratio, R = $\epsilon_{min}/\epsilon_{max}$ | −1 |
| Strain rate, $\dot{\epsilon}$ | 0.1 s$^{-1}$ |

Performance Prediction: Fatigue Life

A performance metric simplifies ranking the predicted build quality of a part or process parameter set to the comparison of a scalar factor. To provide a metric, this module estimates the high-cycle fatigue life of the predicted microstructure. A Fatemi-Socie FIP appropriate for microstructural analysis is used, which is given by $$FIP = \frac{\Delta\gamma_{max}^p}{2}\left(1 + \kappa\frac{\sigma_n^{max}}{\sigma_y}\right) \tag{1-13}$$

where $\Delta\gamma_{max}^P$ is the maximum of the cycle-to-cycle change of the plastic shear strain, $\sigma_m^{max}$ is the stress normal to $\Delta\gamma_{max}^P$, $\sigma_y$ is the yield stress, and $\kappa$ is a normal stress factor. The value of $\Delta\gamma_{max}^P$ saturates after a few load cycles and the saturated value can be used to compute FIP and $N_{inc}$. The relationship between FIP and $N_{inc}$ for Ti-6Al-4V is calibrated to experimental high cycle fatigue life data for wrought (nominally defect free) Ti-6Al-4V. Here, this calibration has been done to reduce the total RMS difference between the experimental data and the $N_{inc}$ predicted for the polycrystalline, defect free VOI at 0.5% and 0.375% strain amplitudes simultaniously (this is the simulation condition that best matches that of the experimental conditions). A moving volume average with window size of about 10% of the volume of the microstructure of interest (e.g., the mean void size) is used to compute the nonlocal FIP. The maximum nonlocal FIP, $NFIP_{max}$, is correlated with fatigue crack incubation life, $N_{inc}$, through $$NFIP_{max} = \bar{\gamma}_f(2N_{inc})^c \tag{1-14}$$

where $\bar{\gamma}_f$ and c, multiplicative and exponential factors, are used to fit experimental high cycle fatigue data. The input and output of the module are summarized in Table 1-11.

TABLE 1-11

Input and output for fatigue prediction

| Input | Stresses |
| --- | --- |
| | Strains |
| | Material properties |
| Output | FIP |
| | $N_{inc}$ |

Example Results and Discussion

The final result of this integrated framework is the computed performance metric. Here we also present intermediate results from each of the models described above, to make the flow of information between modules and hubs within the framework much clearer by example. Each of the modules contains a state-of-the-art method in itself; the important point that we demonstrate, to our knowledge for the first time in the open literature, is that the modules used to predict processing and material response to mechanical loading during service have been directly linked. A comparison of the final metric for build quality between cases with different processing conditions is made. The examples here show the influence of process parameter choices on simulated performance with two distinct cases shown in Table 1-3: one with hatch spacing 200 μm and the other with hatch spacing 240 μm. This allows us to directly show the differences in that result from different process parameters. The influence can be seen in FIG. 12, where a larger hatch spacing results in the prediction of voids, reducing estimated fatigue life.

Powder Spreading

The powder spreading model produces a relatively densely packed bed of particles, with random spatial distribution. Panel (a) of FIG. 4 shows the powder arrangement for the first layer, spread on a smooth Ti-6Al-4V substrate.

Figure 4:
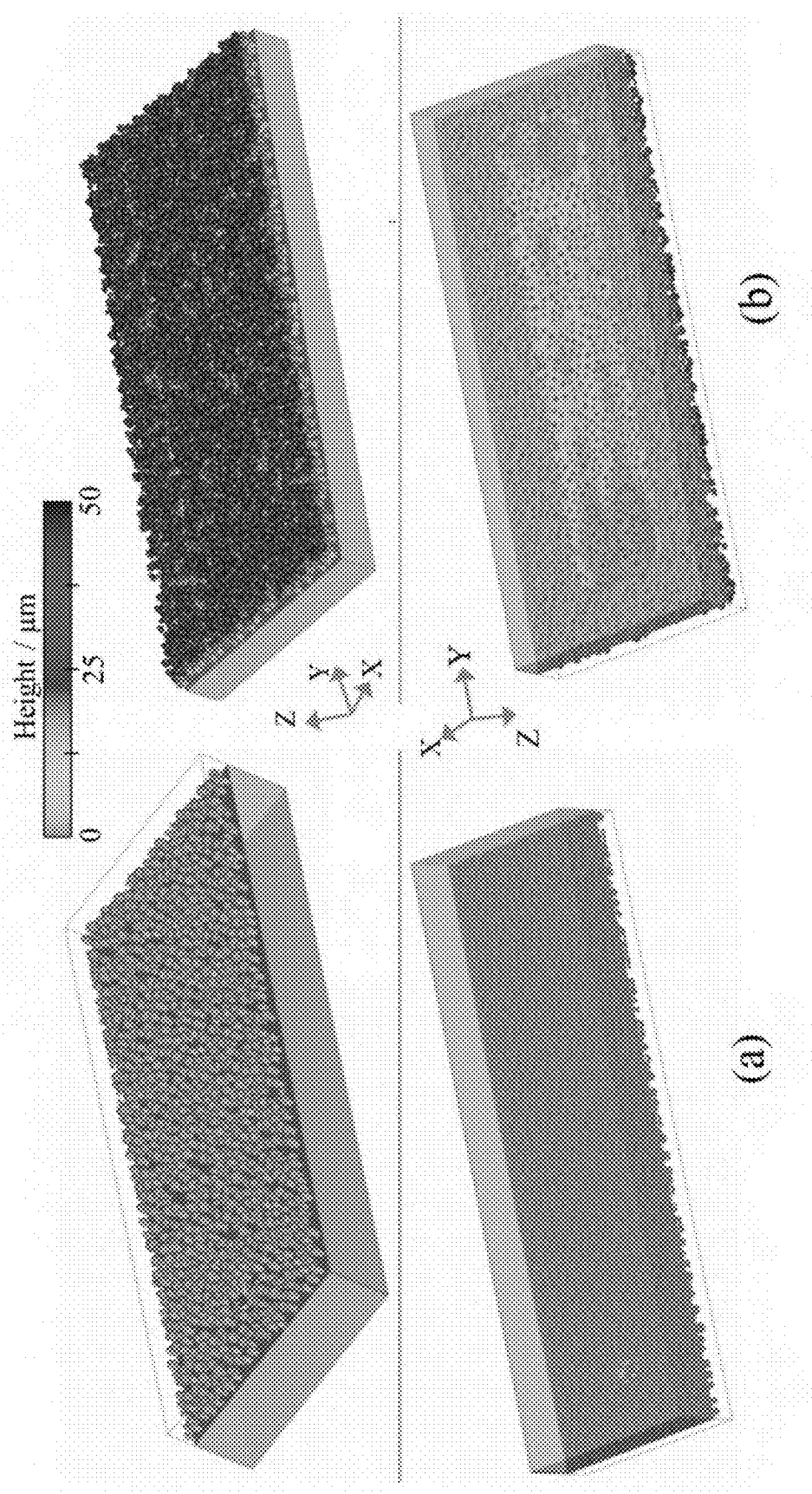
FIG. 4 shows powder bed configurations generated by powder spreading simulations according to embodiments of the invention. Panel (a), the first powder layer with a thickness of 0.05 mm spread on the substrate. Panel (b), the second powder layer with a thickness of 0.05 mm spread on the solidified surface of the first layer. The figures are colored by the height from the substrate surface. In panels (a) and (b), the upper sub-figures show views from above, and the lower ones show views from below (the –z direction), with the non-powder material hidden.

Panel (b) of FIG. 4 shows the arrangement of particles for the second layer, spread upon the surface resulting from the thermal-CFD process simulation of the first layer. The surfaces shown in these figures are represented by STL meshes, and given thereby to the first step of the thermal-CFD code: a 3D mesh generator. In FIG. 4, the first powder layer with a thickness of 0.05 mm spread on the substrate, while the second powder layer with a thickness of 0.05 mm spread on the solidified surface of the first layer. The figures are colored by the height from the substrate surface. In panels (a) and (b), the upper sub-figures show views from above, and the lower ones show views from below (the z direction), with the non-powder material hidden.

Powder Melting

Figure 5:
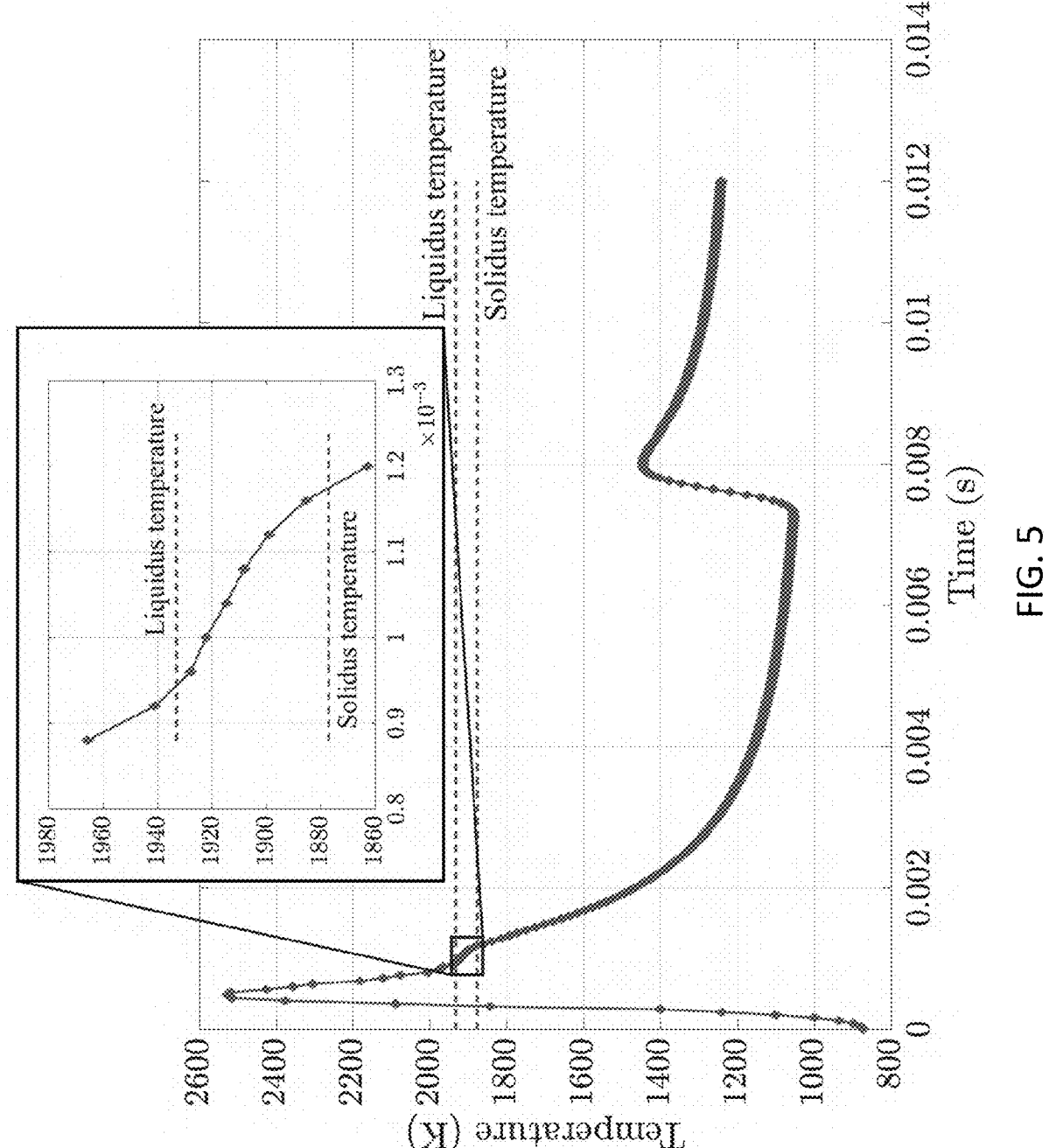
FIG. 5 shows an example temperature history taken from a single point of the thermal-CFD simulation according to embodiments of the invention. The inset curve highlights the kink caused by latent heat.
Figure 6:
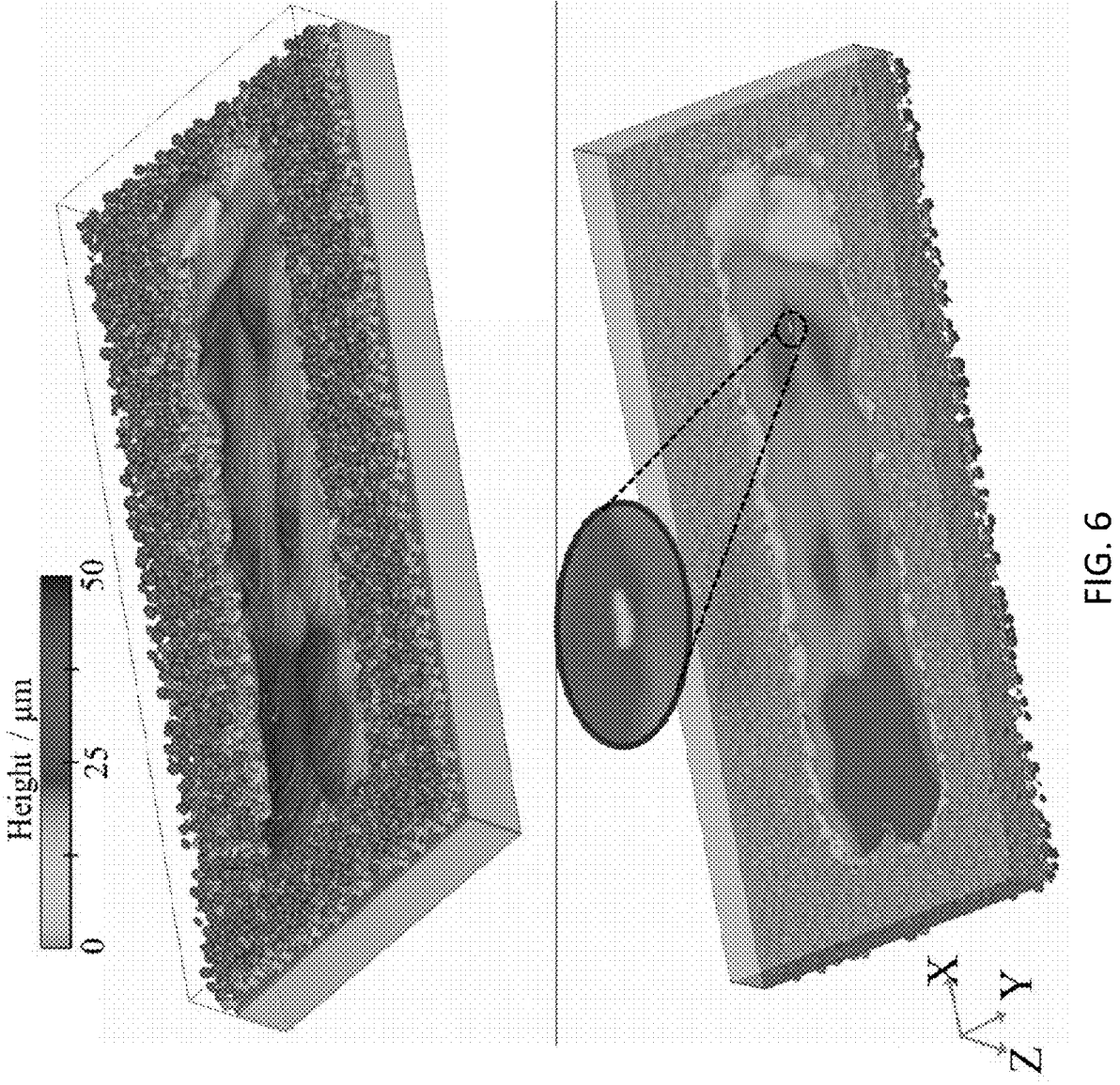
FIG. 6 shows voids observed in the CFD simulation of multiple-layer multiple-track manufacturing process according to embodiments of the invention. This is a 3D view of the free surfaces after manufacturing, colored by the height from the substrate surface. The upper image shows a view from above, and the lower image shows a view from below, with the substrate material hidden. The inset image highlights a void predicted during the build.

The geometry generated by the powder spreading model can be seen after melting has been simulated in FIG. 6 for Case 2 in Table 1-3. Note the match between the unmelted portions of FIG. 6 and the same locations in FIG. 4: the results from one model are used directly in the next. FIG. 5 shows an example of the temperature evolution at a single point, where the inset curve highlights the kink caused by latent heat. Rapid heating and cooling with a slight kink caused by the latent heat of solidification is predicted; the solidification kink is shown in detail in the inset. The temperature peaks again upon subsequent passes of the electron beam. This matches the well-documented thermal profile for the SEBM.

The voids predicted by the CFD model are highlighted in the inset in FIG. 6, where void space is colored and the material hidden. These voids result from lack of fusion between particles near the boundaries between the melt tracks. The irregular shapes and positions (between tracks and layers) match qualitatively with lack of fusion voids observed experimentally. Because no vapor phase is explicitly included in this CFD model, no voids caused by entrained gas are predicted. Simulated builds with different conditions, e.g., Cases 1 and 2 in Table 1-3, result in different geometric configurations and thermal profiles.

As shown in FIG. 6, voids are observed in the CFD simulation of multiple-layer multiple-track manufacturing process. This is a 3D view of the free surfaces after manufacturing, colored by the height from the substrate surface. In FIG. 6, the upper image shows a view from above, and the lower image shows a view from below, with the substrate material hidden, and the inset image highlights a void predicted during the build.

Grain Growth

Figure 7:
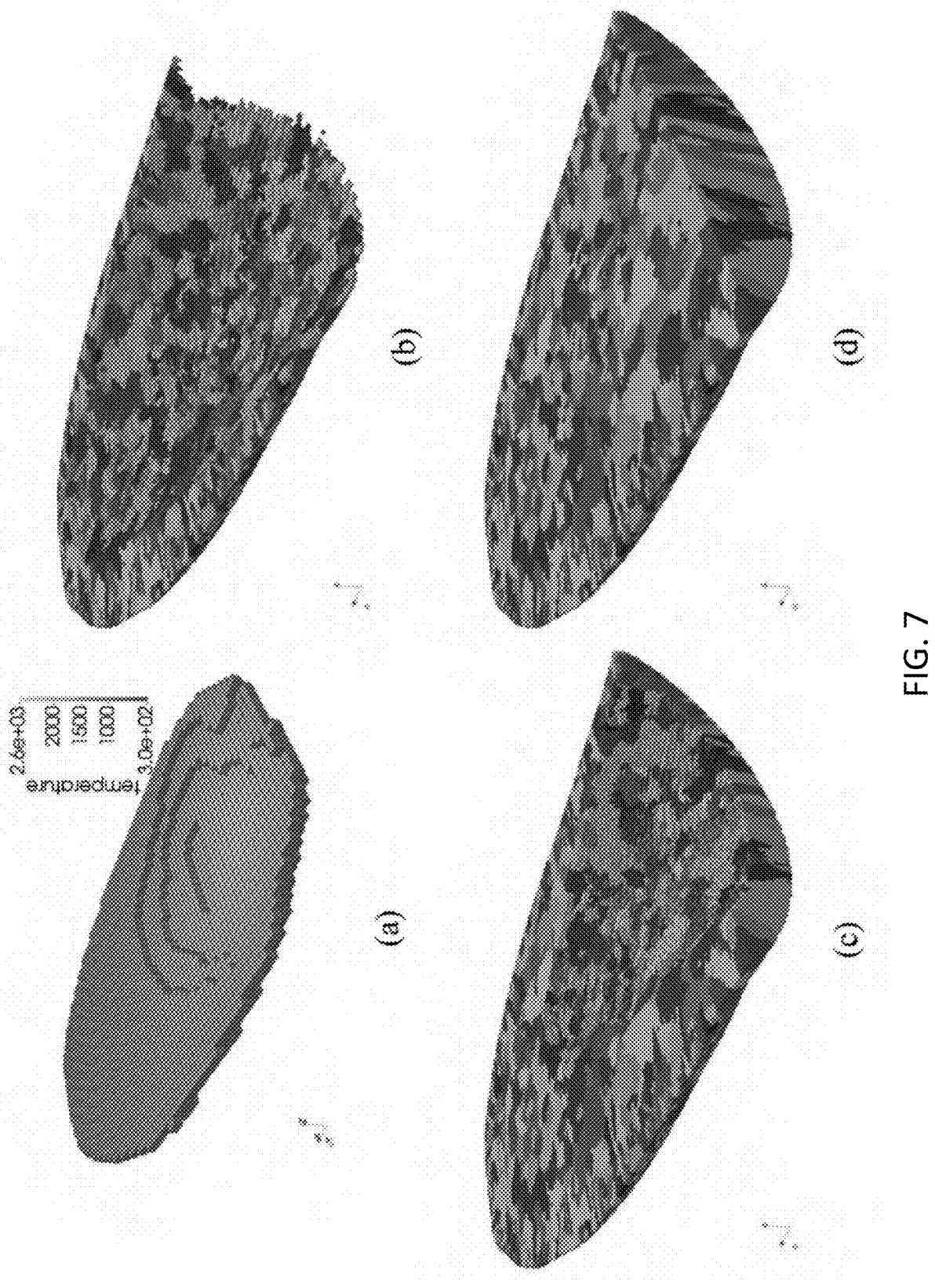
FIG. 7 shows a molten pool profile colored by temperature at t=0.157 ms (panel (a)) and evolution of the subsequent solidification microstructure represented by three snapshots at relative time: t=0.234 ms (panel (b)), t=0.438 ms (panel (c)), and t=0.931 ms (panel (d)), according to embodiments of the invention. Grain coloring is selected to maximize contrast between nearby grains.

This model predicts solidification front motion and grain growth given the thermal history; Panel (a) of FIG. 7 shows the molten pool temperature at t=0.157 ms. Panels (a)-(d) of FIG. 7 track the progression of the solidification front and the subsequent primary phase grain growth at t=0.234 ms, t=0.438 ms, and t=0.931 ms, where grain coloring is selected to maximize contrast between nearby grains. The emergence of columnar grains from an existing substrate is captured with qualitative similarity to experimental results which reports the cubic β-grain structure that forms during initial solidification. The CA model captures the growth of the primary β-phase. Sub-granular structures, such as dendrites, are not considered explicitly and thus cannot be observed.

Figures 8, 9:
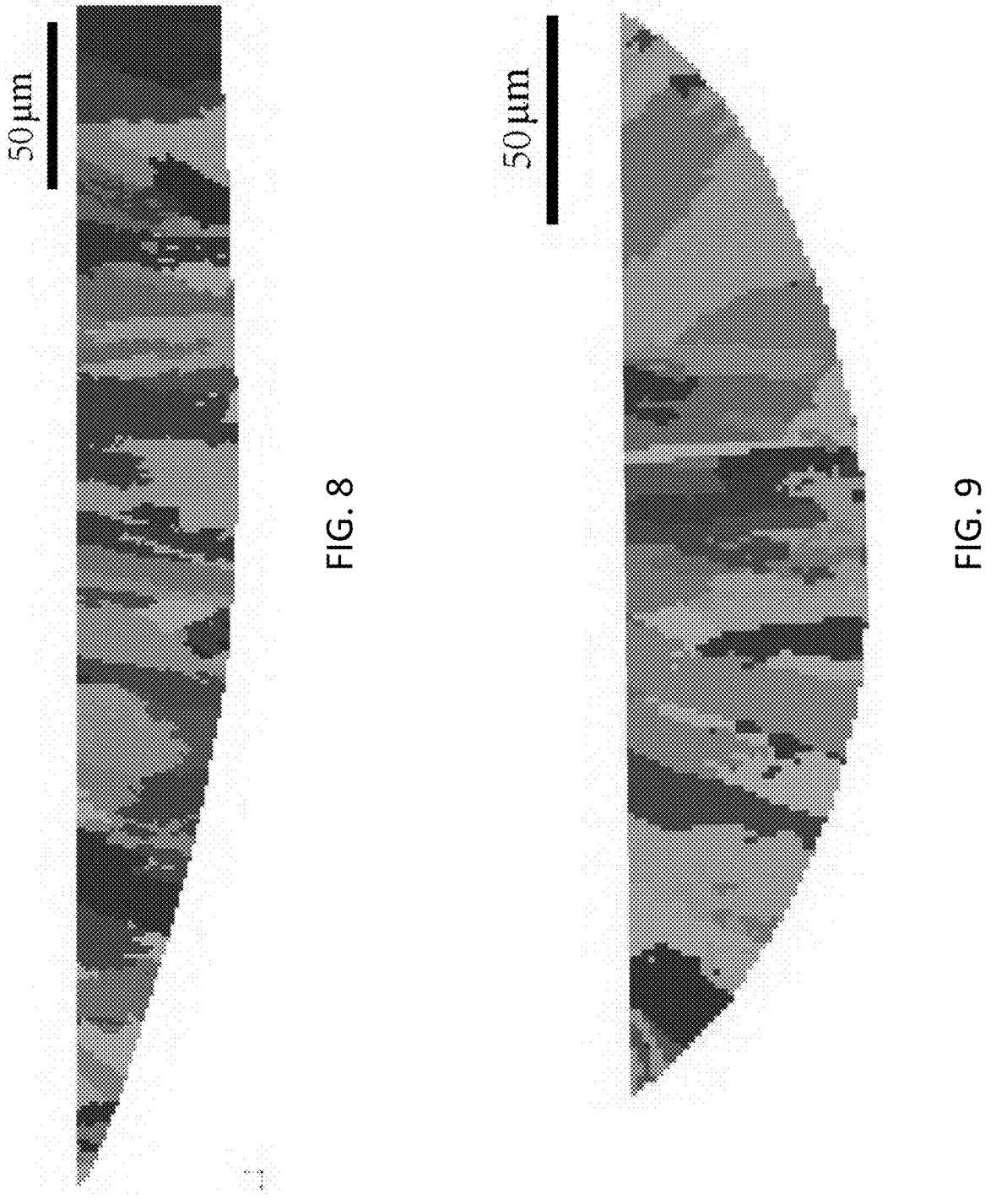
FIG. 8 shows a longitudinal cross section view of molten pool microstructure to show angled grain growth following the direction of motion of the heat source according to embodiments of the invention.
FIG. 9 shows a transverse cross section view of molten pool microstructure to show the radial distribution of grain growth according to embodiments of the invention.

Grains appear tilted in the direction of the heat source motion, showing a trend also observed in experiments and other simulations of grain growth during AM. This is shown by the longitudinal cross section view of the region of interest in FIG. 8. FIG. 9 shows a transverse cross section of the region with radial, epitaxial grain growth from the underlying material.

Mechanical Response Prediction

Figure 10:
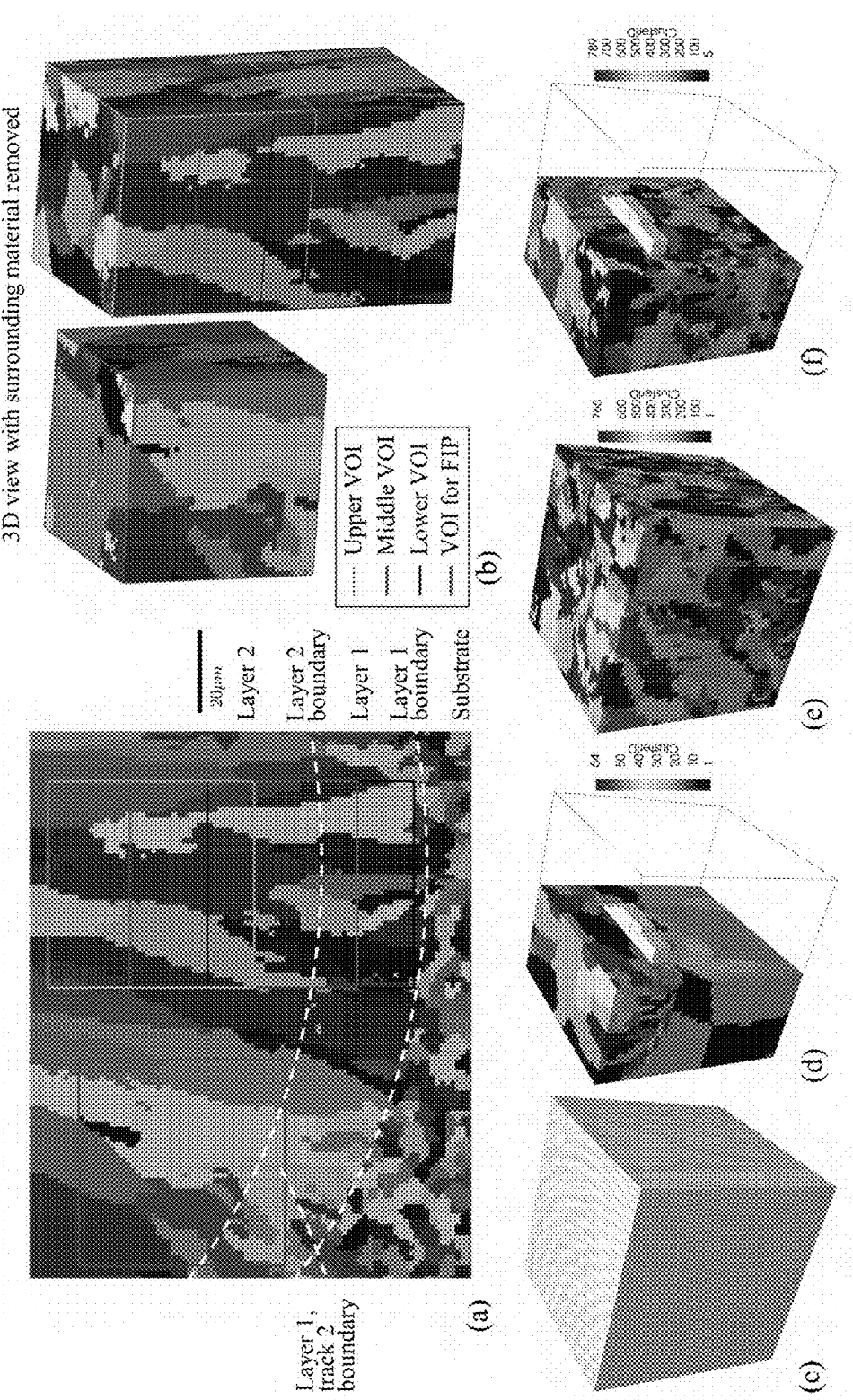
FIG. 10 shows embodiments of the invention: panel (a), a 2D section of the CA result with the relative locations of four cubic VOIs at different locations through the height of a two-layer build (color coded green, purple, and black to upper, middle, and one near the intersection of two tracks of the same build (red; for FIP with/without void), where the white dashed lines show approximate melt region boundaries for each layer, panel (b), these VOIs in 3D with the surrounding material removed, panel (c), the single crystal voxel mesh used for FIP prediction, panel (d), clustering used for the single crystal, with a void (white) case, panel (e), the clusters used for the polycrystal case, and panel (f), the clusters used for the polycrystal with void case.

When run without the CA module, we assume a single crystal oriented such that the Schmid factors, the products of the glide plane and glide orientation cosines, are maximized: the weakest orientation, representing a "worst-case" analysis. A more realistic, polycrystalline grain structure enabled by the CA model allows us to capture some of the effects of the crystalline texture on the material response. Panels (a)-(b) of FIG. 10 show four polycrystalline VOIs selected from the CA solution for a two-track, two-layer simulation. Three VOIs are selected throughout the height of the build (the black, purple, and green outlines) and a fourth VOI (red outline) is selected from the intertrack area. The fourth region in the CA volume is selected because the intertrack area contains a large void caused by lack-of-fusion, predicted by the thermal-CFD model, that influences the fatigue life of the component. The void space is represented by a unique phase ID in both the thermal-CFD results and the CA results and is interpreted as a void by the SCA model. When the framework is used without the CA model, the void space is directly passed to SCA, again through a unique phase ID in the voxel database, and is passed via the CA model when the CA model is used. As shown in FIG. 10, panel (b) illustrates these VOIs in 3D with the surrounding material removed; panel (c) illustrates the single crystal voxel mesh used for FIP prediction; panel (d) shows clustering used for the single crystal, with a void (white) case; panel (e) shows the clusters used for the polycrystal case; and panel (f) shows the clusters used for the polycrystal with void case.

Anisotropic Response of the Polycrystalline VOIs

Figure 11:
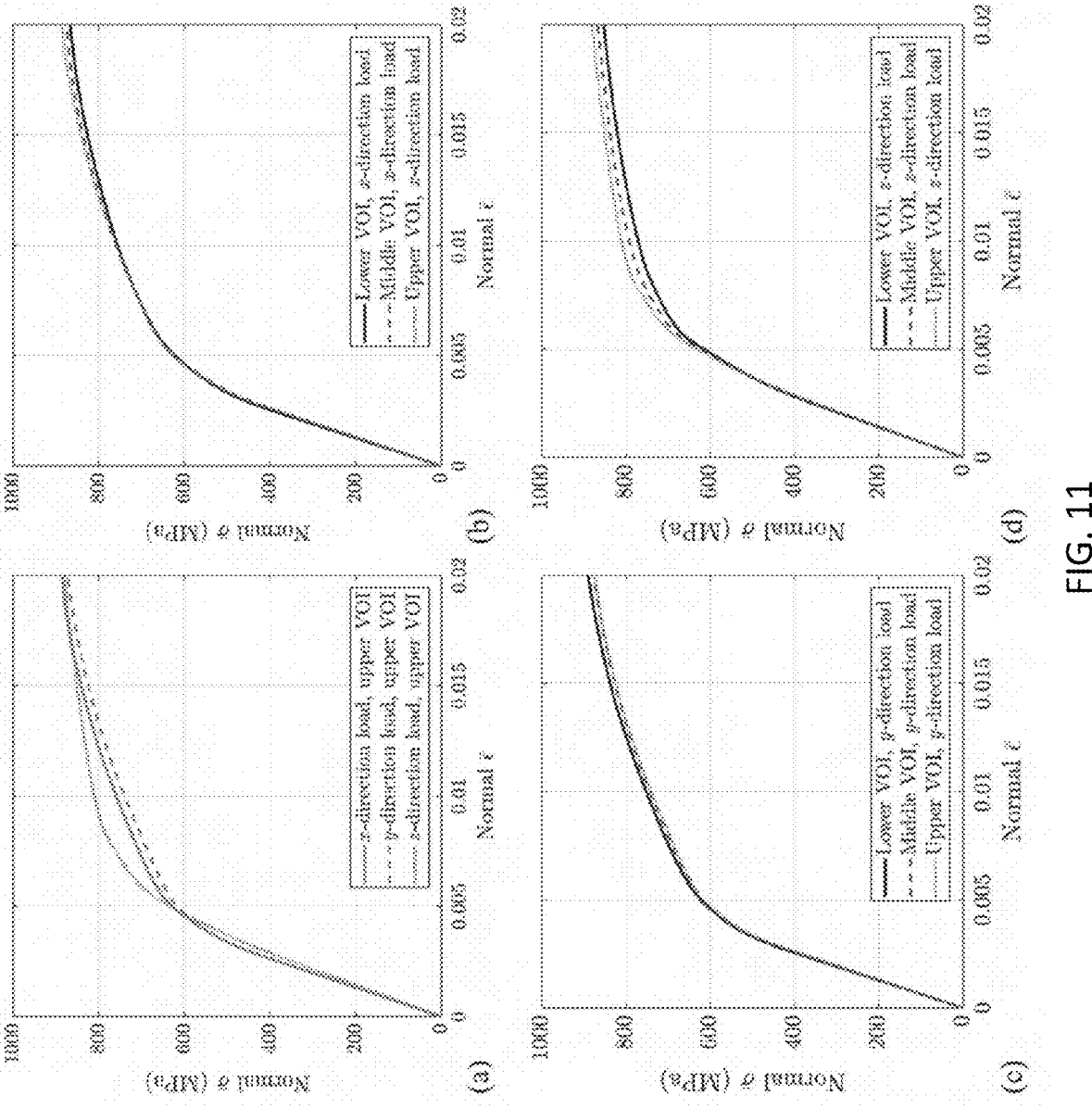
FIG. 11 shows stress-strain curves predicted by SCA with CP at the strain rate of $10^{-4}$ s$^{-1}$, according to embodiments of the invention. Panel (a) is for the upper VOI showing the anisotropy of overall response, for all VOIs. The response for each VOI is given for x-direction loading in panel (b), y-direction loading in panel (c), and z-direction loading in panel (d).

For the polycrystalline case, where the CA model is employed, the anisotropic stress-strain response at the strain rate of $10^{-4}$ s$^{-1}$ for the first three VOIs with loading in the x-, y-, and z-directions is shown in FIG. 11; an anisotropic and location dependent response emerges from the crystallographic structure. Each of these VOIs are 40 voxels×40 voxels×40 voxels. A voxelated mesh is constructed directly from the VOI, with material properties assigned to each voxel corresponding to the known properties for the crystal predicted by the CA model. The periodic boundary condition assumption can result in spurious stress localizations near the boundary of these volumes. To counteract this, the five surface layers of voxels are neglected for the results presented below. This is similar to the relatively common "buffer zone" approximation.

Performance Prediction: Fatigue Crack Incubation Life

Relative values of $N_{inc}$ or FIP can provide insight into the impact a particular defect, or perhaps a class of defects such as lack of fusion voids, has upon the expected lifetime of the material under cyclic loading. For example, here we compare the computed FIP value for four different VOIs. The first two show results using the framework without the CA model, and the second two show results with the CA model. In each of these sets, one result is taken from Case 1 (which exhibits voids) in Table 1-3 and the other is from Case 2 (where no voids are observed).

The first is a reference VOI: a simple single-crystal cube, representing a defect-free build (without the CA model). The second VOI is the same single-crystal cube, this time with a void predicted by the thermal-CFD model. This comes from Case 2 in Table 1-3, where larger hatch spacing results in insufficient fusion. The third VOI incorporates the CA model, making this a polycrystalline simulation. The fourth VOI adds the void to the polycrystalline volume. The simple, cubic voxel mesh underlying all four of these VOIs is shown in panel (c) of FIG. 10. The subsequent panel (d)-(f) of FIG. 10 show the clusters used for SCA, computed from the elastic DNS, for the latter three RUCs, respectively.

Figure 12:
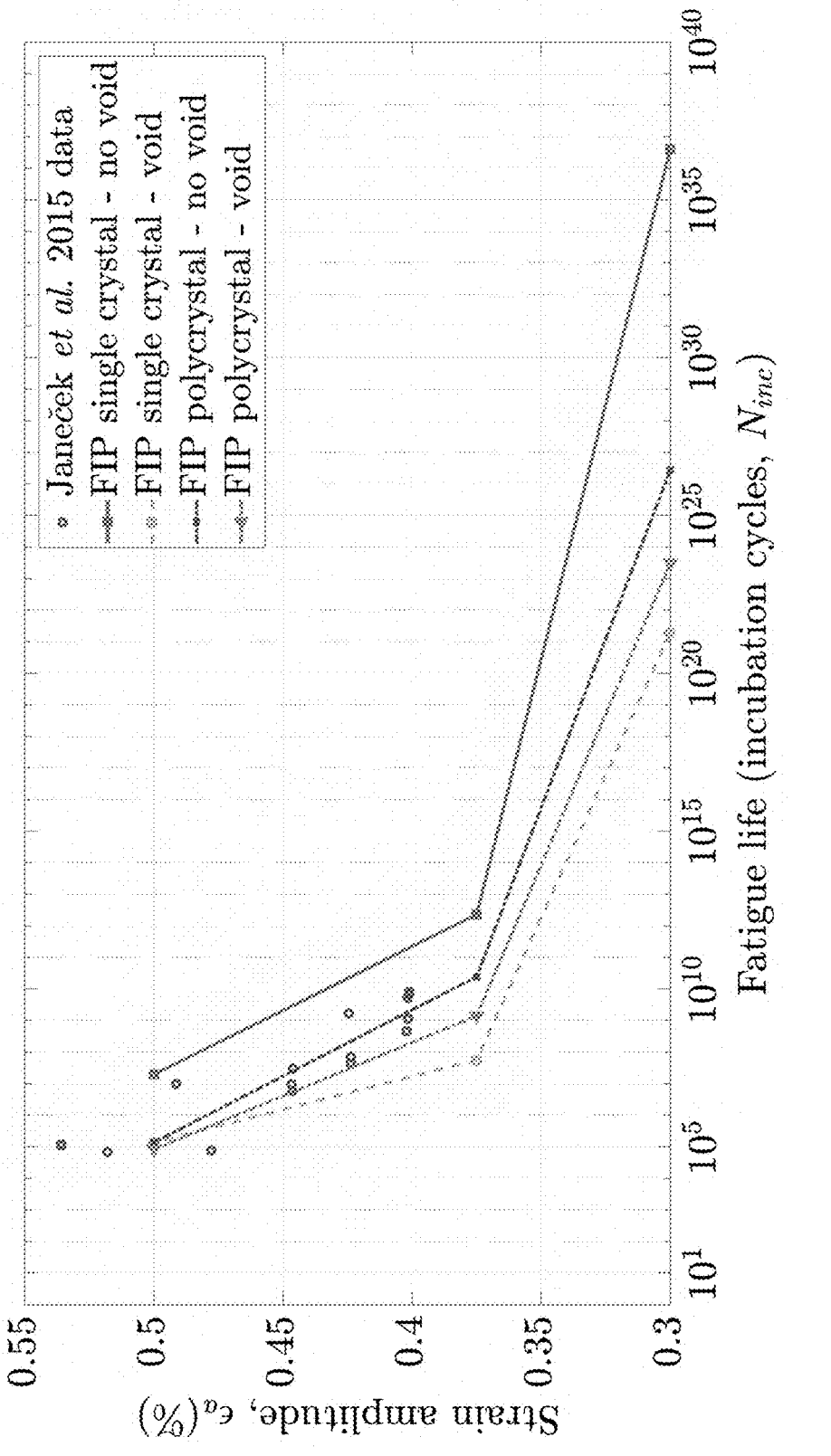
FIG. 12 shows experimental strain life data (points) for HCF, and four predictions of fatigue life according to embodiments of the invention: (1) a single crystal without any defects (baseline data), (2) a single crystal with a void predicted with the thermal-CFD model, (3) the full polycrystalline fatigue VOI shown in FIGS. 10, and (4) this same growth pattern, including a void.

FIG. 12 shows experimental strain life data (points) for HCF, and four predictions of fatigue life: (1) a single crystal without any defects (baseline data), (2) a single crystal with a void predicted with the thermal-CFD model, (3) the full polycrystalline fatigue VOI shown in FIGS. 10, and (4) this same growth pattern, including a void. In the single crystal condition without a void there are no stress localizers, and the highest life is expected. The introduction of a void decreases the expected life substantially, as local stress concentrations occur around the void. In the polycrystalline VOI grain boundaries act as stress localizers, and even without a void the fatigue life is reduced from the reference VOI; however, the introduction of a void has less impact than in the single crystal VOI, since the worst case configuration—a high Schmid factor grain near the void—has not occurred. The extremely high predicted life at very low strain amplitude is likely because our current model does not capture the transition of failure mechanism thought to occur between high cycle fatigue and ultra-high cycle fatigue in Ti-6Al-4V. While not necessarily meaningful, it does not impact the current demonstration of the framework unduly.

The trends between different cases match qualitatively with experimental results demonstrated for SEBM. Subjecting the material to hot isostatic pressing (HIP) is known to suppress voids, whereas heat treatment and as-built material retains any voids introduced during manufacturing. Thus, HIP SEBM results and non-HIP SEBM results are comparable to the polycrystal no-void and void results respectively shown in FIG. 12: in both the simulation and experiment reduction of void content results in higher fatigue life.

This set of examples shows that the framework and models here can capture, at least qualitatively, the influence of process parameters (hatch spacing in the example shown) on expected material performance. This influence is captured by directly considering the change in material structure, i.e., the introduction of a void cause by the lack of fusion, that results from a change in the processing conditions. The method presented is general: the impact of process parameter selection upon expected material performance can be predicted using this framework. Further, we have demonstrated that the framework is flexible enough that models can be added, removed, or exchanged depending on the level of detail desired. In this case, we show the framework operating both with and without a prediction of grain growth via the CA model.

In sun, we have demonstrated a process-structure-properties-performance prediction framework for additive manufacturing that connects models for each aforementioned stage and requires only basic material properties and processing conditions. The framework provides a means to capture AM process that is extensible and flexible: additional models could be included (e.g., post-processing), and different types of analysis could be considered (e.g., continuum scale). This implementation contains microscale models that incorporate relevant processes and conditions for selective electron beam melting of Ti-6Al-4V. This enables computational design of the SEBM process, at least within the constraints of model applicability, using parameters derived from AM machines, raw powder, and studies of wrought material.

Outlook for the individual modules: The largest limitation of the thermal-CFD model currently is the lack of an explicit gas or vapor phase. This prohibits the prediction of pores due to entrained gas. Residual stress, an important factor in all AM processes, is also not captured. This important facet is the focus of ongoing work.

One limitation of the current grain formation model is the inability to predict solid-state phase transformations during reheating. Thus, this prediction is thought to be applicable to the final layer of a build; reheating due to subsequent passes of the beam for interior layers is known to cause grain coarsening and solid state phase transformation. However, the grain shape predicted is that of the $\beta$-phase (bcc), but $\alpha$ and $\alpha+\beta$ is known to be dominant in the final part. Under solid state phase transformations, the $\beta$ to $\alpha$ transition creates smaller, $\alpha$ grains from the parent $\beta$-phase; from this, a material with mixed $\beta+\alpha$ is usually expected. There is ongoing work to develop a module that captures solid state phase transformations and grain coarsening effects, but this a work in progress. It would be possible to include such a model in the framework presented here, but the simulations shown do not capture all the details of a multipass build in which a series of phase transformations have taken place.

The SCA model, though faster than equivalent FEM models, is still limited in the number of grains it can capture by the computational complexity of the CP model. Very large deformation predictions may be inaccurate, since grain boundary motion is not captured and other relatively more complex modes are discounted. Furthermore, even though the grain geometry used is that of the $\beta$ phase, mechanical properties of the $\alpha$ phase (hcp) are used to more realistically capture mechanical behavior. This may be a reasonable approximation, and could easily be corrected if a model for solid state phase transformation is introduced.

Outlook for the framework: We claim the framework demonstrated here is sufficiently general to include macroscale simulations, if needed, or any other related module required. We show the addition of a CA model as an example of this. However, one could envisage the addition of further hubs. One option would be a design hub, which might include modules for CAD/CAE tools, slicing and machine control, and/or topological optimization. Another possible hub might implement models to capture post-processing steps such as hot isostatic pressing (HIP), heat and/or chemical treatment, and surface finishing.

Example 2

Implementation and Application of the
Multiresolution Continuum Theory

The multiresolution continuum theory (MCT) is implemented in FEA with a bespoke user defined element and materials. In this exemplary study, we focus on the formulation and implementation of the MCT model. A simple dog-bone model is used to validate the code and study the effect of microscale parameters. The ability of the MCT method to simulate the propagation of a shear band in simple shear geometry is shown. The length scale parameter is demonstrated to influence shear band width. Finally, we present a simulation of serrated chip formation in metal cutting, a case where accurate prediction of shear band formation is critical. The advantages of the MCT over conventional methods are discussed. This work helps elucidate the role of the length scale and microscale parameters in the MCT, and is a demonstration of a practical engineering application of the method: the simulation of high speed metal cutting (HSMC).

Implementation of Multiresolution Continuum Theory

Overview of Multiresolution Continuum Theory

In the multiresolution approach, deformation at a continuum point is decomposed into the homogeneous deformation and a set of inhomogeneous deformations; each inhomogeneous measure is associated with a characteristic scale in the microstructure. This introduces a set of microstresses in the governing equations that represent a resistance to inhomogeneous deformation. These extra degrees of freedom enable a microstructure scale resolution to to be obtained in the continuum solution while requiring much less computational effort than a detailed microstructure analysis. A general multiresolution framework is thus formulated in which:

(1) The material structure and the deformation field are resolved at each scale of interest.

(2) The resulting internal power is a multi-field expression with contributions from the average deformation at each scale, i.e., the overall properties depend on the average deformation at each scale.

(3) The deformation behavior at each scale is found by testing the micromechanical response. Constitutive relations can be developed at each scale.

An averaging operation is used to make the method consistent with continuum mechanics. FIG. 13 gives a schematic for the framework of a three-scale homogenization.

In the multiscale continuum, the kinematics of the body are described by a macro-velocity field, v, and (N−1) micro-velocity-gradient fields, where N is the number of scales. To enable its implementation in finite elements, we describe the internal (Eq. (2-1)), external (Eq. (2-2)) and kinematic (Eq. (2-3)) virtual power in variational form, as follows:

$$\delta P_{int} = \int_{\Omega}\left[\sigma:\delta D + \sum_{I=1}^{N-1}[\beta^I:\delta(D^I-D)+\overline{\beta}^I:\delta D^I\nabla]\right]d\Omega \tag{2-1}$$

$$\delta P_{ext} = \int_{\Gamma_I}\left[t\delta v + \sum_{I=1}^{N-1}T^I:\delta D^I\right]d\Gamma \tag{2-2}$$

$$\delta P_{kin} = \int_{\Omega}\left[\rho\dot{v}\delta v + \sum_{I=1}^{N-1}(\dot{D}^I I^I):\delta D^I\right]d\Omega \tag{2-3}$$

where the symmetry of the macro-stress, $\sigma$, allows us to use the rate of deformation, $D^I$, rather than the full velocity gradient. The microstresses, $\beta^I$, and microstress couples, $\overline{\beta}^I$, are defined as work conjugate to the relative microscale rate of deformation, $(\delta D^I-\delta D)$, and $\delta L^I\nabla$. Here, $$I^I = \frac{1}{\Omega^I}\int_{\Omega_I}\rho^I\otimes d\Omega_I$$

is defined as the inertial tensor at a microscale I, and $\rho = \overline{\tau}+\Sigma_{I=1}^{N-1}\rho^I$ is the macroscopic density plus each of the microscale densities. This description of kinematics discards the higher order terms and assumes no relative rotation between scales. The traction force and traction couple at each microscale are given by t and $T^I$. One could consider $\sigma$ to be the conventional Cauchy stress tensor, which is augmented by additional stress terms to define the mechanical response of much smaller heterogeneities within the material. Another way to say this is that the macroscale provides high-level homogenization of the stress while the microscale captures inhomogeneous deformation, perturbations about the homogeneous mean, caused by the microstructure.

The governing equations are as follows, $$(\sigma-\Sigma_{n-1}^N\beta^n)\Delta+b=\rho\dot{v}\ \text{in}\ \Omega \tag{2-4}$$

$$\nabla\cdot\overline{\beta}^n-\beta^n+B^n=\gamma\cdot I^n\ \text{in}\ \Omega \tag{2-5}$$

where b is the body force, $B^n$ is the body couple stresses which balance the micro-stress, and $\gamma$ is the micro acceleration. The boundary conditions are:

$$t-N\cdot(\sigma-\Sigma_n^N\beta^n)=0\ on\Gamma_t \tag{2-6}$$

$$R^n=r^nN=N\cdot\overline{\beta}^n:(NN)\ on\Gamma_t \tag{2-7}$$

there t is the traction force, $R^n$ is the double traction force, $r^n$ is the micro-acceleration at each scale. To solve the multiresolution continuum governing equations, the constitutive relationships $\dot{\sigma}(D)$, $\dot{\beta}^n(D^n-D)$, and $\dot{\overline{\beta}}^n(D^n\nabla)$ are required.

The MCT can be thought of as a generalization of Fleck and Hutchinson's strain gradient theory to an arbitrary number of scales with both micropolar and microstretch components. This broadens the applicability of the method. Furthermore, the governing equation of the MCT can be solved with a conventional FEM approach. The length scales can be related to the material microstructure, such as the spacing of voids and inclusions, which give it a more clear meaning than the intrinsic length scale of strain gradient theory, and is more easily derived from microstructure observation.

Implementation of the MCT

The multiresolution model developed in this study decomposes the deformation across different microstructural length scales. The macro deformation is described by conventional degrees of freedom and extra degrees of freedom are introduced to describe the deformation at the microscale. The macroscale is calculated based on standard continuum theory. The microscale includes micro-stretch D(1) continuum and micromorphic continuum D(1)+W(1) components. Therefore, the multiresolution continuum may be generalized to n microscales, and each scale can be micro-stretch D(n) or micromorphic D(n)+W(n). Each scale requires a user material.

FIG. 14 shows the relationships of the subroutines used in MCT implementation, where MCT_userMatMicroscale_*.f and MCT_userMatMacroscale.f are the user materials subroutines for the micro and macro domains. The auxiliary function subroutine MCT_auxFunc.f contains the functions that are used by both subroutines needed for the user element with the implementation of the MCT, such as Gauss integration, computation of inertia and the subroutines to calculate the strain and strain rate. It can be called by the user materials subroutines to finish the update of the stress and strain. The subroutine MCT_forceInt.f is used to calculate the internal force by calling the user materials subroutines and the auxiliary function subroutine. The parameter subroutine MCT_parameters.f gives the input parameters for user element, such as number of micro scales, number of Gauss points and number of history variables. The MCT_mass.f contains the subroutine used to compute the mass matrix for the user element. These three subroutines are called by the user element subroutine for each solve.

Macroscale Material Model

A modified version of the classic homogenization-based Gurson (GTN) model is employed at the macroscale. An additive decomposition of the rate of deformation tensor, D, into elastic and plastic parts allows for the description of an objective rate of Cauchy stress. The material flow rule is:

$$\Phi(\sigma, Q) = \left(\frac{\sigma_{eq}}{\sigma_y}\right)^2 + 2q_1 \cosh\left(\frac{2q_3 \sigma_m}{2\sigma_y}\right) - (1 + q_2 f^2) \qquad (2\text{-}8)$$

where $\sigma_{eq}$, $\sigma_y$, and $\sigma_m$ are the equivalent, yield, and hydrostatic stresses for the matrix, $q_1$, $q_2$, $q_3$ are material constants added to the original Gurson model to improve the prediction result, and f represents the current void volume fraction. The evolution of void volume fraction is taken as the sum of void growth and void coalescence rates, such that $$\dot{f} = \dot{f}_g + \dot{f}_c \qquad (2\text{-}9)$$

with, $$\dot{f}_g = (1 - f) tr(\dot{D}_p) \qquad (2\text{-}10)$$

$$\dot{f}_c = k_w f \omega(\sigma) \frac{S : D^p}{\sigma_e} \qquad (2\text{-}11)$$

Where $\dot{f}_g$ is the void growth rate, $\dot{D}_p$ is the rate of plastic deformation, $\dot{f}_c$ is the rate of void coalescence, and A is the acceleration factor. A power law hardening relationship is used, given by $$\overline{\sigma} = \sigma_{y0}\left(1 + \frac{\overline{\epsilon}}{\epsilon_0}\right)^n \left(1 + \frac{b(1 - \exp[c(T - T_r)])}{\exp(cT)}\right) \qquad (2\text{-}12)$$

where $\overline{\sigma}$ is the flow stress, $\sigma_{y0}$ is the initial yield stress, $\overline{\epsilon}$ is the equivalent plastic strain, $\epsilon_0$ is the reference strain, T is the temperature and can be calculated by $$T = \frac{0.9\overline{\sigma}\overline{\epsilon}}{\rho C_p},$$

$\rho$ material density and $C_p$ is the specific heat, $T_r$ is the room temperature, n, b and c are material constants.

An iterative Newton-Raphson scheme is used to solve the resulting equations at each step. The void volume fraction f, effective plastic strain rate $\dot{\overline{\epsilon}}$, and matrix flow stress $\sigma_y$ are all updated based on the new D. The homogenized void growth behavior is taken to represent the response of the primary population of voids, including those initiated at inclusions, as the material is deformed. As the material damages, its ability to resist load degenerates and eventually vanishes.

This is captured by using a modified the void volume parameter, f*, that causes damage to accelerate after a critical void volume fraction called the coalescence point, $f^{crit}$, has been reached. At $f^{ult}$, the material is considered to have lost its load carrying capacity, and that element is removed. Specifically, this is defined by $$f^* = \begin{cases} f & \text{for } f < f^{crit} \\ f^{crit} + \frac{\partial f}{\partial f^*}(f - f^{crit}) & \text{for } f^{crit} < f < f^{ult} \\ f^{ult} & \text{for } f > f^{ult} \end{cases} \qquad (2\text{-}13)$$

$$\frac{\partial f}{\partial f^*} = \begin{cases} 1 & \text{for } f < f^{crit} \\ \frac{q_1^{-1} - f^{crit}}{f^{ult} - f^{crit}} & \text{for } f^{crit} < f < f^{ult} \\ 0 & \text{for } > f^{ult} \end{cases} \qquad (2\text{-}14)$$

Microscale Material Model

At the microscale, the microstress $\beta$ and microstress couple $\overline{\beta}$ are used to construct the plastic potential:

$$\Phi = \sigma_e^H - \sigma_y(E^p) \qquad (2\text{-}15)$$

With $\sigma_e^H$ given by $$\sigma_e^H = \sqrt{\frac{3}{2}\beta^{I,dev} : \beta^{I,dev} + \left(\frac{\sqrt{18}}{l^I}\right)^2 \overline{\beta}^{I,dev} : \overline{\beta}^{I,dev}} \qquad (2\text{-}16)$$

where I indicates the $I^{th}$ concurrent microscale, and the deviatoric part of the microstress and microstress couple are given by $$\beta^{dev\nabla} = 2G^I \overline{D}^{Ie} \qquad (2\text{-}17)$$

$$\overline{\beta}^{dev\nabla} = \frac{l^I}{12} 2G^I (D^I)^e \qquad (2\text{-}18)$$

where $D^I$ is easiest defined in indicial notation as $$D_{ijk}^I = \frac{1}{2}\left(L_{ij,k}^I + L_{ij,k}^I\right).$$

The deviatoric strain rate, $$\tilde{D}' = \tilde{D} - \frac{1}{3}tr(\tilde{D}),$$

is defined in terms of the relative deformation between the micro and macro scales, given by: $\tilde{D} = D^I - D$. In this work, the superscript I is neglected, as only one micro is used. The hardening relationship is given by $$\overline{\sigma}^{(1)} = \sigma_{y0}^{(1)}(1 + d\overline{\epsilon}^{(1)}) \qquad (2\text{-}19)$$

where $\overline{\sigma}^{(1)}$ is the flow stress for scale (1), $\sigma_{y0}^{(1)}$ is the initial yield stress, $\overline{\epsilon}^{(1)}$ is the equivalent plastic strain, and d is a material constant.

Validation of Code and Study of Effect of
Microscale Parameters

Validation

If these equations are implemented correctly, the solution should reduce to that of a standard element when the microscale is turned off. We first do this comparison to validate our code. First, one microscale is used for the dog-bone model shown in FIG. 15. The geometry is 36 mm×24 mm×4 mm, and contains 22840 elements. The bottom surface of the dog-bone is fixed, and the top is given a fixed displacement.

For simplicity of these tests, we set $q_1=q_2=q_3=0$ in the macroscale material laws, so it reduces to $$\Phi=\bar{\sigma}^2-\sigma_{eq}{}^2=0 \tag{2-20}$$

This is a standard J2 yield criterion. Quasi-static state and dynamic compression mechanical properties experiments on hardened AISI 1045 steel (45HRC) are performed at a range of temperature from 20 to 800° C. and strain rate from $10^{-3}$ to $10^4$/s by electronic universal testing machine and Split Hopkinson Pressure Bar. From which the stress-strain curves are obtained. The material parameters used in macroscale can be calibrated by fitting the curves of stress and strain and are listed in Table 2-1. The materials parameters used in microscale are determined, the length scale is ascertained by considering the controlling microstructural space, in this case the void spacing, as listed in Table 2-2

TABLE 2-1

| Material constants for J2 used in the macroscale law for hardened AISI 1045 (HRC45) | | | | | | | | |
|---|---|---|---|---|---|---|---|---|
| E (GPa) | μ | ρ (kg/m³) | $\sigma_{y,0}$ (GPa) | n | b | c | $\varepsilon_0$ | $C_p$ (J/kg · K) |
| 200 | 0.3 | 7760 | 0.7827 | 0.14 | 0 | 0.00793 | 0.03 | 465 |

TABLE 2-2

| Material constants used in the microscale law for AISI 1045 (HRC45) | | | |
|---|---|---|---|
| E (GPa) | μ | $\sigma_{y,0}$ (GPa) | l (m) |
| 20 | 0.3 | 0.078 | 0.02e-3 |

Figures 16, 17, 18:
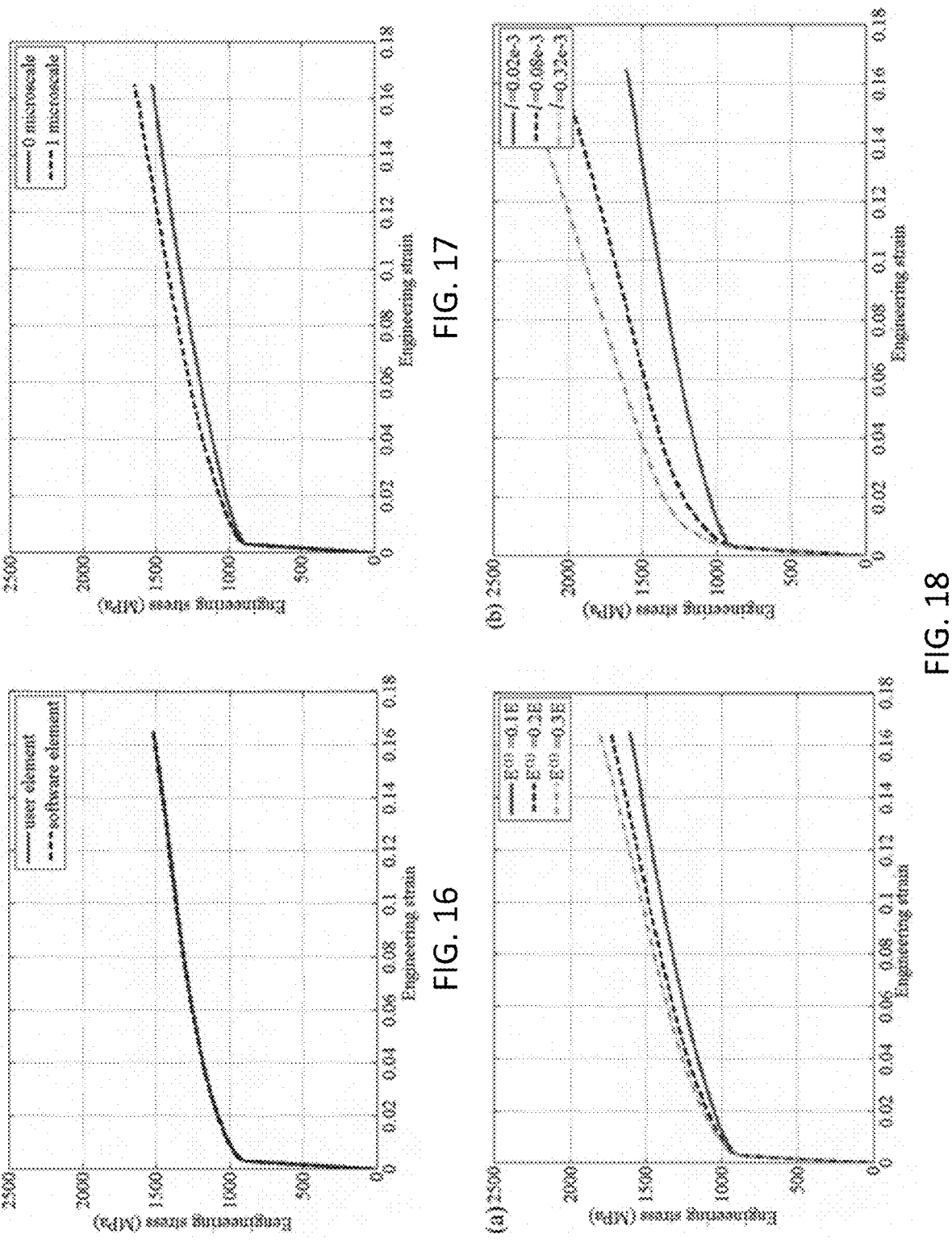
FIG. 16 shows comparison of a user element and a standard element according to embodiments of the invention.
FIG. 17 shows comparison of the results with and without microscale according to embodiments of the invention.
FIG. 18 shows influence of microscale parameters for a purely elastic behavior used for the microscale (panel a) Young's modulus and (panel b) length scale according to embodiments of the invention.

The comparison of the simulation results for a standard element and the user defined element is shown in FIG. 16. The stress-strain curves are the same. This indicates that the macroscale portion of the code produces the expected results. When MCT is used, different material behavior is exhibited, as shown in FIG. 17. The microscale tends to resist inhomogeneous deformation, therefore a larger stress at the same strain is measured when the microscale is enabled.

Effect of Microscale Parameters

Figures 19, 20:
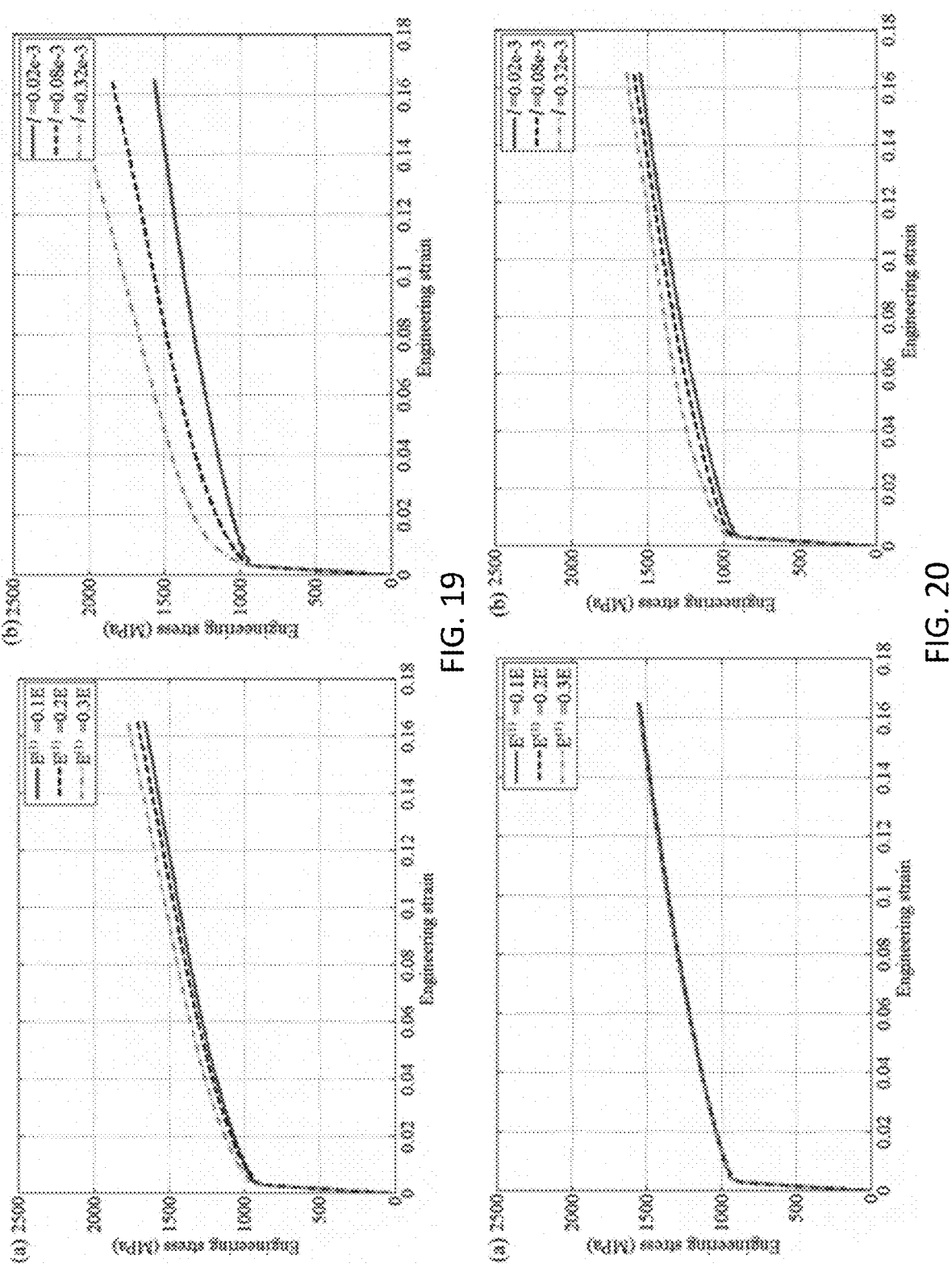
FIG. 19 shows influence of microscale parameters when plastic behavior with hardening is used for the microscale (panel a) Young's modulus and (panel b) length scale, according to embodiments of the invention.
FIG. 20 shows influence of microscale parameters for perfectly plastic behavior in the microscale (panel a) Young's modulus and (panel b) length scale, according to embodiments of the invention.
Figures 21, 22:
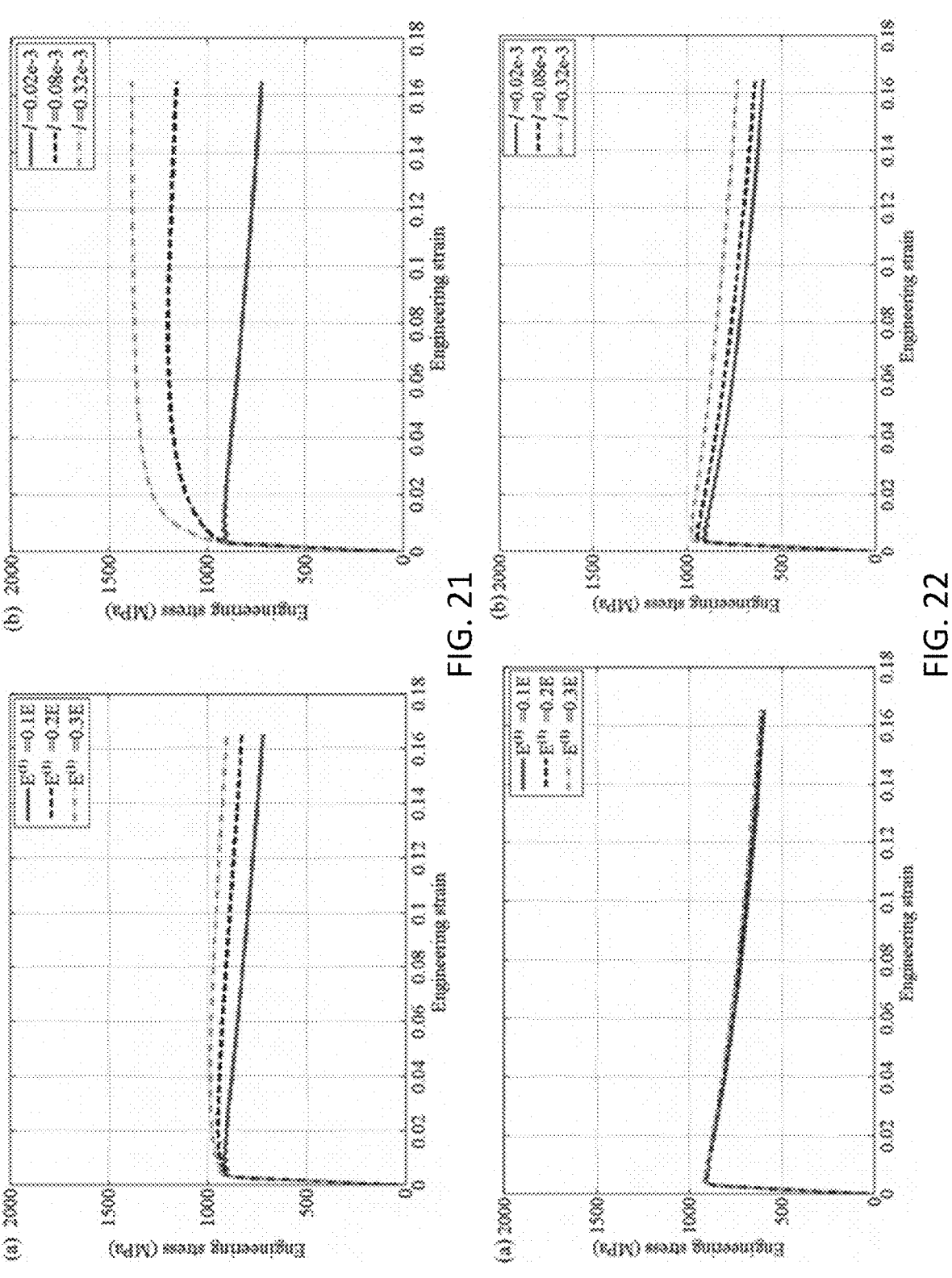
FIG. 21 shows influence of the microscale parameters on a thermal softening macroscale response for an elastic microscale material (panel a) Young's modulus and (panel b) length scale, according to embodiments of the invention.
FIG. 22 shows an effect of the microscale parameters on macroscale thermal softening when plastic behavior without hardening is used in microscale (panel a) Young's modulus and (panel b) length scale, according to embodiments of the invention.

The microscale parameters influence the macro strain-stress curves. FIGS. 18-22 show the effect of microscale parameters on the macro behavior under different conditions. The basic microscale parameters are the Young's modulus $E^{(1)}$ and length scale l. The influence of these two parameters is shown for five different sets of the remaining microscale parameters. FIG. 18 shows these effects when a purely elastic microscale material is used. The trend is that the equivalent stress increases with increasing $E^{(1)}$ or l. When plastic behavior for the micro scale is used, the effect of the microscale parameters depends on the hardening of the micro scale, as shown in FIGS. 19 and 20. If microscale hardening is used, the effect of Young's modulus $E^{(1)}$ and length scale l are reduced. For a perfectly plastic microscale material, the Young's modulus does not influence the overall stress-strain curve, and the impact of l is substantially reduced. Generalizing, when the slope of the stress-strain curve during plasticity for the microscale is smaller, the influence of Young's modulus is also smaller.

A thermally softening material (by setting b=0.15) may be used at the macroscale with similar results: the influence of length scale and Young's Modulus at the microscale varies between relatively large for a purely elastic material to relatively small for a perfectly plastic material, just as for the cases shown above.

Parallel Efficiency

A simple scaling study addressed the ability of a FEA code to operate in a parallel environment, and the impact that our user element formulation has upon that ability. This study was done using an illustrative dog-bone geometry, this time with 5250 elements and 20124 nodes.

Figures 23, 24:
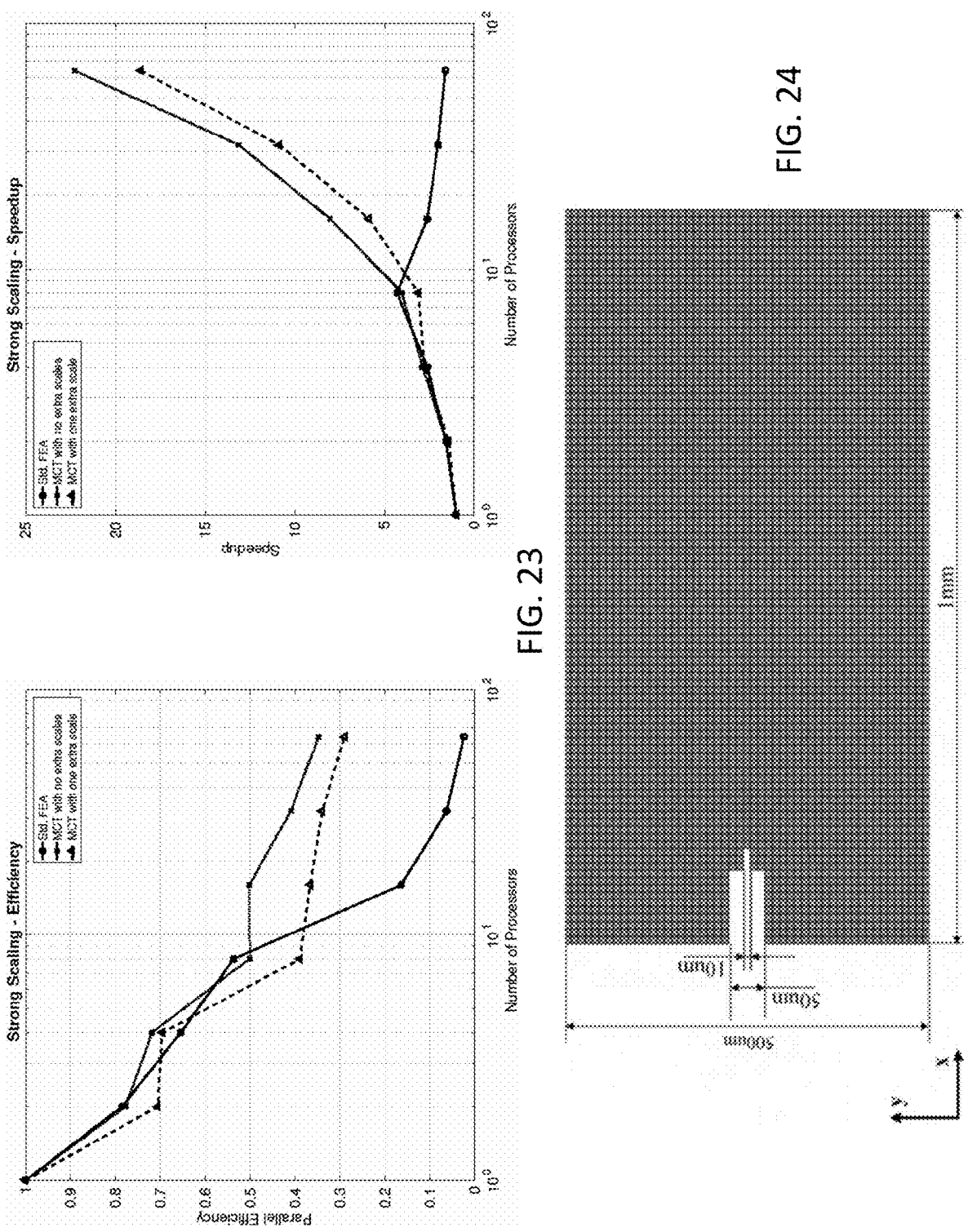
FIG. 23 shows comparison of efficiency and speedup under strong scaling for standard elements, MCT with no microscales, and MCT with one microscale, according to embodiments of the invention. The user element reduces the relative impact of communication and thus allows for a lower element count/processor count ratio.
FIG. 24 shows a finite element mesh for a simple shear geometry according to embodiments of the invention.

FIG. 23 shows the efficiency (left) and speedup (right) observed under strong scaling for three cases: a conventional 3D brick element with plasticity, the MCT element with only the macro scale, and the MCT element with one microscale. For reference, the total time for each of these simulations with one processor is 498 s, 30536 s, and 47589 s, respectively. The latter case demonstrates the impact of the added computations required to solve the material law at the microscale, while the former two cases demonstrate the impact of using the MCT element, absent of the additional solves required for the microscale, and a standard element on the same mesh. Note that because MCT is a multiscale solution, it is much slower on the same mesh but contain more information. These results seem to indicate that the added element-level work required by a custom user element decreases the relative communication penalties, allowing the MCT implementation to remain efficient even with a relatively low element count to processor count ratio, e.g., 82 elements/processor for the final 64 processor case. This study was performed on a 176 core, distributed memory cluster computer with eight cores/node. This means that, while MCT is slower in absolute terms than a conventional homogenizing plasticity law (and much faster than a direct numerical simulation of the microstructure), more processors may be used with relatively high efficiency to solve the same problem.

Simple Shear

MCT was applied to simulate shear band formation under simple shear, and the change of shear band width with mesh size and length scale was studied. The GTN model is used as the macroscale law with the material parameters shown in Table 2-3. The materials parameters used in the microscale are the same as those used in the dogbone model. An arbitrary length scale is used to demonstrate the effect of the length scale in the MCT model.

TABLE 2-3

| Partly material constants for the GTN model used as the macroscale law for AISI 1045 (HRC45) | | | | |
|---|---|---|---|---|
| $q_1$ | $q_2$ | $q_3$ | $f_{crit}$ | $f_{ult}$ |
| 1.5 | 1.0 | 2.25 | 0.15 | 0.37 |

Figure 25:
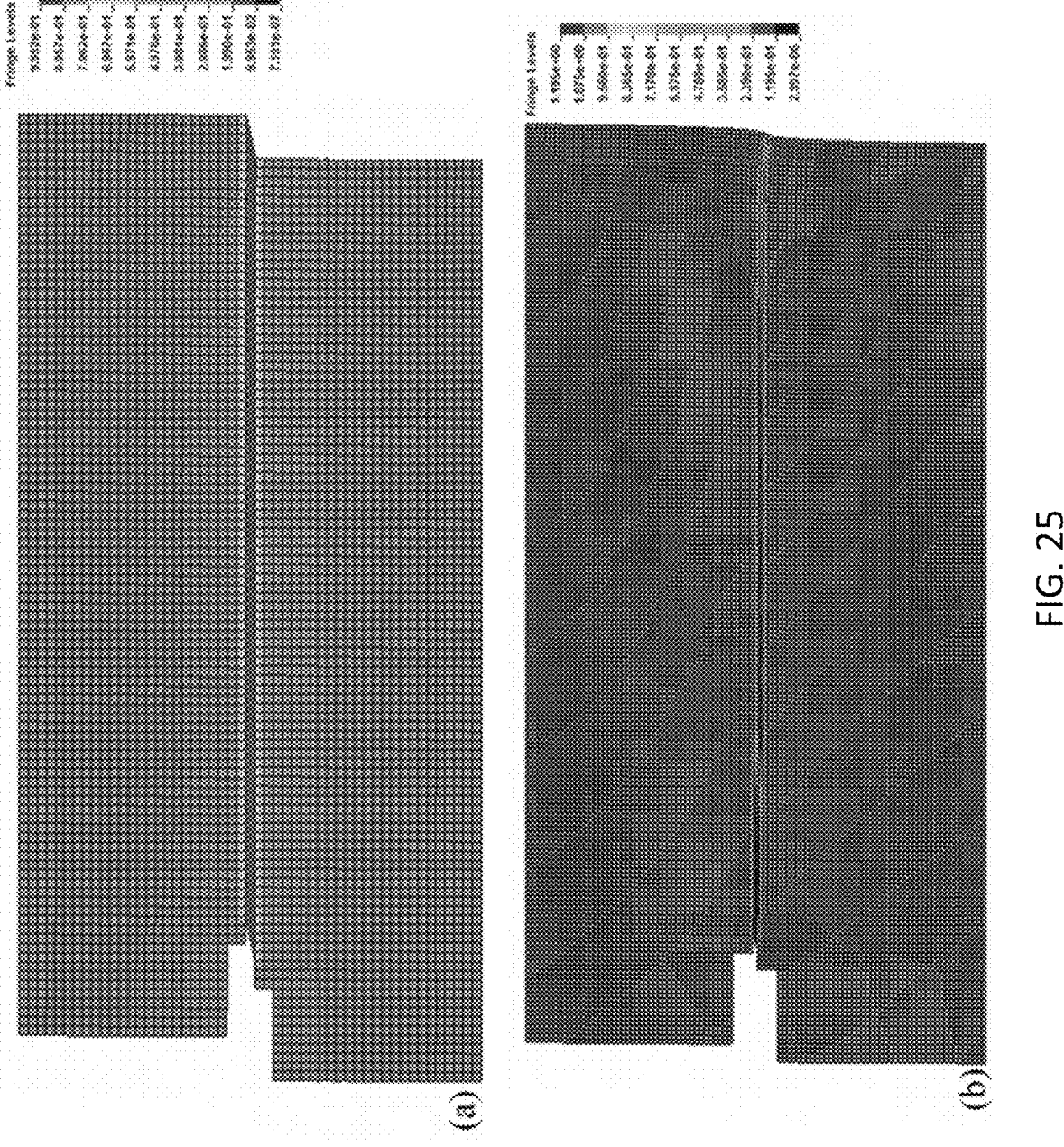
FIG. 25 shows shear band formation with conventional continuum FEM, fringes show equivalent plastic strain (panel a) coarse mesh and (panel b) finer mesh, according to embodiments of the invention.

To simulate a simple shear loading scenario, we use the model shown in FIG. 24. It has one element wide (10 μm) pre-crack. A constant velocity of 50 mm/s is instantaneously applied to the top surface of the domain in the x-direction. The top surface is constrained in the y-direction and the bottom surface is constrained in both the x- and y-directions. The continuum result with conventional FEA is shown in FIG. 25, where the shear band localized in one layer of elements. When a finer mesh is used, a similar shear band is observed to localize within one layer of elements, demonstrating that shear band formation is mesh dependent. Here elements with equivalent strain larger than 0.5 are considered to be in the shear band.

Figure 26:
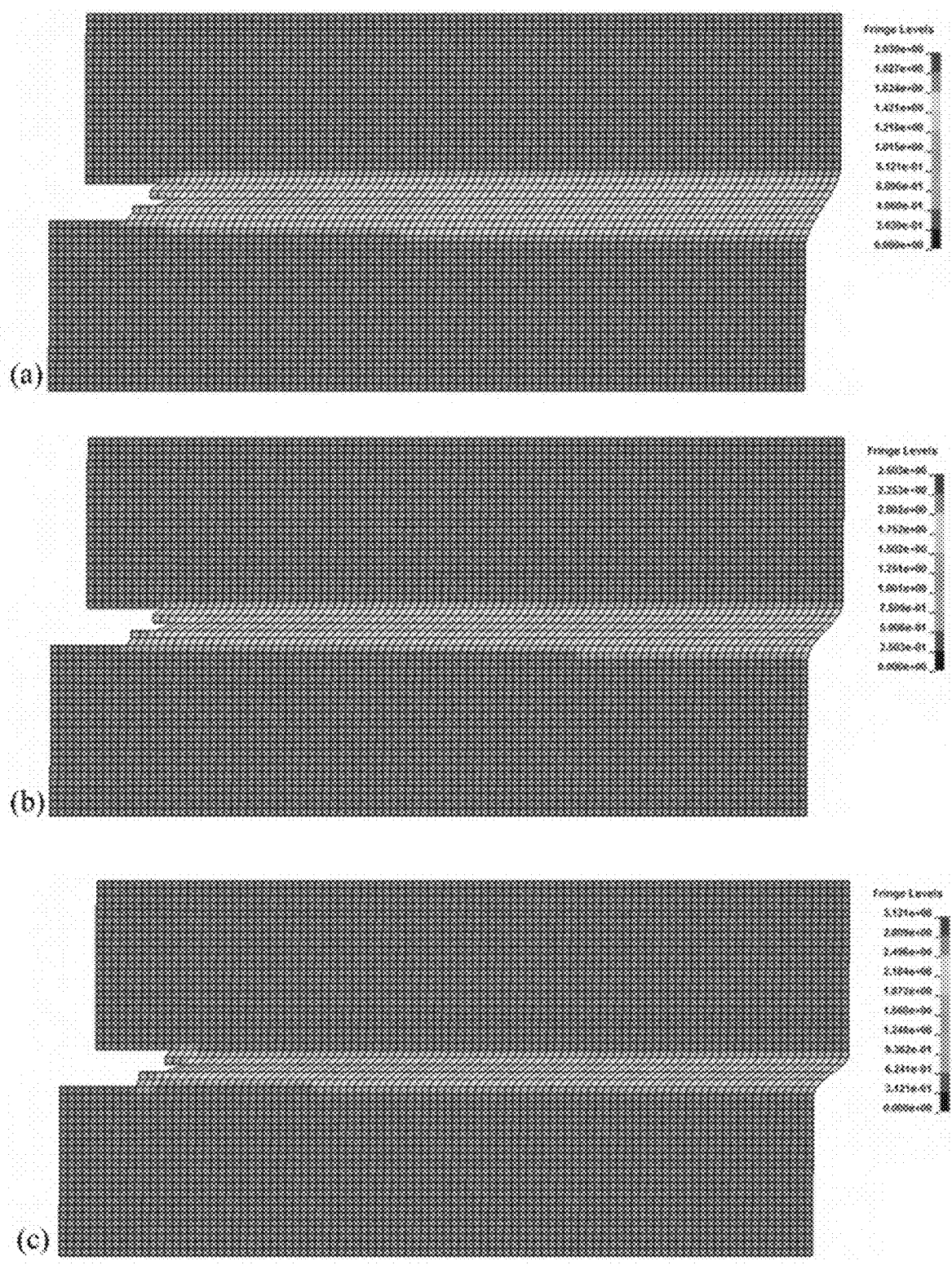
FIG. 26 shows simulation results under different length scale l ($E^{(1)}$=0.01E), fringes show equivalent plastic strain a) l=0.1 mm b) l=0.04 mm c) l=0.02 mm, according to embodiments of the invention.
Figure 27:
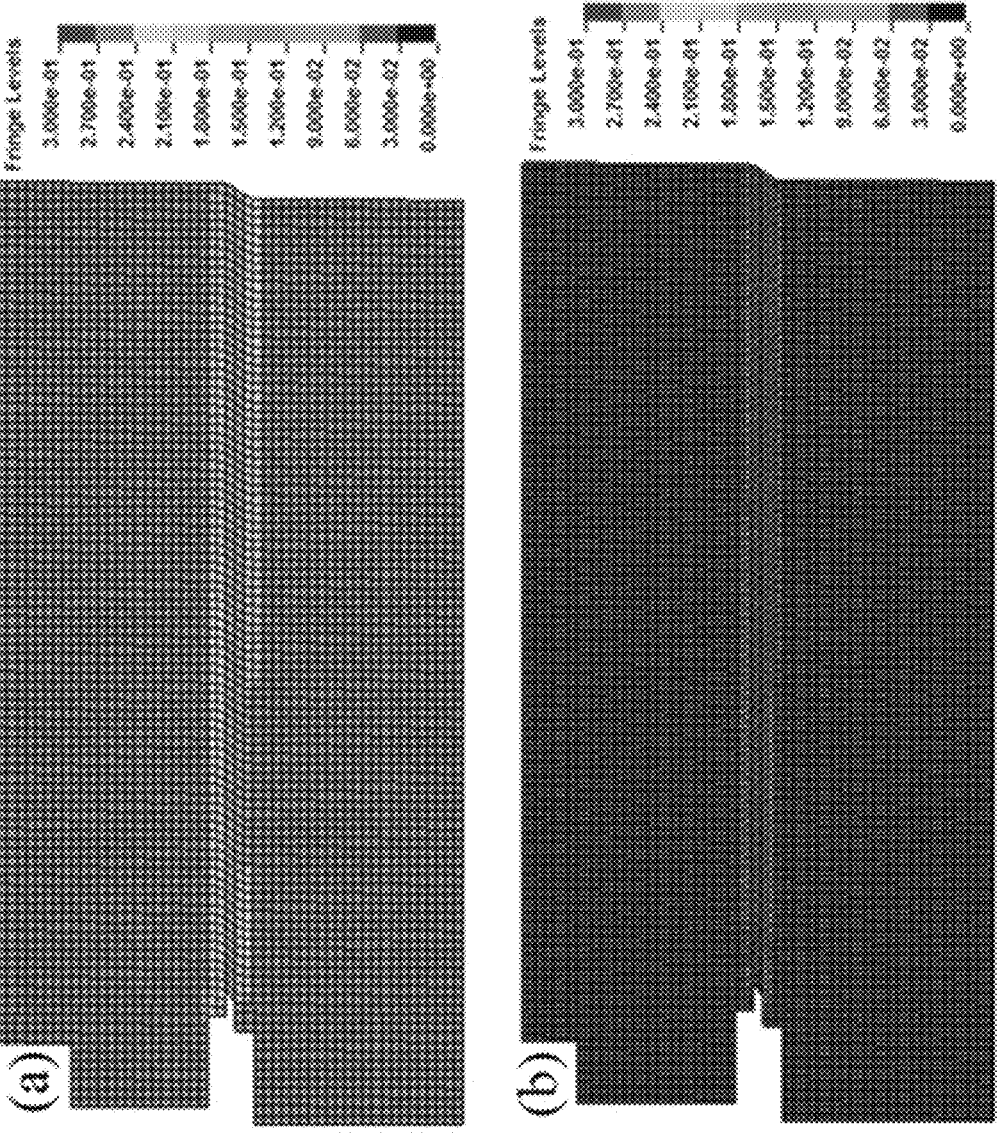
FIG. 27 shows comparison of shear band width for different mesh size, fringes show equivalent plastic strain (panel a) mesh size 0.01 and (panel b) mesh size 0.005, according to embodiments of the invention.

When the MCT is used, shear bands with consistent width, independent of mesh size, are predicted (panel (a) of FIG. 26. With a decrease of length scale, the width of shear band decrease (panels (b)-(c) of FIG. 26. In order to analysis the relationship between the shear band width and length scale, the width of shear band is defined as the distance between constant-strain fringes where the local total effective plastic strain is equal to 0.5. It can be given by the strain fringe pattern. We observe a nonlinear scaling between the width of the shear band and the length scale, as demonstrated in Table 2-4.

TABLE 2-4

| Influence of length scale on shear band width | |
|---|---|
| Length scale (μm) | Shear band width (μm) |
| 100 | 80 |
| 40 | 60 |
| 20 | 40 |

Figure 28:
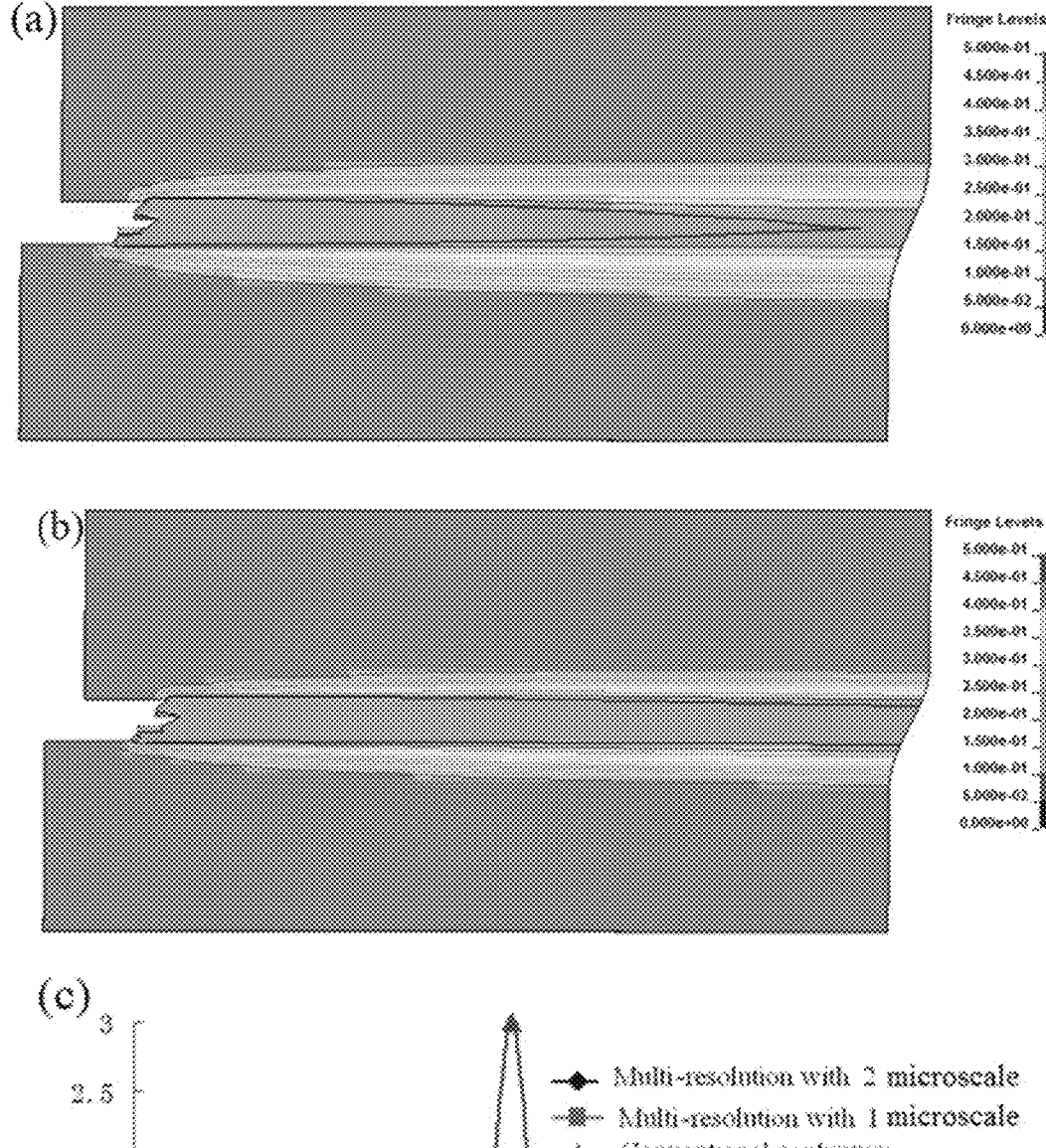
FIG. 28 shows MCT simulations with different numbers of microscales according to embodiments of the invention: (panel a), a MCT simulation with two microscales ($E^{(1)}$=0.01E, $l_1$=0.1 mm, ($E^{(2)}$=0.01$E^1$, $l_2$=0.05 mm), (panel b), a MCT simulation with one microscale ($E^{(1)}$=0.01E, $l_2$=0.1 mm), and (panel c), equivalent plastic strain distributions across the shear band.

When two microscales are activated in MCT for the model shown in FIG. 24, the difference in shear band formation is minor compared to the results from one microscale, as seen in panels (a)-(c) of FIG. 28 compares the strain distribution along the direction perpendicular to the shear zone. The width of the shear band is little larger, and the strain distribution is more uniform for two microscales than for one microscale.

The above comparison between one microscale and two microscales results shows that the MCT model with one microscale is sufficient to capture localization within the model. However, the two microscale result is smoother than the result of one microscale, as shown in FIG. 28. Thus, by applying different levels of length scale the shear band formation can be smoothed to different extents. When unrealistic shear band formation is observed compared to experiments, it may be possible to deploy different number of length scales to obtain a realistic shear band formation.

Application of MCT to Metal Cutting

Figure 29:
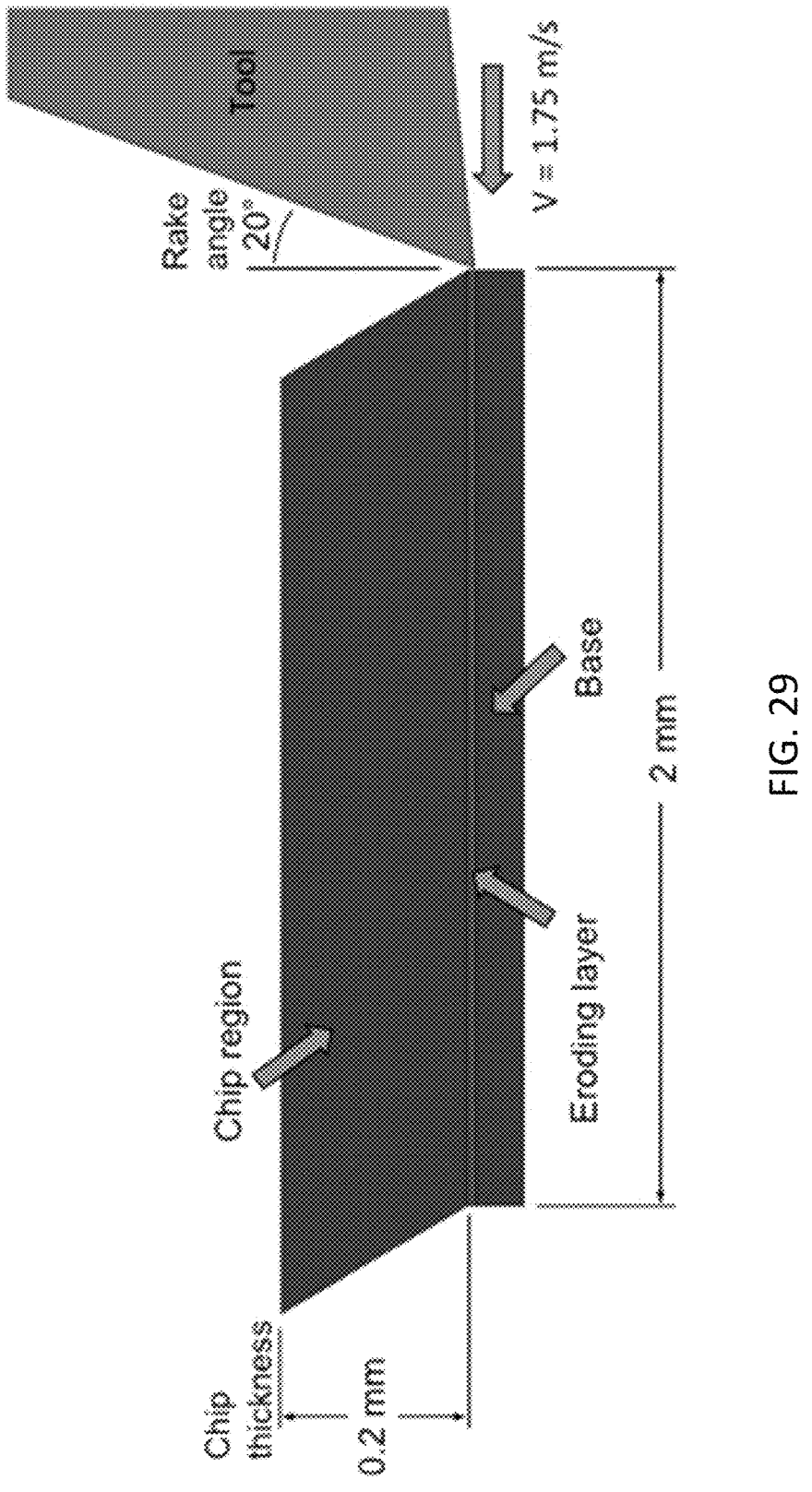
FIG. 29 shows shows geometry model of metal cutting according to embodiments of the invention.

An example study of metal cutting using MCT is presented in this section. A 3D formulation with boundary conditions to approximate plane strain through the depth of the cut is used. This quasi-2D model has four primary components, as presented in FIG. 29. These are the cutting tool, an eroding layer, and the chip and base sections of the material to be cut. The selection of this comparison of our results to experimental and simulation results of other authors. We aim to capture the saw-tooth chip formation characteristic of shear localization during high speed metal cutting.

The tool here is assumed to be stiff compared to the workpiece and is treated as a rigid body with nominal Young's Modulus of $2.0 \times 10^4$ GPa and Poisson's Ratio of 0.25. The tool has a rake angle of 20° and is sharply honed. Cutting speed, defined by the velocity of the tool with respect to the stationary workpiece, is initially set to 105 m/min.

TABLE 2-5

| Material constants used in the macroscale GTN law for AISI 316L Steel | | | | | | | | | | |
|---|---|---|---|---|---|---|---|---|---|---|
| G (GPa) | K(GPa) | ρ (kg/m³) | $\sigma_{y-0}$ (GPa) | n | $q_1$ | $q_2$ | $q_3$ | $f^{crit}$ | $F^{init}$ | A |
| 29.86 | 49.77 | 7780 | 0.980 | 0.25 | 0.91 | 1.9 | 0.95 | 0.1 | 0.001 | 3 |

TABLE 2-6

| Material constants used in the microscale J2-based law for AISI 316L Steel | | | | |
|---|---|---|---|---|
| G (GPa) | K (GPa) | ρ (kg/m³) | $\sigma_{y-0}$ (GPa) | L (m) |
| 0.0896 | 0.149 | 70839 | 0.098 | 0.035e−3 |

The material laws employed within the three sections of the workpiece (chip, eroding layer, and base) are identical (defined in Tables 2-5 and 2-6); the distinction between sections is made for clarity of purpose. Currently, microscale parameters are defined as 0.003 of the macroscale parameters. The eroding layer uses an eroding contact law to achieve element deletion based on critical effective plastic strain of 0.5, facilitating the material removal process with a predetermined separation location. Elsewhere, we chose to model contact with a segment-based soft constrain algorithm for both surface and edge-to-edge penetration. While the particulars of the contact laws do substantially impact the solution (including cutting force and chip morphology), these details are omitted here to retain a focus on the MCT aspects of this paper. Static and dynamic coefficients of friction between the tool and workpiece are 0.28 and 0.25 at 105 m/min to represent dry cutting. The contact utilizes node to surface contact between tool and workpiece, where workpiece is considered as a node set to reduce possible penetration during the cutting process. Similarly, static and dynamic coefficients of friction are 0.27 and 0.25 at 150 m/min and 0.25 and 0.23 at 210 m/min. Geometrically, the chip is initially slightly reclined. Our preliminary work indicates that this does not affect the fully evolved chip formation, and it eases the simulation process by reducing initial mesh distortion. The initial geometry uses 0.2 mm chip thickness. The mesh is constructed with 8 node brick elements implementing MCT with a user-defined element. A single layer of elements is used in the depth direction, with plane strain boundary conditions (zero through-plane displacement) are applied. This mimics cutting and turning operations where the through-plane thickness is generally large and the workpiece experiences plane strain. The initial element edge length is 0.01 mm.

TABLE 2-7

Predicted cutting forces normalized to unit thickness and
surface residual stress, with reference experimental data
for comparison (Cutting depth at 0.2 mm and Speed at 105 m/min)

|  | Experimental | Simulation |
|---|---|---|
| Cutting Force (N) | 250 | 130 |
| Surface Residual Stress (MPa) | 600 | 373 |

Figures 30, 31:
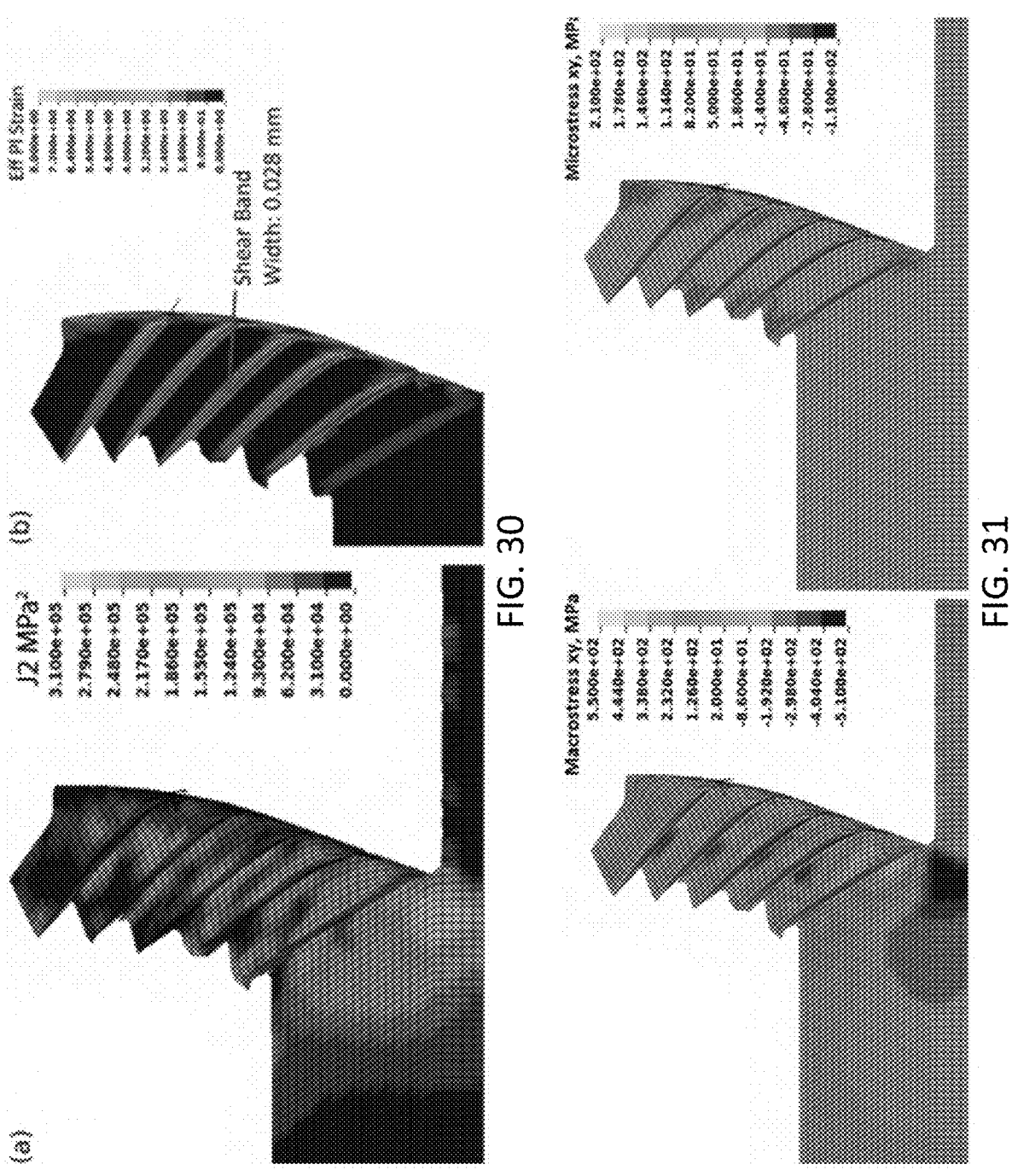
FIG. 30 shows (panel a) contours of J2 stress at 0.2 ms, noting the characteristic saw-tooth chip with stress localized about the shear bands, and (panel b) serrated chip formation, according to embodiments of the invention.
FIG. 31 shows macrostress (left) and microstress (left) XY components contours at 0.22 ms according to embodiments of the invention.

The results from the cutting geometry are shown in FIG. 30, after 0.2 ms. Panel (a) of FIG. 30 shows contours of J2 stress at 0.2 ms; note the characteristic saw-tooth chip with stress localized about the shear bands. In panel (b) of FIG. 30, the formed shear is comparable to experimental shown. Contours of $J_2$, units of stress squared, are plotted within the workpiece. This is related to the von Mises equivalent stress by:

$$\sigma_{Mises} = \sqrt{3 \cdot J_2} \qquad (2\text{-}21)$$

The contours observed here match qualitatively with previous steel cutting simulations. Maximum stress occurs in the primary shear zone. Limitations, i.e., geometry, of the model are such that only the surface layer residual stress can be predicted.

As noted, one of the benefits of the MCT method, and more generally gradient-based methods, is that the shear band behavior is generally relatively mesh independent. The localization is controlled by the length scale introduced rather than the mesh. It is convenient to plot contours of effective plastic strain to highlight the localization effects, as has been done by in panel (b) of FIG. 30. This shows that while still predominantly within one element, the deformation has been distributed to nearby elements as well, with elevated levels of plastic strain three elements wide. Thus, the measured shear band width is 0.028 mm, close to the 0.035 mm width measured from the experimental results.

The XY components of microstress and macrostress are plotted as contours at 0.22 ms shown in FIG. 31. Clearly, the microscale is in effect during cutting process and contours show that the microstress is on the same magnitude as macrostress. The microstress is mainly distributed around shear band, which is consistent with the role described earlier.

The surface residual stress is 299 MPa at 0.1 mm cutting depth, where 310 MPa is predicted. This lower value can be attributed to the 15° rake angled used versus 20° of our model. This follows the trend identified experimentally.

Figure 32:
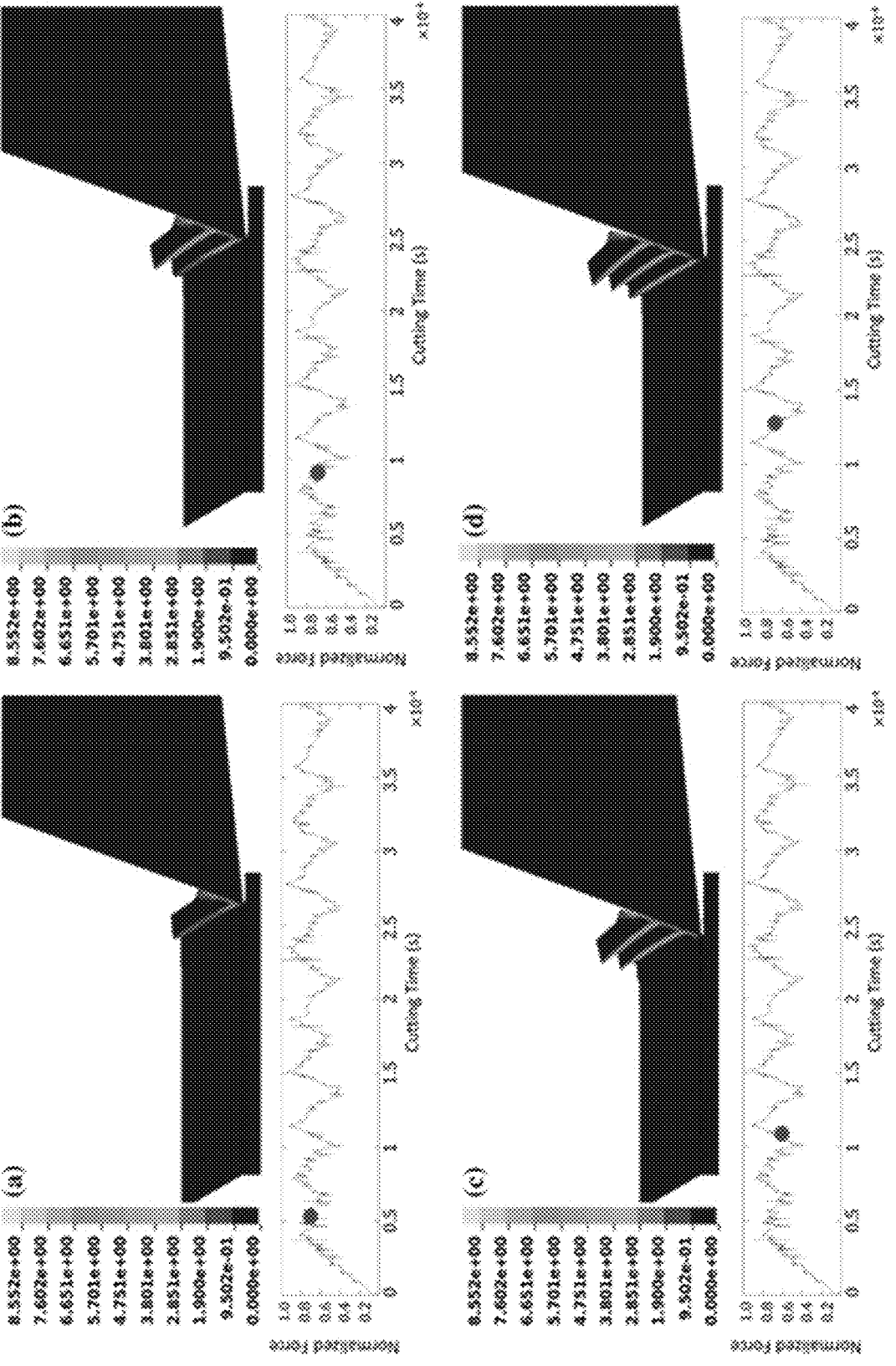
FIG. 32 shows magnitudes of effective plastic strain and dots representing the current cutting force in each pane for four different stages of the cut, according to embodiments of the invention: (panel a), at the formation of the first shear band (0.08 ms), (panel b), the beginning of formation of the second shear band (0.12 ms), and (panel c), second shear band fully formed (0.14 ms), and the beginning of formation of the third shear band (0.16 ms). Clearly, formation of shear band is associated with force drop.

The cyclic cutting force we observe is related to the serrated chip formation: force drops when a shear instability event occurs and increases again until sufficient stress to cause a localization is again reached. This is also shown by the four states in FIG. 32. Each inset shows the progress of the cut at the point indicated by the dot along the force-time curve at the bottom. This collection shows the formation of the first (panel (a) of FIG. 32, 0.08 ms), second (panels (b)-(c) of FIG. 32, 0.12 ms and 0.14 ms), and third (panel (d) of FIG. 32, 0.16 ms) shear bands. Clearly, formation of shear band is associated with force drop. A simple force normalization is used to scale the cutting force to a unit-thickness equivalent. The average cutting forces, collected in Table 2-7, is less than experimentally measured forces. Reported cutting force is between 250 N/mm to 400 N/mm and residual stress is 600 MPa. Different element sizes were tested, and have negligible effect on the cutting force, partly due to the regularization from the material length scale. The difference between simulation results and experimental results may be accounted for by considering the simplifications of the model, e.g., a sharp tool, 20° rake angle, a thin uncut region, and a quasi-2D plane strain representation, and expected model and experimental uncertainty.

Nonetheless, the MCT model has been applied to model metal cutting with modest success. Comparable shear band formation and surface residual stress are observed through simulation. Cyclic cutting forces are observed, which agrees with experimental results.

The MCT shown here requires calibration for all the material parameters at all scales (e.g., microscale 1, microscale 2) for each specific material used in the computation. This can be burdensome, particularly because of the microscales which, while motivated by physically hierarchical material structure, in practice simply regularize the material behavior. Such calibration might be replaced with a data-driven machine learning approach, to improve the applicability of MCT on different material system. In addition, the lower scale response, instead of using material laws, could be directly linked with a representative volume element (RVE) computation of the designated microstructure. Further developments of the MCT model could use an RVE homogenization to provide both constitute response and real-time microstructure evolution at the microscale. We suspect that further optimization the contact parameters and formulation used for the cutting simulation could produce more physically accurate results.

In sum, our MCT implementation was validated with a simple dog-bone model. The effects of microscale parameters were discussed. The propagation of shear band in simple shear was simulated to show the change of shear band width with length scale and investigate the mesh relevance. The simulation of the shear band of serrated chip in metal cutting was also been done to show the advantages of the MCT when compared with conventional continuum theory. According to this study, the MCT can be implemented in a FEM solver as a user element subroutine; the influence of microscale parameters on the macro strain-stress curve depends on the hardening law used in micro zone. For both materials with and without thermal softening, the influence of microscale parameters becomes more obviously when the microscale material response hardens more; from a simulation of simple shear, the shear band width was shown to depend on the length scale parameter, not the mesh size, when using the MCT approach; and because of its ability to capture shear bands well, the MCT was used to model shear band formation during metal cutting, showing reasonable agreement with published experimental results.

Example 3

Data-Driven Mechanistic Modeling of
Microstructural Influence on High Cycle Fatigue
Life of Nickel Titanium In artificial heart valve frames and arterial stents made from shape memory alloys such as Nickel Titanium (NiTi), failure can occur in high cycle fatigue (HCF). Mechanical failure of these devices is thought to have negative clinical implications. It is generally accepted that, from a materials perspective, failure is driven by extrinsic defects introduced during material processing, specifically oxide inclusions.

In this exemplary study, we focus on a class of defects known collectively as stringers, which result from the breakup of oxide or carbide particles during the wire-drawing process conventionally used to fabricate these bio-medical devices. Specifically, a data-driven mechanistic modeling technique is applied to a system representative of a broken-up inclusion (stringer) within drawn Nickel-Tita-nium wire or tube, e.g., as used for arterial stents. The approach uses a decomposition of the problem into a train-ing stage and a prediction stage. It is used to compute the fatigue crack incubation life of a microstructure of interest under high cycle fatigue. A parametric study of a matrix-inclusion-void microstructure is conducted. The results indi-cate that, within the range studied, a larger void between halves of the inclusion increases fatigue life, while larger inclusion diameter reduces fatigue life.

Methods: Data-Driven Mechanistic Modeling

Figure 33:
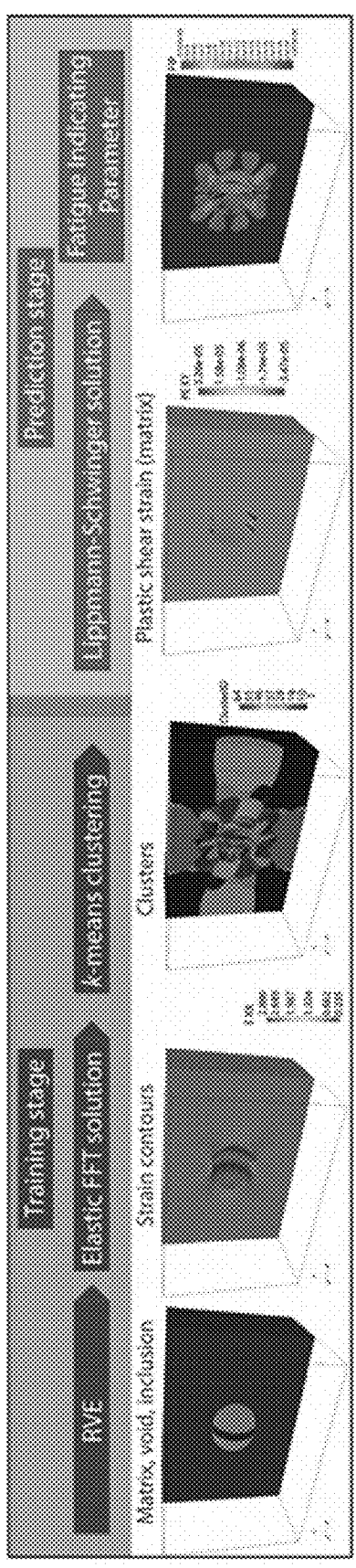
FIG. 33 shows a schematic showing the essential components of the SCA method according to embodiments of the invention. The figure shows an example RVE from the analysis conducted for the parametric study, with half of the matrix phase shown and the inclusion and void phases hidden.

Crystal Plasticity Self-consistent Clustering Analysis (CPSCA) is an extension of the existing Self-consistent Clustering Analysis (SCA) approach to (poly)crystalline metals achieved by using a crystal plasticity (CP) material law. An overview of the SCA method is shown in FIG. 33: from left to right the figure shows (1) a simplified repre-sentation of the material system (loosely called an RVE), with half the blue matrix material hidden showing the gray inclusion and red void; (2) contours of the xx component of strain in the matrix from a linear elastic analysis; (3) the clusters computed from the strain solution using k-means clustering; (4) the plastic shear strain field from CP, com-puted in the prediction stage; and (5) the FIP.

The SCA approach defines a database of training data called the Direct Numerical Solution (DNS); construction of this database is made tractable by computing only the elastic response of the RVE using an FFT or FEM solver. The database is used to redefine the number of strain degrees of freedom (DOFs). In the prediction stage, the RVE response is then solved using a self-consistent solution to the Lipp-mann-Schwinger equation with any constitutive law, in this case a crystal plasticity model. Since the number of DOFs has been reduced, complex load paths (e.g., cyclic loading) and expensive constitutive laws can be used during the prediction stage with relatively little impact on total com-putational time.

Derivation

This method is derived from the first order homogeniza-tion of a boundary value problem within an RVE. The local strain field $\epsilon^m$ is defined as the sum of a macroscopic, homogeneous strain field $\bar{\epsilon}$ and a fluctuating term, i.e., $\epsilon^m = \bar{\epsilon} + \epsilon^*$. To satisfy the Hill-Mandel condition, we assume periodic displacement field and anti-periodic boundary trac-tion. The local stress must satisfy equilibrium, that is:

$$\nabla \cdot \sigma^m(x) = 0, \ x \in \Omega, \tag{3-1}$$

where $\sigma^m(x)$ is the local stress tensor at point x in the RVE domain $\Omega$. The local stress $\sigma^m$ can be computed using any constitutive equation.

Eq. (3-1) is equivalent to the Lippmann-Schwinger equa-tion for first order homogenization, as given by:

$$\epsilon^m(x) = -\int_\Omega \Phi^0(x,x') : (\sigma^m(x') - C^0 : \epsilon^m(x')) d\Omega(x') + \bar{\epsilon}, \ x \in \Omega \tag{3-2}$$

where $C^0$ is a fourth order reference stiffness tensor, and $\Phi^0$ is the periodic fourth-order Green's operator.

Training Data

In one embodiment, Eq. (3-2) is solved on a set of arbitrary sub-domains within the RVE, rather than using the DNS discretization. With careful selection of these sub-domains, or clusters, a dramatic reduction in the number of strain DOFs is possible with little loss of accuracy.

To make this selection well, clustering is based on a training dataset. Here, we choose to use the strain concen-tration tensor, $A^m$ defined by $\epsilon''(x) = A^m(x):\bar{\epsilon}$, $x \in \Omega$; how this is computed is determined by the loading conditions used during the prediction stage. For each phase in the material, voxels with similar $A^m$ are assigned to one of a predeter-mined number of clusters I=1 . . . k using k-means cluster-ing.

Predicting Response

To use clusters in place of voxels, solution variables are assumed constant across each cluster $\Omega_I$, or $(\epsilon_I^m)_1 \ldots {}_k$; $(\sigma_I^m)_1 \ldots {}_k$ and likewise for any other local variable. Using this clusterwise-constant approximation, Eq. (3-2) is rewrit-ten in discretized form as:

$$\epsilon_I^m = -\Sigma_{J=1} \ldots {}_k D_{IJ}^0 : (\sigma_J^m - C^0 : \epsilon_J^m) + \bar{\epsilon}, I = 1 \ldots k \tag{3-3}$$

where $D_{IJ}^0$ is the interaction tensor between clusters I and J defined by $D_{IJ}^0 = c^1 D_{IJ}^1 + c^2 D_{IJ}^2$. Numerical variables $c^1$ and $c^2$ are computed and updated by a physically-based self-consistent scheme which ensures accuracy at each load step. For the definition of $D_{IJ}^0$. Clustering, $D_{IJ}^1$, and $D_{IJ}^2$ can be precomputed and stored for future use. Given a macro-scopic, or external, strain $\bar{\epsilon}$ Eq. (3-3) can be solved using, e.g., Newton-Raphson iterations for the unknowns $\epsilon_1 \ldots \epsilon_k$ using these precomputed values.

Constitutive Laws

In the training stage, only isotropic, linear elastic mate-rials are used. Any constitutive law might be used, but a simple one is sufficient for the training stage, which is only used to generate clusters.

During the prediction stage, the CP formulation of McGinty is solved. A multiplicative decomposition of the deformation gradient $F^m$ into elastic and inelastic parts is taken. The deformation gradient is approximated here by $I + \epsilon^m$. The plastic velocity gradient in the intermediate con-figuration, $\tilde{L}^P$, defined in Eq. (3-4) is used to compute the plastic part of the deformation gradient. The sum of the plastic shear velocity of each slip system of a crystal gives the total plastic velocity:

$$\tilde{L}^P = \Sigma_{\alpha=1}^{N_{slip}} \dot{\gamma}^{(\alpha)} (\tilde{s}^{(\alpha)} \otimes \tilde{n}^{(\alpha)}) \tag{3-4}$$

where $\otimes$ is the dyadic product, $\alpha$ is a slip system, $N_{slip}$ is the number of slip systems, $\dot{\gamma}^{(\alpha)}$ is the microscale shear rate, $s^{(\alpha)}$ is the slip direction, and $n^{(\alpha)}$ is the slip plane normal. A phenomenological power law determines the shear rate for each slip system.

Fatigue Indicating Parameter

An estimate of the fatigue crack incubation life is com-puted using a fatigue indicating parameter (FIP) suitable for microstructural analysis. This was first derived by Goh and McDowell from the Fatemi-Socie critical plane approach, defined by:

$$FIP = \frac{\Delta\gamma_{max}^p}{2}\left(1 + \kappa\frac{\sigma_n^{max}}{\sigma_y}\right) \tag{3-5}$$

where $\Delta\gamma_{max}^p$ is the maximum of the cycle-to-cycle change of the plastic shear strain between two consecutive cycles, $\sigma_n^{max}$ is the peak stress normal to the plane on which $\Delta\gamma_{max}^p$ occurs, $\sigma_y$ is the yield stress, and $\kappa$ is a normal stress factor assumed to be 0.55. The computed change in plastic shear strain saturates after just a few load cycles, giving a stabilized value of FIP.

The FIP defined by Eq. (3-5) can be quite sensitive to the fineness of the discretization. Maximum values of the plastic shear strain are reached in regions where the geometry is singular, and a very fine discretization is needed to compute an accurate FIP. To avoid the computational cost that such discretization would imply, previous studies have used on nonlocal averaging to regularize FIP predictions. We average the FIP value computed in Eq. (3-5) on a finite cubic volume of fixed size that sets the length scale; this cube contains the peak FIP value. We assume the size is related to the grain size in the matrix, which remains constant. The maximum, saturated nonlocal FIP, $NFIP_{max}$, is correlated to fatigue crack incubation life, $N_{inc}$, with $$NFIP_{max} = \bar{\gamma}_f(2N_{inc})^c \tag{3-6}$$

where $\bar{\gamma}_f$ and c, multiplicative and exponential Coffin-Manson-like factors, are used to fit experimental high cycle fatigue data of NiTi. We use the parameters for NiTi determined by $\bar{\gamma}_f = 0.0050$ and c=−0.8195.

Representative Volume Element for NiTi Inclusions

We represent a stringer with a simplified geometry, which is parametrically varied. Modeling assumptions are made to approximate a worst-case instantiation of this geometry. A 3D rendering of an example geometry is shown in on the left of FIG. 33, and the 2D slice on the right shows the parameters under consideration. The inclusion phase (gray) is modeled as linear elastic with ten times the Young's modulus of the matrix phase; this is meant to represent a hard, brittle inclusion though the exact choice of Young's modulus is arbitrary. The void has zero stiffness.

The constitutive behavior of the matrix material is assumed to be that of the austenitic B2 phase of NiTi. B2 has lower yield strength than the B19' martensite phase, and thus is likely to fail first. Evidence suggests that during in vivo fatigue, considering only the B2 phase is sufficient to capture minimum fatigue life. The single crystal matrix is oriented with Euler angles $\Phi$=90, $\theta$=45, and $\phi$=0: the weakest orientation with respect to the load applied consistent with a worst-case assumption.

Loading is applied in the axial direction, because most stents designs ensure that stringers align with the direction of load. Thus, an average strain is applied in the x-direction in FIG. 33. Zero average stress for all components is applied in the other directions. In the training stage, $A^m$ is computed from monotonic loading at 1.0% strain with a fully elastic material law. There are 64 clusters in the matrix, and 16 each in the void and inclusion phases. During the prediction stage, four cycles of fully reversed (R=$\bar{\epsilon}_{min}/\bar{\epsilon}_{max}$=−1) loading is applied using the CP material law. A cyclic strain level of 1.0% is used, approximately the high-cycle fatigue life limit because a stent might be designed to operate near this limit. FIP is determined from the change in plastic shear strain between cycles three and four, at the point of peak stress in the load history.

We consider RVEs with a range of inclusion diameters and void widths. For each case, a voxel mesh with size 281×191×191 was generated systematically. The voxel edge length is 0.305 µm. Cases ranged from void width of about 2.74 µm to 21.0 µm, in increments of 1.22 µm; simultaneously, the inclusion diameter was varied between 9.45 µm and 25.3 µm with the same increment. The largest diameter corresponds with the largest inclusion resulting from standard VAR processing of NiTi wire. Void sizes are less commonly reported, though these are roughly consistent with experimental observations of our collaborators. This resulted in 224 cases for which SCA was run automatically. A cubic averaging region with an edge length of 12.2 µm was used to compute the nonlocal FIP.

Results

Figure 34:
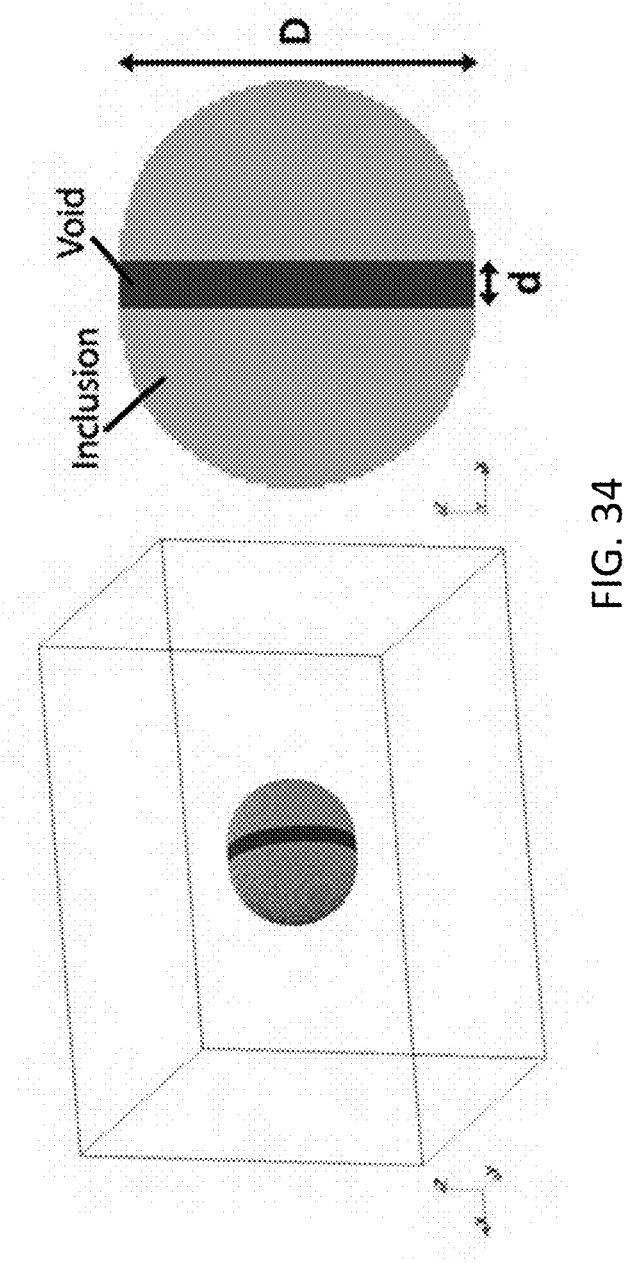
FIG. 34 shows 3D rendering of the RVE microstructure, with the matrix material hidden and a 2D slice showing the parameters void width d and inclusion diameter D, according to embodiments of the invention.

The predicted fatigue lives are shown in FIG. 34, a 3D rendering of the RVE microstructure, with the matrix material hidden and a 2D slice showing the parameters void width d and inclusion diameter D. The general trend is a nonlinear dependence of fatigue incubation life on inclusion diameter, with larger inclusions resulting in lower estimated lifetimes. The converse effect is seen with increasing void width: a wider void tends to increase the fatigue life. This implies that larger voids may not necessarily be more dangerous. A void with small width between hard inclusions seems to act as a crack tip; with increasing width, the stress concentration caused by this crack-like feature decreases, causing fatigue incubation life to increase. Based on a comparison of mesh sizes, the minor oscillations in the results are likely a result of the discretization of the problem.

Figure 35:
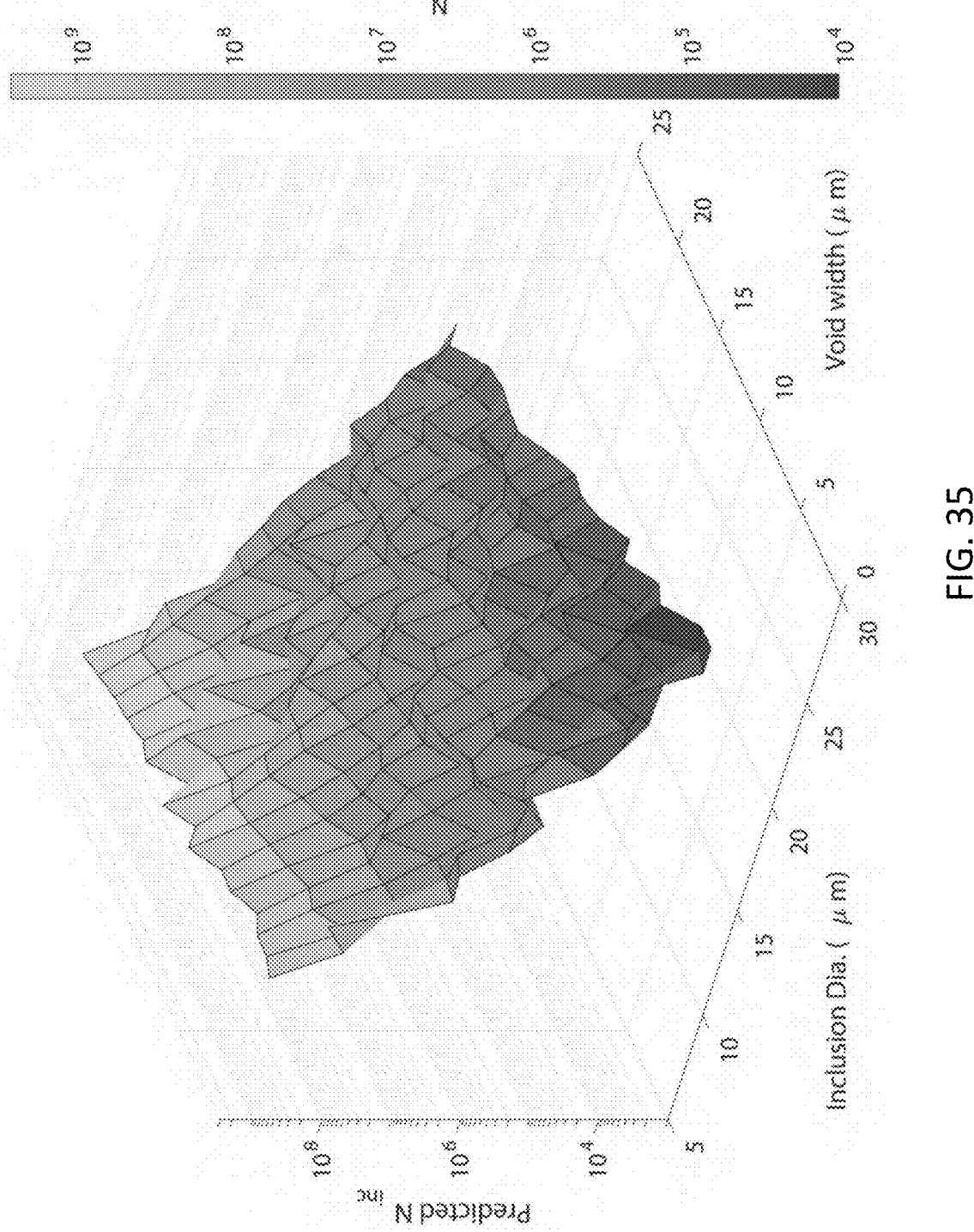
FIG. 35 shows a response surface of fatigue crack incubation life to void width and inclusion diameter according to embodiments of the invention. This shows that the estimated number of crack incubation cycles decreases with increasing inclusion diameter but increases with increasing void width between inclusions.

Individual results indicate that the highest local FIP lies at the interface between void, inclusion, and matrix as expected. This is consistent with previous experimental and computational studies. This can be seen in the final pane of FIG. 33, where this region is colored red. FIG. 35 shows a response surface of fatigue crack incubation life to void width and inclusion diameter, where the estimated number of crack incubation cycles decreases with increasing inclusion diameter but increases with increasing void width between inclusions.

Each RVE has about 10.3 million voxels and each simulation required about 18 CPU-hours to complete. Computing the elastic FFT solution took about 0.6 CPU-hours $T_{FFT}$, determining the clustering and interaction tensor took about 17 CPU-hours (in one case, 3.2 CPU-hours ($T_{cl}$) and 13.8 ($T_{inter}$) respectively), and the prediction stage took about 85 seconds ($T_{pred}$), i.e., Time=$T_{FFT}$+$T_{cl}$+$T_{inter}$+$T_{pred}$=0.6+3.2+ 13.8+0.024≅18. A simpler FEM simulation of an ellipsoidal elastic inclusion in a CP matrix, with about 20,000 elements, required about 49 CPU-hours. While only one strain amplitude is shown here, computing the FIP for these same microstructures at different strain amplitudes would require re-running only the prediction stage; strain-life plots could be constructed very quickly.

These results show promise for the potential of this method to generate many simulation results relatively quickly, and thus thoroughly explore parameter spaces in ways not possible with computationally expensive FEM or FFT approaches. However, there are still several opportunities for improvement. A finite strain formulation of CPSCA should be investigated to improve the integration of the CP material law, with a thorough convergence analysis with increasing number of clusters. For a more fundamental understanding of high cycle fatigue life of NiTi, a more accurate representation of stringers could be considered by modeling stringers formation during forming or using direct representation from images. These could be in 3D from x-ray micro-CT, serial sectioning, or an axi-symmetric assumption for 2D sections. Other areas of future work are to capture R>0 conditions that occur in vivo and the initial crimp imposed during device delivery, as well as stringer to load-axis misalignment effects. The first and last might be simple cases to run, but capturing crimp would require changes to the CP formulation.

In this example, we have presented a data-driven, mechanistically-based modeling method for predicting HCF crack incubation life. We applied this method to predict the fatigue response of a system including a pair of hemispherical inclusions connected by a cylindrical void within a single crystal matrix modeled with crystal plasticity. We have shown the results of a parametric study that probes the impact on fatigue life of inclusion diameter versus spacing, for this simplified geometry. The inclusion diameter is directly proportional to the estimated fatigue life, while the void width between inclusions was inversely proportional.

Example 4

Figures 36, 37:
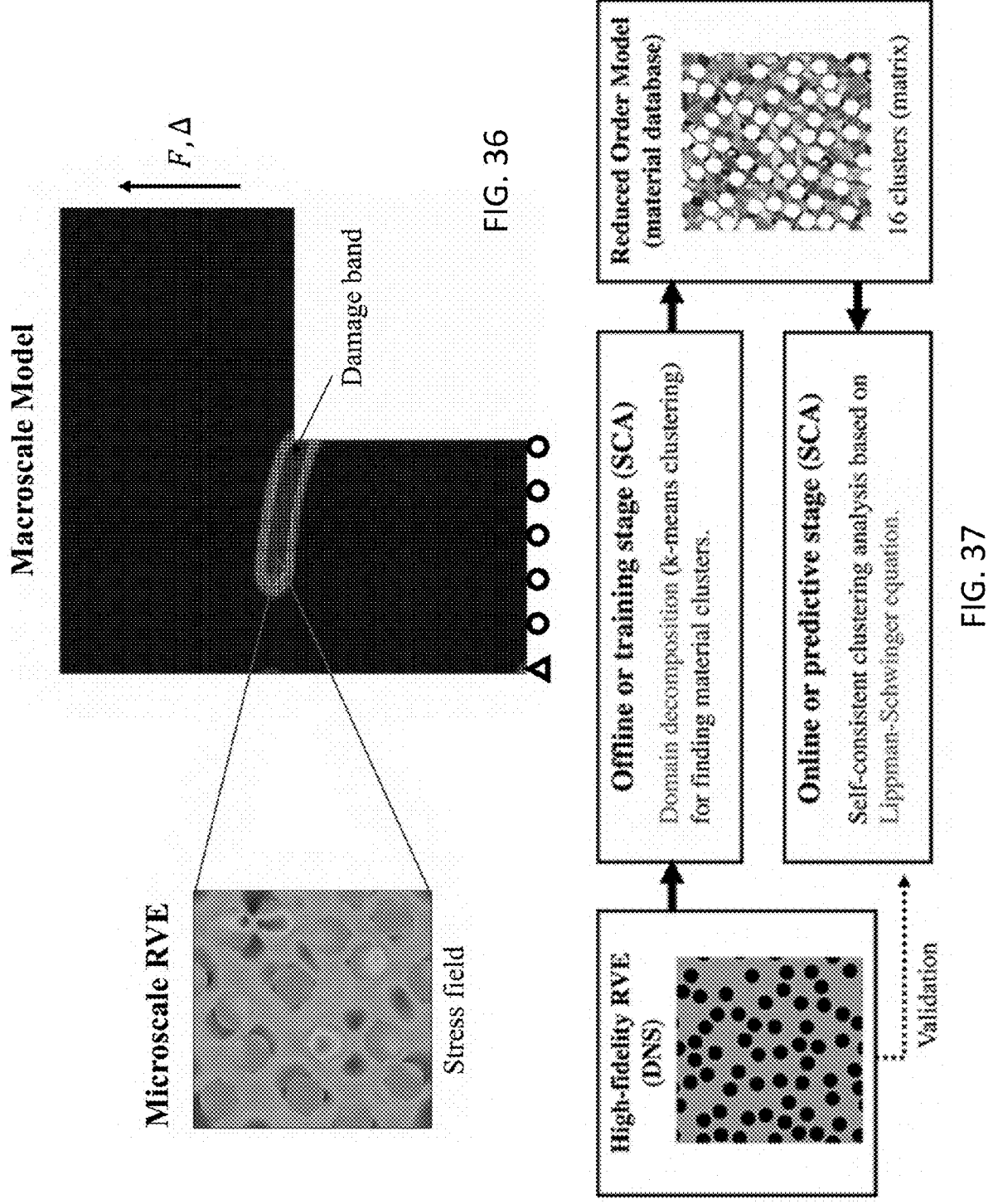
FIG. 36 shows illustration of the RVE microstructural stress effects of inclusions in the material microstructure (left) during localization of a macroscale model (right).
FIG. 37 shows a flowchart summarizing the self-consistent clustering analysis (SCA) for model reduction according to embodiments of the invention. Clusters in the inclusion phase are not shown.

Microstructural Material Database for Self-Consistent Clustering Analysis of Elastoplastic Strain Softening Materials Multiscale modeling of heterogeneous material undergoing strain softening poses computational challenges for localization of the microstructure, material instability in the macrostructure, and the computational requirement for accurate and efficient concurrent calculation. The self-consistent clustering analysis (SCA) provides an effective way of developing a microstructural database based on a clustering algorithm and the Lippmann-Schwinger integral equation, which enables an efficient and accurate prediction of non-linear material response. The SCA is further generalized to consider complex loading paths through the projection of the effective stiffness tensor. It has been shown recently that the SCA can greatly reduce computational expense through the use of novel data mining techniques based on clustering. This method uses RVE clustering techniques (see FIG. 37) to creates a microstructural database from the high-fidelity simulation data in an offline training stage and homogenizes the reduced system based on a self-consistent scheme in the online predicting stage. With only linear elastic simulations in the offline stage, the SCA has demonstrated a powerful trade-off between accuracy and efficiency in predicting elasto-plastic behavior with no strain softening. The SCA has also been shown to accelerate material behavior predictions (e.g., toughness) within a computational data-driven framework of material design under uncertainty.

In this example, a novel micro-damage algorithm is disclosed that alleviates the material instability at the microstructural level. The homogenized behavior in the strain softening region is not sensitive to the RVE size. Also, a non-local macroscopic damage model is introduced which couples the homogenized stress from the microstructural RVE with a macroscopic characteristic length and a weighting function. This method alleviates the material instability in the macroscopic model due to material damage. The proposed concurrent simulation framework allows the computation of the macroscopic response to explicitly consider the behavior of the separate constituents (material phases), as well as the complex microstructural morphology.

Multiscale Damage Model with a Micro-Damage Algorithm

Mechanics

Material fracture is sensitive to the microstructure and evaluating these effects requires a multiscale modeling approach which incorporates these details. A material's microstructure can include voids or inclusions which will lead to a non-uniform stress and strain state in the microstructure. Multiscale modeling couples the microstructural stress state with the macroscopic calculation to capture the effects of the microstructure in a macroscopic calculation.

The virtual internal work density at a macroscopic material point can be written as $$\delta W^{int} = \sigma_M : \delta\varepsilon_M = \frac{1}{|\Omega|}\int_\Omega \sigma_m : \delta\varepsilon_m d\Omega, \qquad (4\text{-}1)$$

where $|\Omega|$ is the volume of the microstructural RVE, and $\sigma_m$ and $\delta\varepsilon_m$ are the microstructural stress and virtual strain, respectively. The macroscopic stress $\sigma_M$ and macroscopic virtual strain $\delta\varepsilon_M$ can be computed using the Hill-Mandel Lemma to integrate these quantities over the microstructural RVE as $$\sigma_M = \frac{1}{|\Omega|}\int_\Omega \sigma_m d\Omega \text{ and } \delta\varepsilon_M = \frac{1}{|\Omega|}\int_\Omega \delta\varepsilon_m d\Omega. \qquad (4\text{-}2)$$

In this exemplary example, the subscript m represents the microscopic quantities, and the subscript M represents the macroscopic homogenized quantities.

For an elasto-plastic material, the constitutive law in the microstructure can be written as $$\sigma_m = C_m : \varepsilon_m^{el} = C_m : (\varepsilon_m - \varepsilon_m^{pl}) \qquad (4\text{-}3)$$

where $C_m$ is the microscopic elastic stiffness tensor, and $\varepsilon_m^{el}$ and $\varepsilon_m^{pl}$ are the microscopic elastic strain and plastic strain, respectively. The total strain $\varepsilon_m$ at a point within the microstructure is given by $$\varepsilon_m = \int d\varepsilon_m \qquad (4\text{-}4)$$

where $d\varepsilon_m$ is the microstructural strain increment due to an associated macroscopic strain increment $d\varepsilon_m$, applied as boundary conditions on the microstructural RVE. According to the Hill-Mandel lemma, the homogenized stress $\sigma_M$ can be computed by averaging the microstructural stress $\sigma_m$ in the RVE. Through this homogenization process, the mechanical response at each macro material/integration point is coupled with a microscale RVE model. Meanwhile, the computed microscopic history-dependent internal variables are stored in the RVE for continued analysis. This concurrent framework is advantageous since the constitutive law can be adjusted on the fly based on the microstructural characteristics. The multiscale framework obviates the need for a cumbersome equation-based phenomenological constitutive law to account for the behavior of history-dependent material with complex micro-morphologies and non-linear behavior, such as plasticity.

Strain Softening and Damage

The homogenization scheme may encounter stability problems when the material experiences strain-softening, such as material failure described by a progressive damage model. For an elasto-plastic material with damage, the damaged microstructural stress can be written as $$\sigma_m^d = (1-d_m)C_m : \varepsilon_m^{el} = (1-d_m)C_m : (\varepsilon_m - \varepsilon_m^{pl}), \tag{4-5}$$

where $d_m$ is a non-decreasing scalar damage parameter describing the irreversible isotropic damage process. Anisotropic damage can also be considered, but the scalar damage parameter needs to be replaced by a tensor. This damage parameter acts on the stress of a reference elasto-plastic material, $$\sigma_m^0 = C_m : \varepsilon_m^{el} = C_m : (\varepsilon_m - \varepsilon_m^{pl}), \tag{4-6}$$

which gives $$\sigma_m^d = (1-d_m)\sigma_m^0. \tag{4-7}$$

This reference elasto-plastic material stores the history-dependent state variables and provides the relationship between the elastic strain $\varepsilon_m$ and plastic strain $\varepsilon_m^{pl}$. The damage parameter can be written as a function of state variables $q_m$ (e.g., the effective plastic strain), $$d_m = d_m(q_m). \tag{4-8}$$

The progressive damage model directly applied to the microstructural RVE suffers from material instability due to non-physical strain softening, leading to results in which the localization occurs in very narrow bands of elements. Since no regularization is introduced in this example, the width of the band depends on the mesh size. Even if the microscale RVE is regularized with a physical band width, the homogenized macroscopic stress-strain response still strongly depends on the RVE size, so that it cannot represent the material behavior at local macroscopic material point.

Stabilized Micro-Damage Algorithm

A micro-damage stabilization algorithm is proposed which removes the material strain softening instability associated with traditional damage models. This is accomplished by introducing a reference elasto-plastic RVE and decoupling the damage from the plastic evolution. The effective macroscopic material law with damage is written as $$\sigma_M^d = C_M^d : \varepsilon_M^{el} = C_M^d : (\varepsilon_M - \varepsilon_M^{pl}), \tag{4-9}$$

where $\sigma_M^d$ is the macroscopic stress of the damaged RVE, and $C_M^d$ is the macroscopic effective elastic stiffness tensor of the damaged RVE. Moreover, $\varepsilon_M^{el}$ and $\varepsilon_M^{pl}$ are the macroscopic effective elastic strain and plastic strain, respectively. The effective material law of the reference elasto-plastic RVE can be written as $$\sigma_M^0 = C_M^d : \varepsilon_M^{el} = C_M : (\varepsilon_M - \varepsilon_M^{pl}), \tag{4-10}$$

where $\sigma_M^0$ is the macroscopic stress of the undamaged reference RVE, whose effective elastic stiffness tensor is denoted by $C_M$. Assuming the damaged elasto-plastic RVE has the same macroscopic effective elastic strain (or effective plastic strain), the following relationship between $\sigma_M^d$ and $\sigma_M^0$ exists $$\sigma_M^d = C_M^d : [= (C_M)^{-1} : \sigma_M^0]. \tag{4-11}$$

In a general multi-dimensional heterogeneous material, the macroscopic effective plastic strain $\varepsilon_M^{pl}$ is not necessarily a volume average of the microscopic plastic strain $\varepsilon_m^{pl}$. According to the definition of the macroscopic material law in Eq. (4-10), $\sigma_M^0$ should vanish if $\varepsilon_M$ coincides with $\varepsilon_M^{pl}$ $$\sigma_M^0 = 0, \text{ if } \varepsilon_M = \varepsilon_M^{pl} \text{ (or } \varepsilon_M^{el} = 0). \tag{4-12}$$

Figure 38:
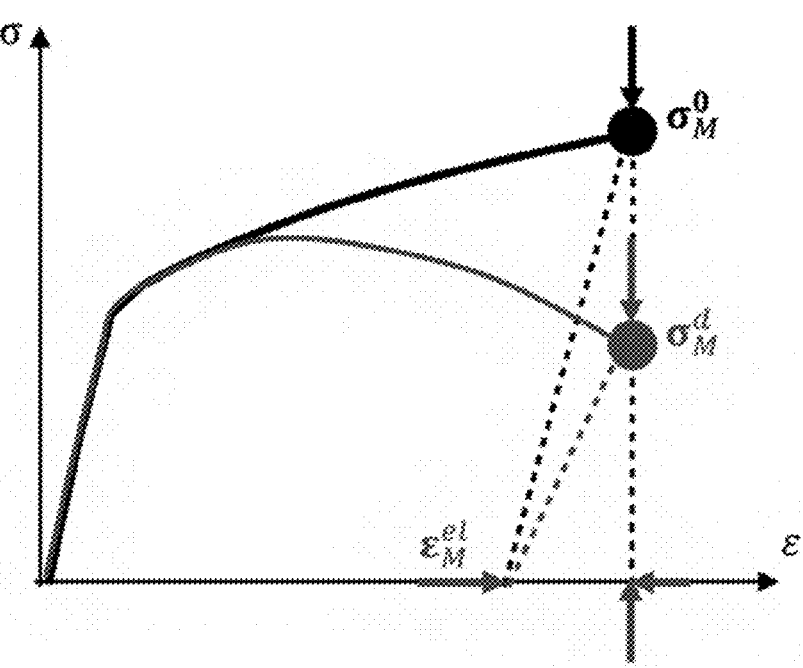
FIG. 38 shows illustration of the micro-damage algorithm on the macroscopic stress-strain curve according to embodiments of the invention.

The stabilized micro-damage algorithm computes the effective macroscopic quantities in Eqs. (4-9) and (4-10), as illustrated in FIG. 38.

A strain increment at a macroscopic material point is passed to the reference elasto-plastic RVE as a homogenized strain increment, $d\varepsilon_M$, and applied as a boundary condition. The microscopic material law in the RVE is $$\sigma_{m1} = C_m : (\varepsilon_{m1} - \varepsilon_m^{pl}). \tag{4-13}$$

The microstructural stress and total strain are computed, and the microstructural stress is homogenized using the Hill-Mandel lemma to obtain the macroscopic stress $$\sigma_M^0 = \frac{1}{|\Omega|} \int_\Omega \sigma_{m1} d\Omega. \tag{4-14}$$

The macroscopic effective elastic strain $\varepsilon_M^{el}$ (or plastic strain $\varepsilon_M^{pl}$) is then separated from the total strain. According to Eq. (4-10), the effective macroscopic elastic strain can be expressed as $$\varepsilon_M^{el} = (C_m)^{-1} : \sigma_M^0. \tag{4-15}$$

This is equivalent to applying the homogenized stress from the reference RVE, $\sigma_M^0$, to a second RVE which is identical to the first RVE, except that the material is an undamaged elastic material, $$\sigma_{m2} = C_m : \varepsilon_{m2}. \tag{4-16}$$

The microstructural strain in the second RVE is computed and homogenized to yield the macroscopic elastic strain as $$\varepsilon_M^{el} = \frac{1}{|\Omega|} \int_\Omega \varepsilon_{m2} d\Omega. \tag{4-17}$$

Finally, the macroscopic stress of the damaged material can be computed based on Eq. (4-9), $$\sigma_M^d = C_M^d : \varepsilon_M^{el}. \tag{4-18}$$

This is equivalent to applying the homogenized strain from the second RVE, $\varepsilon_M^{el}$, to a third RVE with damaged elastic material properties, $$\sigma_{m3} = (1-d_m)C_m : \varepsilon_{m3}, \tag{4-19}$$

where the microscopic damage parameter, $d_m$, is a function of the state variables, $q_{m1}$, in the first RVE or the reference elasto-plastic RVE, $$d_m = d_m(q_{m1}). \tag{4-20}$$

The microscopic stress in the third RVE is computed and homogenized as $$\sigma_M^d = \frac{1}{|\Omega|} \int_\Omega \sigma_{m3} d\Omega. \tag{4-21}$$

The homogenized stress, $\sigma_M^d$, is returned to the macroscale model as the damaged macroscopic stress at the material point corresponding to the macroscopic strain.

Effective Damage Parameter

To characterize the damage state of the RVE, an effective macroscopic damage parameter, $d_M$, can be defined as $$d_M = 1 - \frac{\|\sigma_M^d : \sigma_M^0\|}{\|\sigma_M^0 : \sigma_M^0\|} \qquad (4\text{-}22)$$

The macroscale homogenized material and the associated RVE are said to be fully damaged when $d_M=1$. Note that the effective damage parameter is not defined as the field average of the local damage parameter, so full damage can be achieved even if only part of the RVE is fully damaged. The effective damage parameter is a natural by-product of the homogenization scheme and does not affect the stress-strain relation, but it does provide a useful state variable/indicator for tracking localization in the macroscale simulation.

Non-Local Macroscopic Damage

A non-local macroscale damage model is adopted to deal with the pathological mesh dependence due to strain softening. The macroscopic damage is based on the microscale damage computed using the proposed micro-damage algorithm from the above section. The algorithm captures the complex damage mechanisms due to material heterogeneities at the microstructural level without predefining the form or requiring a length scale. This is achieved at a local macroscopic point by homogenizing the damaged stress computed in the microscale RVE. Although the microscale damage model does not require a non-local length scale, the macroscale model is still subject to the pathological mesh dependence when the homogenized results from the RVE are passed back to the macroscale material point.

A non-local macroscopic length scale is introduced via a convolution integral. The non-local microscale damage parameter, $\tilde{d}_m$, at point x inside the RVE is obtained as a weighted average over a spatial neighborhood of the macroscale point $\xi$ under consideration, $$\tilde{d}_m(x, \xi) = \int_B \omega(\|\xi-\xi'\|) d_m(x,\xi') d\xi', \qquad (4\text{-}23)$$

where $d_m(x, \xi')$ is the local damage increment at a microscale point x inside the RVE associated with macroscale point $\xi'$. Note that the non-local regularization can also be performed on other variables, such as strain, stress and effective plastic strain.

The clustering domain decomposition utilized for the reduced order SCA method leads to a discrete form of the convolution integral. The non-local damage parameter in the I-th cluster $\tilde{d}_m^I$ at point $\xi'$ of a reduced order RVE can be written as $$\tilde{d}_m^I(\xi) = \int_B \omega(\|\xi-\xi'\|) d_m^I(\xi') d\xi', \qquad (4\text{-}24)$$

where $\tilde{d}_m^I(\xi')$ is the local damage parameter in the I-th cluster of the reduced RVE at point $\xi'$.

The non-local weighting function $\omega(\|\xi-\xi'\|)$ is normalized to preserve a uniform field, $$\omega(\|\xi - \xi'\|) = \frac{\omega_\infty(\|\xi - \xi'\|)}{\displaystyle\int_B \omega_\infty(\|\xi-\xi'\|)d\xi'}, \qquad (4\text{-}25)$$

where B denotes the macroscale support domain for the non-local integration. One possible weighting function, which is utilized for the examples in this paper, is a polynomial bell function with compact support, $$\omega_\infty(r) = \left\langle 1 - \frac{4r^2}{l_0^2} \right\rangle^2, \qquad (4\text{-}26)$$

where the Macauley brackets $\langle \ldots \rangle$ are defined as $\langle x \rangle = \max(x, 0)$, and $l_0$ is the macroscale length scale parameter. Since $\omega_\infty(r)$ vanishes for $r>l_0/2$, the support domain B is circular in two-dimensions, or spherical in three-dimensions, with a radius $l_0/2$.

The macroscale length parameter, $l_0$, determines the width of the damage localization band, and limits localization to ensure numerical convergence to a physically meaningful solution. The non-local microscale damage parameter $\tilde{d}_m$(or $\tilde{d}_m^I$) is utilized in the third RVE, resulting in a microscale stress-strain relation in Eq. (4-19) of $$\sigma_{m3} = (1-\tilde{d}_m)C_m : \varepsilon_{m3}. \qquad (4\text{-}27)$$

For the new micro-damage homogenization method with the non-local formulation, the non-local microscale damage parameter $\tilde{d}_m$ is computed in Step 2 in the algorithm of the self-consistent scheme shown below, and $\tilde{d}_m$ will affect on the macroscale material responses through homogenization of the RVE stress.

The macroscale length parameter $l_0$ can be determined by measuring the width of the strain localization band, either in high-fidelity direct numerical simulations (DNS) which model the damage evolution process explicitly, or by experimental image post-processing using digital image correlation (DIC) analysis. For a given weighting function defined by $l_0$, the mesh size $l_e$ of the macroscale model (e.g., FEM) needs to be small enough to effectively remove the mesh sensitivity and reduce the error caused by sample aliasing. In this exemplary example, $l_e < l_0/4$ is used, and the influence of mesh size will also be investigated in the example.

Self-Consistent Clustering Analysis: Model Reduction

The concurrent multiscale modeling framework for the micro-damage algorithm is applicable to complex materials, but additional computational resources are needed to solve the microscale model at each integration point. As a result, the whole concurrent simulation is prohibitively expensive for complex microscale representation.

The SCA with a new projection-based self-consistent scheme is proposed to increase the efficiency of the concurrent calculations. The efficiency of the SCA is achieved via data compression algorithms which group local microstructures into clusters during an offline training stage. Grouping material points with similar mechanical behavior into clusters results in significantly fewer degrees of freedom than the original DNS; the computational speed is thus greatly improved. The self-consistent scheme introduced in the online stage of the SCA guarantees the accuracy of the reduced order model. Importantly, the SCA is valid for any local nonlinear constitutive law (such as plasticity and damage) of each material phase in the microscale model.

Offline Stage: Mechanistic Material Characterization

Grouping material points with similar mechanical behavior into a single cluster is performed by domain decomposition of the material points using the clustering methods.

First, the similarity between two material points is measured by the strain concentration tensor $A_m(x)$, which is defined as $$\varepsilon_m(x)=A_m(x){:}\varepsilon_M \text{ in } \Omega \qquad (4\text{-}28)$$

where $\varepsilon_M$ is the elastic macroscopic strain corresponding to the boundary conditions on the RVE, and $\varepsilon_m(x)$ is the elastic local strain at point x in the microscale RVE domain $\Omega$. In a two-dimensional (2D) model, $A_m(x)$ has 9 independent components, which can be determined by a set of elastic DNS calculations under 3 orthogonal loading conditions. For a linear elastic material, the strain concentration tensor is independent of the loading conditions. Other metrics, such as effective plastic strain and damage parameter, can also be selected for the offline data clustering, but may require extra computation in the offline stage.

Figure 39:
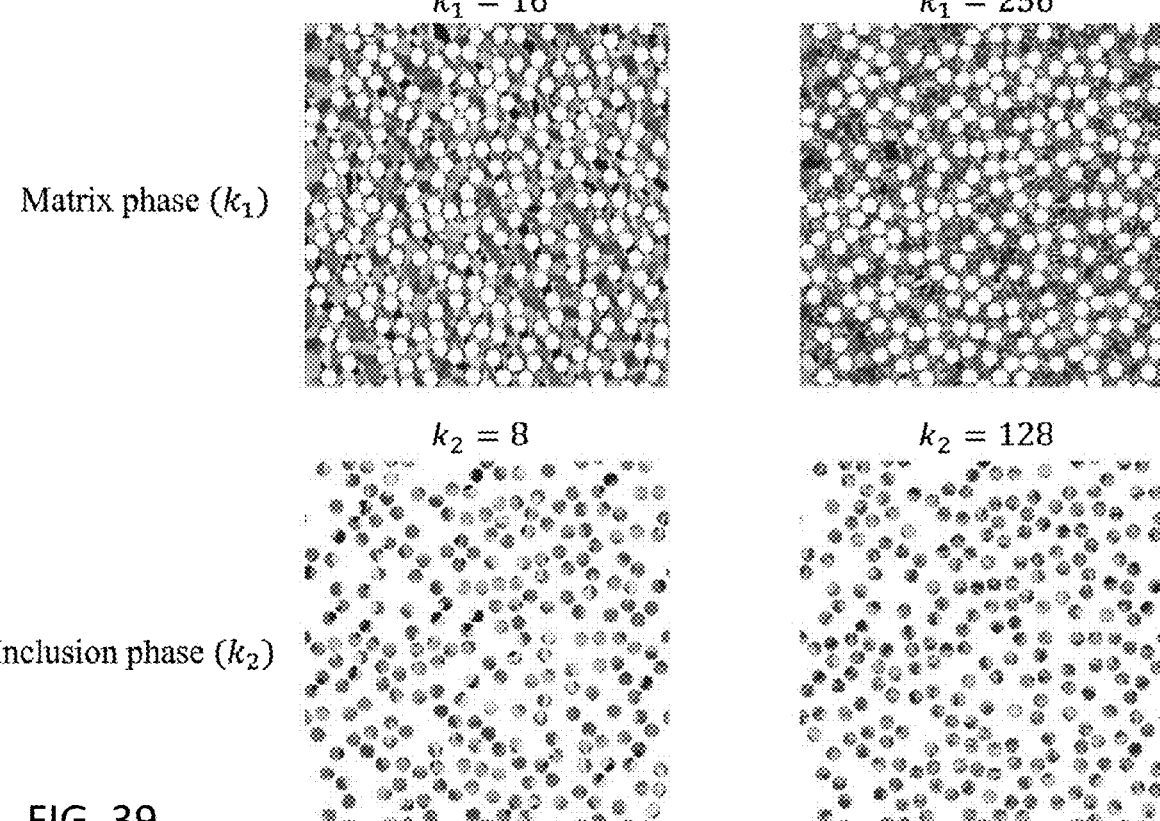
FIG. 39 shows K-means clustering results of the cross-section of a two-dimensional RVE with circular inclusions according to embodiments of the invention. The high-fidelity RVE is discretized by a 1200×1200 mesh. Each cluster contains all the separate sub-domains with the same color.

After computing the strain concentration tensor $A_m(x)$, the k-means clustering method is used to group data points. Additional details about the clustering algorithm are provided in the end of this example. Since all the material points in a cluster are assumed to have the same mechanical responses, the number of the degrees of freedom is significantly reduced through this compression/clustering step. The k-means clustering results of a 2D heterogeneous RVE in the matrix phase and inclusion phase at two levels of resolution are provided in FIG. 39, showing K-means clustering results of the cross-section of a two-dimensional RVE with circular inclusions. The high-fidelity RVE is discretized by a 1200×1200 mesh. Each cluster contains all the separate sub-domains with the same color.

A primary assumption associated with the domain decomposition is that any local variable $\beta(x)$ is uniform within each cluster. Globally, this is equivalent to having a piece-wise uniform profile of the variable in the RVE. This piecewise uniform approximation enables us to reduce the number of degrees of freedom for the Lippmann-Schwinger equation, which is solved in the following online stage. Meanwhile, the so-called interaction tensor $D^{IJ}$ can also be extracted as an invariant inside the reduced Lippmann-Schwinger equation.

It should be noted that although the domain decomposition is based on a specific selection of elastic properties for each material phase in the offline stage, the same database can be used for predicting responses for new combinations of material constituents in the online stage. Even though the absolute value of the strain concentration tensor $A_m(x)$ strongly depends on the phase properties, the clustering results are more sensitive to the distribution of $A_m(x)$ in the RVE, which characterizes the geometrical heterogeneity. In this exemplary example, the same database shown in FIG. 4-4 is used for predicting the responses of two different RVEs embedded with hard or soft inclusions.

Online Stage: A New Projection-Based Self-Consistent Scheme

The equilibrium condition in the RVE can be rewritten as a continuous Lippmann-Schwinger integral equation by introducing a homogeneous isotropic linear elastic reference material, $$\Delta\varepsilon_m(x)+\int_\Omega \Phi^0(x,x'){:}[\Delta\sigma_m(x')-C^0{:}\Delta\varepsilon_m(x')]dx'-\Delta\varepsilon^0=0, \qquad (4\text{-}29)$$

where $\Delta\varepsilon^0$ is the far-field strain increment controlling the evolution of the local strain. The far-field strain is uniform in the RVE. The reference material is isotropic linear elastic, and its stiffness tensor $C^0$ can be determined by two independent Lamé parameters $\lambda^0$ and $\mu^0$, $$C^0=f(\lambda^0,\mu^0)=\lambda^0 I\otimes I+\mu^0 II, \qquad (4\text{-}30)$$

where I is the second-rank identity tensor, and II is the symmetric part of the fourth-rank identity tensor. Moreover, $\Delta\varepsilon_m(x)$ and $\Delta\sigma_m(x)$ are the microscopic strain and stress increments, respectively. Averaging the incremental integral equation in Eq. (29) in $\Omega$ leads to $$\frac{1}{|\Omega|}\int_\Omega \Delta\varepsilon_m(x)dx + \qquad (4\text{-}31)$$

$$\frac{1}{|\Omega|}\int_\Omega\left[\int_\Omega \Phi^0(x,x')dx\right]{:}\left[\Delta\sigma_m(x')-C^0{:}\Delta\varepsilon_m(x')\right]dx'-\Delta\varepsilon^0=0.$$

Using the boundary conditions for deriving the Green's function, Eq. (4-30) can be equivalently written in the spatial domain as $$\int_\Omega\Phi^0(x,x')dx=0. \qquad (4\text{-}32)$$

Substituting Eq. (4-32) into (4-31) gives $$\Delta\varepsilon^0 = \frac{1}{|\Omega|}\int_\Omega \Delta\varepsilon_m(x)dx, \qquad (4\text{-}33)$$

which indicates that the far-field strain increment is always equal to the ensemble averaged strain increment in the RVE. To compute the strain increment $\Delta\varepsilon_m(x)$ in the integral Eq. (4-29), constraints are needed from the macroscopic boundary conditions. For the homogenization scheme proposed above, two types of constraints are used: 1) macro-strain constraints in RVEs 1 and 3

$$\frac{1}{|\Omega|}\int_\Omega \Delta\varepsilon_m(x)dx = \Delta\varepsilon_M \text{ or } \Delta\varepsilon^0 = \Delta\varepsilon_M; \qquad (4\text{-}34)$$

and 2) a macro-stress constraint in RVE 2

$$\frac{1}{|\Omega|}\int_\Omega \sigma_m(x)dx = \sigma_M. \qquad (4\text{-}35)$$

For more general cases, macro-stress and mixed constraints can also be formulated. Here the boundary conditions are applied as constraints on the volume averages of strain or stress inside the RVE. This methodology differs from the standard finite element method in which the boundary conditions constrain the displacement or force at the RVE boundaries.

As the full-field calculations (e.g., FFT-based method) of the continuous Lippmann-Schwinger equation may require excessive computational resources, the discretization of the integral equation is performed based on the domain decomposition in the offline stage. With the piecewise uniform assumption in Eq. (4-29), the number of degrees of freedom and the number of the internal variables in the new system can be reduced. After decomposition, the discretized integral equation of the I-th cluster can be derived as $$\Delta\varepsilon_m{}^I+\Sigma_{J=1}{}^k D^{IJ}{:}[\Delta\sigma_m{}^J-C^0{:}\Delta\varepsilon_m{}^J]-\Delta\varepsilon^0=0, \qquad (4\text{-}36)$$

where $\Delta\varepsilon_m{}^J$ and $\Delta\sigma_m{}^J$ re the microscopic strain and stress increment in the J-th cluster. The interaction tensor, $D^{IJ}$, is defined in Eq. (4-36), and is related to the Green's function of the reference material. After the discretization, the far field strain is still equal to the average strain in the RVE, $$\Delta\varepsilon^0=\Sigma_{I=1}{}^k c^I\Delta\varepsilon_m{}^I, \qquad (4\text{-}37)$$

where $c^I$ is the volume fraction of the I-th cluster. Meanwhile the macroscopic boundary conditions are also required to be discretized. For instance, the discrete form of the macro-strain constraint can be written as $$\Sigma_{I=1}{}^k c^I\Delta\varepsilon_m{}^I=\Delta\varepsilon_M \text{ or } \Delta\varepsilon^0=\Delta\varepsilon_M. \qquad (4\text{-}38)$$

Similarly, the discretized macro-stress constraint becomes $$\Sigma_{I=1}{}^{k}c^{I}\Delta\sigma_{m}{}^{I}=\Delta\sigma_{M}. \tag{4-39}$$

An important feature of the continuous Lippmann-Schwinger in Eq. (4-29) is that its solution is independent of the choice of the reference material $C^{0}$. This can be explained by the fact that the physical problem is fully described by the equilibrium condition and the prescribed macroscopic boundary conditions. However, once the equation is discretized based on the piecewise uniform assumption, the equilibrium condition is not strictly satisfied at every point in the RVE, and the solution of the reduced system depends on the choices of $C^{0}$. This discrepancy can be reduced by increasing the number of clusters into the system, but with a computational cost increase due to the increased degrees of freedom.

To achieve both efficiency and accuracy, a self-consistent scheme is used in the online stage, which shows good accuracy with fewer clusters. In the self-consistent scheme, the stiffness tensor of the reference material $C^{0}$ is set approximately the same as the homogenized stiffness tensor C, $$C^{0}\rightarrow C. \tag{4-40}$$

The homogenized stiffness tensor C of the RVE can be expressed as $$C=\Sigma_{I=1}{}^{k}c^{I}C_{alg}{}^{I}:A_{m}{}^{I}, \tag{4-41}$$

where $C_{alg}{}^{I}$ is the algorithm stiffness tensor of the material in the I-th cluster and is an output of the local constitutive law for the current strain increment in the cluster, $$C_{alg}^{I}=\frac{\partial\Delta\sigma_{m}^{I}}{\partial\Delta\varepsilon_{m}^{I}}. \tag{4-42}$$

The strain concentration tensor of the I-th cluster $A_{m}{}^{I}$ relates the local strain increment in the I-th cluster $\Delta\varepsilon_{m}{}^{I}$ to the far-field strain increment $\Delta\varepsilon^{0}$, $$\Delta\varepsilon_{m}{}^{I}=A_{m}{}^{I}:\Delta\varepsilon^{0}. \tag{4-43}$$

The strain concentration tensor $A_{m}{}^{I}$ can be determined by first linearizing the discretized integral equation (4-36) using $C_{alg}{}^{I}$ and then inverting the Jacobian matrix of the Newton's method. Since C is only required for the self-consistent scheme, the calculation of C is only performed once after the convergence of the Newton's method to save the computational cost.

Due to the nonlinearity of the material responses, such as plasticity, it is usually not possible to determine an isotropic $C^{0}$ which provides an exact match with C. The self-consistent scheme is formulated as an optimization problem, where the optimum isotropic $C^{0}$ minimizes the error between the predicted average stress increments. Although this scheme does not require computing C explicitly, it has mainly two drawbacks. First, the optimization problem is under-determined under pure shear or hydrostatic loading conditions, so that one of two independent elastic constants need to be estimated. More importantly, the modulus of the optimum reference material may become negative under complex loading conditions, which is deleterious to the convergence of the fixed-point method.

In this exemplary example, a new self-consistent scheme is proposed based on projection of the effective stiffness tensor C, which is formulated as two well-defined optimization problems. For a 2D plane strain problem, the stiffness tensor of the isotropic reference material $C_{pe}{}^{0}$ is decomposed as $$C_{iso}{}^{0}=2\kappa^{0}J+2\mu^{0}K, \tag{4-44}$$

where the 2D bulk modulus can be related to the Lamé parameters, $$\kappa^{0}=\lambda^{0}+\mu^{0}. \tag{4-45}$$

The fourth-rank tensor J and K are defined as $$J=\frac{1}{2}(I\otimes I) \text{ and } K=II-J, \tag{4-46}$$

where I is the second-rank identity tensor, II is the fourth-rank symmetric identity tensor. It can be shown that J and K are orthogonal to each other, $$J::K=0, \tag{4-47}$$

and $$J::J=1, K::K=2, \tag{4-48}$$

where "::" denotes the inner product between two fourth-order tensors, or $A::B=A_{ijkl}B_{ijkl}$.

To find the optimum $\kappa^{0}$ and $\mu^{0}$ from the projection of the effective stiffness tensor C, two optimization problems are defined $$\kappa^{0}=\operatorname*{argmin}_{\{\kappa'\}}\|[C-C_{iso}(\kappa')]:\Delta\varepsilon_{h}^{0}\|^{2} \text{ and} \tag{4-49}$$

$$\mu^{0}=\operatorname*{argmin}_{\{\mu'\}}\|[C-C_{iso}(\mu')]:\Delta\varepsilon_{d}^{0}\|^{2}, \tag{4-50}$$

where $\Delta\varepsilon_{h}{}^{0}$ and $\Delta\varepsilon_{d}{}^{0}$ are the hydrostatic and deviatoric parts of the far-field strain increment $\Delta\varepsilon^{0}$. By taking the derivative of the cost functions in Eqs. (4-49) and (4-50) for finding the stationary points, the optimum $\kappa^{0}$ and $\mu^{0}$ can be expressed in Voigt notation as $$\kappa^{0}=\frac{C_{11}+C_{12}+C_{21}+C_{22}}{4} \text{ and} \tag{4-51}$$

$$\mu^{0}=\eta_{1}\left(\frac{C_{11}-C_{12}-C_{21}-C_{22}}{4}\right)+ \tag{4-52}$$

$$(1-\eta_{1})C_{33}+\eta_{2}(C_{13}-C_{23}-C_{32}+C_{31}),$$

$$\text{with } \eta_{1}=\frac{(\Delta\varepsilon_{11}^{0}-\Delta\varepsilon_{22}^{0})^{2}}{(\Delta\varepsilon_{11}^{0}-\Delta\varepsilon_{22}^{0})^{2}+(\Delta\gamma_{12}^{0})^{2}}, \eta_{2}=\frac{(\Delta\varepsilon_{11}^{0}-\Delta\varepsilon_{22}^{0})\Delta\gamma_{12}^{0}}{(\Delta\varepsilon_{11}^{0}-\Delta\varepsilon_{22}^{0})^{2}+(\Delta\gamma_{12}^{0})^{2}}. \tag{4-53}$$

For cases when the denominator $(\Delta\varepsilon_{11}{}^{0}-\Delta\varepsilon_{22}{}^{0})^{2}+(\Delta\gamma_{12}{}^{0})^{2}$ vanishes, $\eta_{1}=0.5$ and $\eta_{2}=0$ are used. Specifically, if the effective macroscopic material is orthotropic, the third term in Eq. (4-52) can be dismissed. Similarly, this self-consistent scheme can also be extended to 3D materials. The expressions of $\kappa^{0}$ and $\mu^{0}$ for the 3D self-consistent scheme are derived based on Eq. (4-49) and (4-50).

$$\kappa^{0}=\frac{C_{11}+C_{12}+C_{13}+C_{21}+C_{22}+C_{23}+C_{31}+C_{32}+C_{33}}{9} \text{ and} \tag{4-54}$$

$$\mu^{2}=\frac{\Delta\varepsilon_{d}^{0}:C:\Delta\varepsilon_{d}^{0}}{\Delta\varepsilon_{d}^{0}:T:\Delta\varepsilon_{d}^{0}}, \tag{4-55}$$

where T is a transformation tensor derived from the optimum problem. It can be written in Voigt notation as $$T = \begin{Bmatrix} 4/3 & -2/3 & -2/3 & 0 & 0 & 0 \\ -2/3 & 4/3 & -2/3 & 0 & 0 & 0 \\ -2/3 & -2/3 & 4/3 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{Bmatrix}. \tag{4-56}$$

Eqs. (4-52) and (4-55) show that the optimum shear modulus, $\mu^0$, is weighted by the loading direction, which helps to capture the hardening effect on the stiffness tensor. This improves the accuracy of the self-consistent scheme, as compared to simply determining $\kappa^0$ and $\mu^0$ by minimizing the distance between the stiffness tensors $C_{iso}^0$ and C, which would correspond to averaging the optimum shear modulus in all directions.

The algorithm of the self-consistent scheme comprises the following steps.

1. Initial conditions and initialization: set $(\kappa^0, \mu^0)$; n=0; $\{\Delta\varepsilon_m^I, \Delta\varepsilon^0\}_n$=0;
2. For loading increment n+1, update the interaction tensor $D^{JJ}$ and the stiffness tensor of the reference material $C^0$ based on $(\kappa^0, \mu^0)$;
3. Solve the discretized Lippmann-Schwinger equation (4-36). For nonlinear materials, Newton's method is used;
4. Compute the effective stiffness tensor C, and calculate the optimum $(\kappa^0, \mu^0)$ using Eqs. (4-51) and (4-52) (2D plane strain);
5. Check error criterion for $(\kappa^0, \mu^0)$; if not met, go to step 2;
6. Update the strain and stress increments: $\{\Delta\varepsilon_m^I, \Delta\varepsilon^0\}_{n+1}$, $\{\Delta\sigma_m^I\}_{n+1}$;
7. Update the index of loading increment: n←n+1; and
8. If simulation not complete, go to step 2.

For nonlinear materials, the stress increment $\Delta\Lambda_m^J$ is a nonlinear function of its strain increment $\Delta\varepsilon_m^J$, and Newton's method is normally used to solve the nonlinear system iteratively at each load increment.

Microscale Elasto-Plastic RVE with Damage

Numerical examples are presented to investigate and demonstrate the performance of the micro-damage algorithm combined with an SCA reduced order model. A detailed study is performed at the microscale RVE level to investigate the effect of RVE size, and to validate the RVE predictions from the SCA model against high-fidelity direct numerical simulations (DNS) with the finite element method and the FFT-based method using a fine mesh and periodic boundary conditions. The computational efficiency of the proposed method is also discussed.

Material Properties and Damage Parameters

Figure 40:
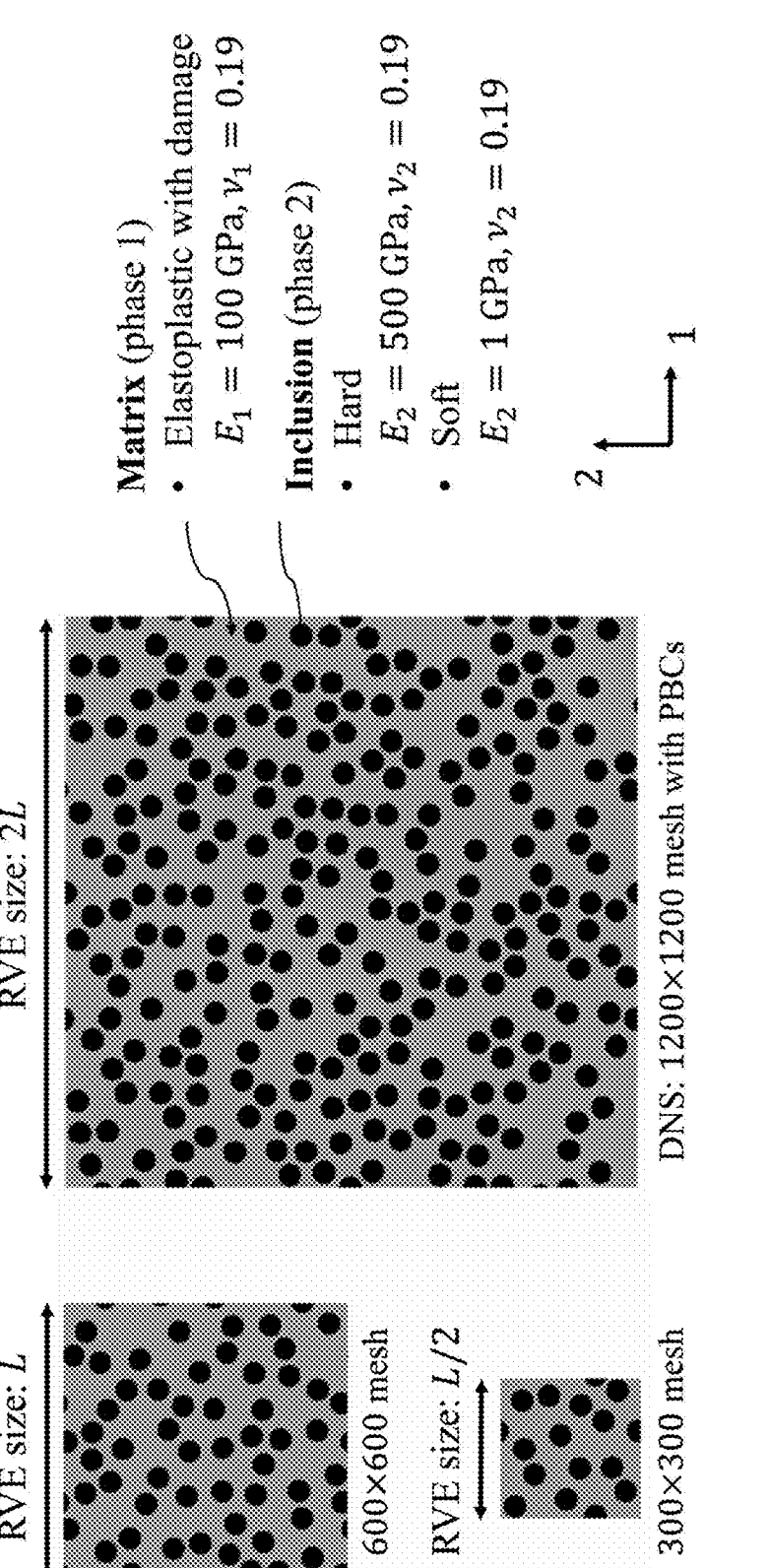
FIG. 40 shows illustration of the microscale RVE of a two-phase heterogeneous material used for the analysis according to embodiments of the invention: matrix (phase 1) with randomly distributed circular inclusions (phase 2) embedded. The DNS with 12000×1200 FE mesh has 1.44 million 4-node linear plane strain element with reduced integration.

The SCA is applied for the homogenization analysis of a nonlinear elasto-plastic heterogeneous material with damage under 2D plane strain conditions. As shown in FIG. 40, an RVE is created with multiple identical circular inclusions (phase 2) embedded in the matrix (phase 1). The volume fraction of the inclusion phase is 30%. In practice, the microstructural morphology of the RVE can be obtained from imaging techniques (e.g., scanning electron microscope and focus ion-beam) or computational reconstruction. For SCA results comparison and validation, the problem is initially solved using a 1200×1200 DNS model with sides of length 2L and periodic boundary conditions.

To develop the material clustering database in the offline stage of SCA, linear elastic material properties are used for the phase 1 and phase 2 materials:

$$E_1=100 \text{ GPa}, v_1=0.3; E_2=500 \text{ GPa}, v_2=0.19. \tag{4-57}$$

where the subscripts 1 and 2 refer to the matrix phase and inclusion phase, respectively. The clustering results based on the material properties in Eq. (4-57) are shown in FIG. 39. The number of phase 1 clusters is denoted as $k_1$, and the number of phase 2 clusters is denoted as $k_2$. The ratio between $k_1$ and $k_2$ is defined according to the phase volume fractions. For the composite material used in this paper, the number of clusters in phase 2 is chosen as approximately half the number of clusters in phase 1

$$\left(k_2 = \left[\frac{k_2}{2}\right]\right),$$

since me volume traction of phase 2 is 30%. It will be shown above that it is possible to use the same material database with the same RVE geometry but different phase properties.

After forming the material database, different material properties for the constituent materials can be evaluated. The matrix phase is modeled as an elasto-plastic material which undergoes damage. Its local constitutive law is given in Eq. (4-5) and an associative plastic flow law with a von Mises yield surface is considered. The yield stress $\sigma_Y$ is determined by the hardening law as a function of the effective plastic strain $\bar{\varepsilon}^{pl}$, which is a monotonically increasing internal state variable of the plastic material during the deformation. The yielding stress $\sigma_Y^0$ is equal to 0.5 GPa. The hardening law is considered to be piecewise linear and isotropic, $$\sigma_Y(\bar{\varepsilon}^{pl}) = \begin{cases} 0.5 + 5\bar{\varepsilon}^{pl} & \bar{\varepsilon}^{pl} \in [0,0.04) \\ 0.7 + 2\bar{\varepsilon}^{pl} & \bar{\varepsilon}^{pl} \in [0.04, \infty) \end{cases} \text{ GPa}. \tag{4-58}$$

The inclusions remain as a linear elastic material, but either hard or soft inclusions can be considered by making the Young's modulus of the inclusions either harder or softer than the matrix phase. For these two cases, the properties of the inclusion phase evaluated are $$E_2=500 \text{ GPa}, v_2=0.19 \text{ hard inclusions}, \tag{4-59}$$

and $$E_2=1 \text{ GPa}, v_2=0.19 \text{ soft inclusions}. \tag{4-60}$$

Damage evolution is modeled as an exponential function of the effective plastic strain, $$d_m(\bar{\varepsilon}^{pl}) = \begin{cases} 0 & \text{if } \bar{\varepsilon}^{pl} \leq \bar{\varepsilon}^{cr} \\ 1 - \frac{\bar{\varepsilon}^{cr}}{\bar{\varepsilon}^{pl}} \exp(-\alpha(\bar{\varepsilon}^{pl} - \bar{\varepsilon}^{cr})) & \text{if } \bar{\varepsilon}^{pl} > \bar{\varepsilon}^{cr} \end{cases} \tag{4-61}$$

where $\alpha$ is an evolution rate parameter and $\bar{\varepsilon}^{cr}$ is the critical effective plastic strain at damage initiation. Since the damage process is irreversible, $\alpha \geq 0$. If $\alpha=0$, the material is purely elasto-plastic with no damage. For positive $\alpha$, a fully damaged condition ($d_m=1$) will be achieved at a finite effective plastic strain. Unless otherwise stated, the baseline damage properties used in this section are $\alpha=100$ and $\bar{\varepsilon}^{cr}=0.02$. The material parameters of the RVE are summarized in Table 4-2. nnil Material parameters of the microscale elasto-plastic RVE with damage.nnil

TABLE 4-1

Material parameters of the microscale elasto-plastic RVE with damage.

| $E_1$ (GPa) | $v_1$ | $E_2$ (hard) (GPa) | E2 (soft) (GPa) | $v_2$ | $\sigma_Y{}^0$(GPa) | $\alpha$ (default) | $\bar{\varepsilon}^{cr}$ (default) |
|---|---|---|---|---|---|---|---|
| 100 | 0.3 | 500 | | 0.3 | 0.5 | 100 | 0.02 |

TABLE 4-2

Comparison of the toughness UT obtained using DNS for RVE sizes L/2, L, and 2L.
Value in parenthesis indicates relative difference to the corresponding prediction
from RVE with size 2L. Toughness units are GJ/m³.

| RVE | Hard inclusions | | | Soft inclusions | | |
|---|---|---|---|---|---|---|
| Size | Uniaxial | Biaxial | Shear | Uniaxial | Biaxial | Shear |
| 2L | 0.0735 | 0.3072 | 0.0103 | 0.0046 | 0.0049 | 0.0068 |
| L | $0.0749_{(1.9\%)}$ | $0.3184_{(3.6\%)}$ | $0.0104_{(1.0\%)}$ | $0.0044_{(4.3\%)}$ | $0.004903_{(0.5\%)}$ | $0.0070_{(2.9\%)}$ |
| L/2 | $0.08^29_{(12.7\%)}$ | $0.3240_{(5.4\%)}$ | $0.0111_{(78\%)}$ | $0.0056_{(21.7\%)}$ | $0.0060_{(22.4\%)}$ | $0.0075_{(10.3\%)}$ |

RVE Size and the Stabilized Micro-Damage Algorithm

The effect of RVE size on the homogenized results is evaluated under uniaxial tension, biaxial tension, and shear loading conditions. A comparison is made between an RVE of size L/2, an RVE of size L, and an RVE of size 2L (see FIG. 40). Each RVE had the same inclusion radius, volume fraction, and nearest inclusion distance. Three loading directions in terms of the macroscopic strain $\varepsilon_M$ are considered:

1) uniaxial strain condition $$\{\varepsilon_M\}_{11}=\bar{\varepsilon}, \{\varepsilon_M\}_{22}=0, \{\varepsilon_M\}_{12}=0; \qquad (4\text{-}62)$$

2) biaxial strain condition $$\{\varepsilon_M\}_{11}=\bar{\varepsilon}, \{\varepsilon_M\}_{22}=\bar{\varepsilon}, \{\varepsilon_M\}_{12}=0; \qquad (4\text{-}63)$$

3) shear strain condition $$\{\varepsilon_M\}_{11}=\bar{\varepsilon}, \{\varepsilon_M\}_{22}=-\bar{\varepsilon}, \{\varepsilon_M\}_{12}=0; \qquad (4\text{-}64)$$

where $\bar{\varepsilon}$ denotes the magnitude of the macroscopic strain.

Figures 41, 42:
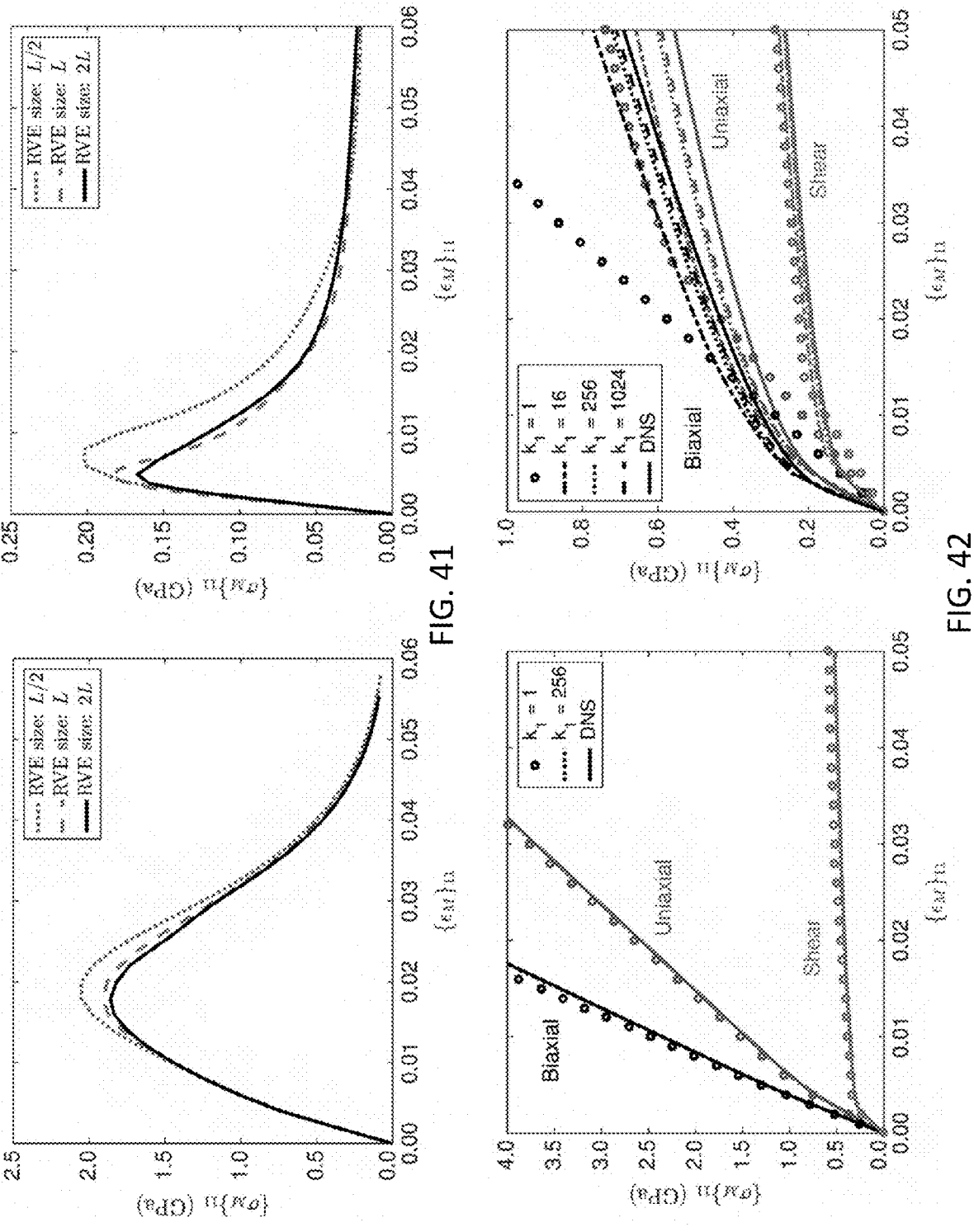
FIG. 41 shows the DNS results for the micro-damage algorithm of a damaged RVE with hard inclusions (left) and soft inclusions (right) under uniaxial loading according to embodiments of the invention. Three different RVE sizes are investigated:L/2, L, and 2L.
FIG. 42 shows the stress-strain curves of the undamaged RVE with hard inclusions (left) and soft inclusions (right) according to embodiments of the invention. Three macro-strain loading conditions are considered: uniaxial loading (blue), biaxial loading (black) and shear loading (red). The solid lines represent the DNS results for comparison.

For each step in the proposed homogenization scheme above, the computations are performed using a finite element model with periodic boundary conditions. The homogenized stress-strain curves $\{\sigma_M\}_{11}-\{\varepsilon_M\}_{11}$ for the damaged RVEs are shown in FIG. 41, where the subscript 11 indicates the homogenized values in the 11 direction (direction of uniaxial loading). nnil Comparison of the toughness $U_T$ obtained using DNS for RVE sizes L/2, L, and 2L. Value in parenthesis indicates relative difference to the corresponding prediction from RVE with size 2L. Toughness units are GJ/m³.

TABLE 4-3

Computational time of the RVE homogenization of various numbers of clusters on one
Intel i7-3632 processor.

| | ki | | | | | | |
|---|---|---|---|---|---|---|---|
| | 1 | 4 | 16 | 64 | 256 | 102 | DNS time |
| Wall clock | 0.23 | 0.35 | 0.80 | 2.5 | 11.2 | 117. | 7814 |
| Speedup of SCA | $3.4 \times 10^4$ | $2.2 \times 10^4$ | $9.8 \times 10^3$ | $3.1 \times 10^3$ | 698 | 66 | NA |

TABLE 4-4

Calibrated damage parameters $(\alpha, \bar{\varepsilon}^{cr})$ for SCA
for different numbers of clusters using energy regularization.
The damage parameters are unitless.

| | Hard inclusions | | Soft inclusions | |
|---|---|---|---|---|
| | $\alpha$ | $\bar{\varepsilon}^{cr}$ | $\alpha$ | $\bar{\varepsilon}^{cr}$ |
| $k_1 = 4$ | 52 | 0.0092 | 100 | 0.0015 |
| $k_1 = 8$ | 62 | 0.0112 | 60 | 0.0015 |
| $k_1 = 16$ | 63 | 0.0120 | 60 | 0.0020 |
| $k_1 = 32$ | 67 | 0.0128 | 50 | 0.0020 |
| $k_l = 64$ | 72 | 0.0134 | 40 | 0.0020 |
| $k_1 = 128$ | 77 | 0.0140 | 30 | 0.0020 |
| $k_1 = 256$ | 81 | 0.0146 | 30 | 0.0025 |
| DNS | 100 | 0.02 | 100 | 0.02 |

Inspection of the curves in FIG. 41 reveals some change in the macroscopic responses given by the micro-damage homogenization algorithm, but the response with damage is not overly sensitive to the RVE size.

The material toughness $U_T$ is defined as the energy per unit volume absorbed before material failure due to load in a fixed loading direction. In a one-dimensional case, the material toughness is simply the area under a stress-strain curve. In general, this is expressed mathematically as 61 62

$$U_T = \int_0^{\varepsilon_M^f} \sigma_M^d d\varepsilon_M, \qquad (4\text{–}65)$$

where $\varepsilon_M^f$ is the failure strain for a fully damaged material ($d_M$=0.99 is used as the failure strain in this calculation). The The computational cost comparison in Table 4-3 shows that a typical two-dimensional DNS calculation with a 1200×1200 mesh and 50 loading increments requires 7814 s ($\approx$130 min) on one Intel i7-3632 processor, while the online stage of SCA (programmed in MATLAB) took 0.35 s, 2.5 s, 117.8 s on one Intel i7-3632 processor for $k_1$=4, $k_1$=64 and $k_1$=1024, respectively.

TABLE 4-5

Computational time of the 2D concurrent simulations of various numbers of clusters in phase 1 on 24 cores.

| | k1 | | | | | |
|---|---|---|---|---|---|---|
| | 4 | 8 | 16 | 32 | 64 | Estimated DNS time |
| Wall clock time (min) | 19 | 44 | 117 | 416 | 1948 | $4.2 \times 10^5$ (295 days) |
| Speedup of SCA | $2.2 \times 10^4$ | $9.5 \times 10^3$ | $3.6 \times 10^3$ | $1.0 \times 10^3$ | 216 | NA | tabulated results in Table 4-4 show that the relative difference of the material toughness decreases with increasing RVE size. The homogenized results are not sensitive to the RVE size, which validates the existence of the RVE. Therefore, it provides an effective material damage model for a macroscale material point within a concurrent simulation.

SCA for an RVE with Hard/Soft Inclusions without Material Damage

The SCA reduced order method is first applied to an elasto-plastic RVE without considering material damage. The material clustering database is determined in the offline stage using hard inclusions.

Three loading directions in terms of the macroscopic strain are considered: 1) uniaxial tension, 2) biaxial tension, and 3) shear. The homogenized stress strain curves in the 11 direction ($\{\sigma_M\}_{11}$–$\{\varepsilon_M\}_{11}$) of the undamaged RVE with hard inclusions are presented in the lefthand side of FIG. 42. The numbers of clusters considered in material phase 1 are 1 and 256, and the corresponding DNS results are plotted as the solid lines for comparison. These results show that the SCA predictions under all the three macro-strain constraints are quite accurate, even with only a single cluster in phase 1.

For soft inclusions, it is not possible to achieve the same accuracy with the same number clusters. The right-hand side of FIG. 42 shows that $k_1$=1 is not sufficient to capture the stress-strain relation in the elastic or plastic regimes, especially for the uniaxial and biaxial loading conditions. This observation is consistent with the fact that the self-consistent theory in analytical micromechanics methods tends to underestimate the stiffness of porous materials. Nevertheless, by increasing the resolution in the RVE, good agreement with the DNS results can still be achieved, and with significantly fewer degrees of freedom than required by DNS.

Again, it should be emphasized that although the SCA database is created based on the RVEs with hard inclusions (see Eq. (4-57)), it is valid for other RVEs with the same morphology but different combinations of material properties. As a result, the SCA database (clusters and the interaction tensor $D^{JJ}$ can be regarded as a microstructural database which characterizes the geometric heterogeneity of the material and enables the online reduced-order calculation.

TABLE 4-6

Computational time of the 3D concurrent simulations of various numbers of clusters in phase 1 on 72 cores.

| | SCA ($k_1 = 8$) | Estimated DNS time |
|---|---|---|
| Wall clock time (min) | 56 h | $1.1 \times 10^5$ days |
| Speedup of SCA | $4.6 \times 10^4$ | NA |

SCA for an RVE with Hard/Soft Inclusions and Material Damage

The SCA reduced order method is next applied to the same elasto-plastic RVE with hard and soft inclusions. The matrix phase of the RVE is allowed to undergo material damage, which is computed using the micro-damage algorithm and the damage evolution law in Eq. (4-61).

Figure 43:
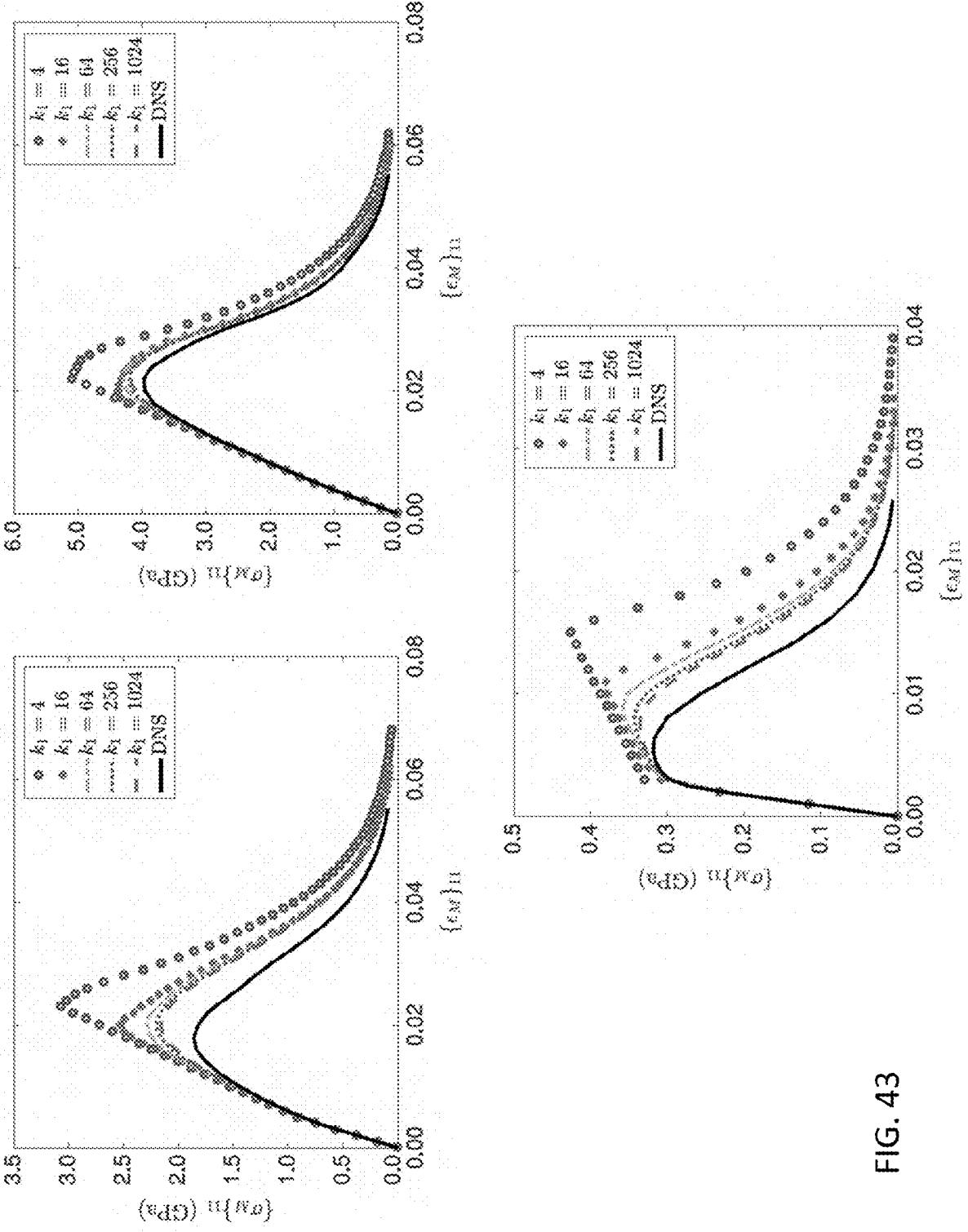
FIG. 43 shows the stress-strain curves of the damaged RVE with hard inclusions for uniaxial tension, biaxial tension, and shear loading according to embodiments of the invention.
Figure 44:
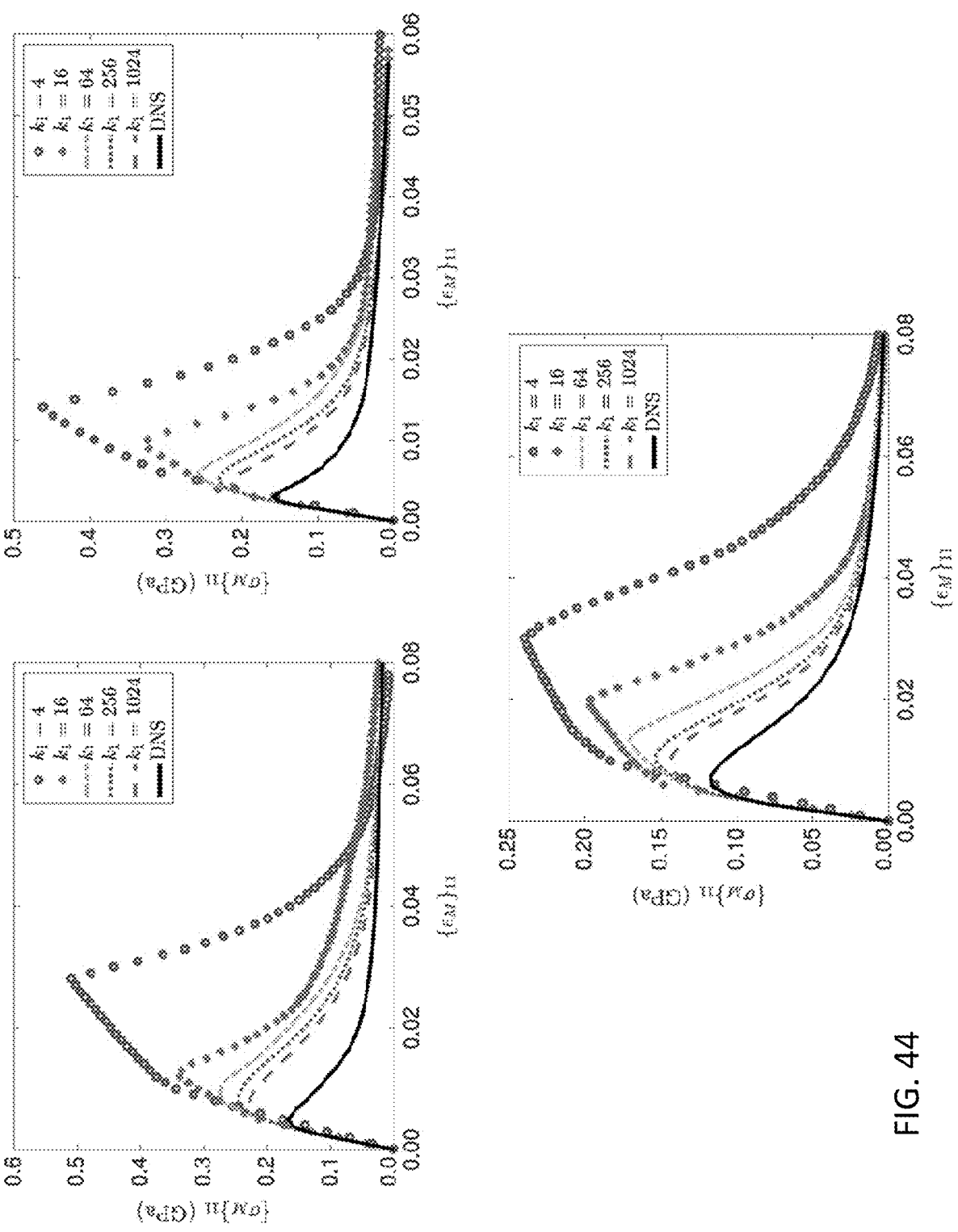
FIG. 44 shows the stress-strain curves of the damaged RVE with soft inclusions for uniaxial tension, biaxial tension, and shear loading according to embodiments of the invention.

The homogenized stress-strain results computed using both DNS and SCA with material damage are shown in FIG. 43 for hard inclusions and FIG. 44 for soft inclusions. Results are presented for uniaxial tension loading, biaxial tension loading, and shear loading. With the same level of discretization, the SCA predictions with material damage considered do not exhibit the same level of accuracy as the SCA predictions without considering material damage (see FIG. 42). The clustering algorithm was noted to be stiffer than the DNS calculation for the number of clusters evaluated. This difference is expected since material damage is a more localized process than plasticity, and more clusters are required for adequate resolution in the damaged region. On the other hand, the clustering result based on linear elastic responses may not be sufficient for capturing highly localized damage behavior, and this issue will be investigated in future work.

For hard inclusions, it can be seen that under biaxial tension loading and shear loading, SCA results matched the peak stresses and damage evolution with very few clusters. For the uniaxial tension loading, the SCA method tends to overpredict the peak stress and damage evolution, meaning that additional clusters may be required. For soft inclusions, the SCA method is capable of capturing the effect of the damage, but tends to overpredict peak stress and damage evolution. This finding is consistent with the findings in the self-consistent micromechanics theory. An energy regularization methodology is presented which provides an effective way of calibrating the damage parameters.

The macroscopic material damage behavior can be characterized by the material toughness, $U_T$, as a function of the strain ratio $\varepsilon_M^R/\varepsilon_M^{avg}$, where $\varepsilon_M^{avg}$ and $\varepsilon_M^R$ denote the macroscopic normal strain and shear strain, respectively. Due to the isotropy of the RVE considered in this work, the material toughness should be uniquely determined by the loading direction denoted by $\varepsilon_M^R/\varepsilon_M^{avg}$. For a given set of $\varepsilon_M^{avg}$ and $\varepsilon_M^R$, the loading condition is defined to be $$\{\varepsilon_M\}_{11}=\varepsilon_M^{avg}, \{\varepsilon_M\}_{22}=\varepsilon_M^{avg}, \{\varepsilon_M\}_{12}=\varepsilon_M^R. \tag{4-64}$$

The material toughness, $U_T$, is defined in Eq. (65). When computing the material toughness for each loading path, the loading direction, or the strain ratio $\varepsilon_M^R/\varepsilon_M^{avg}$, is fixed.

Figures 45, 46:
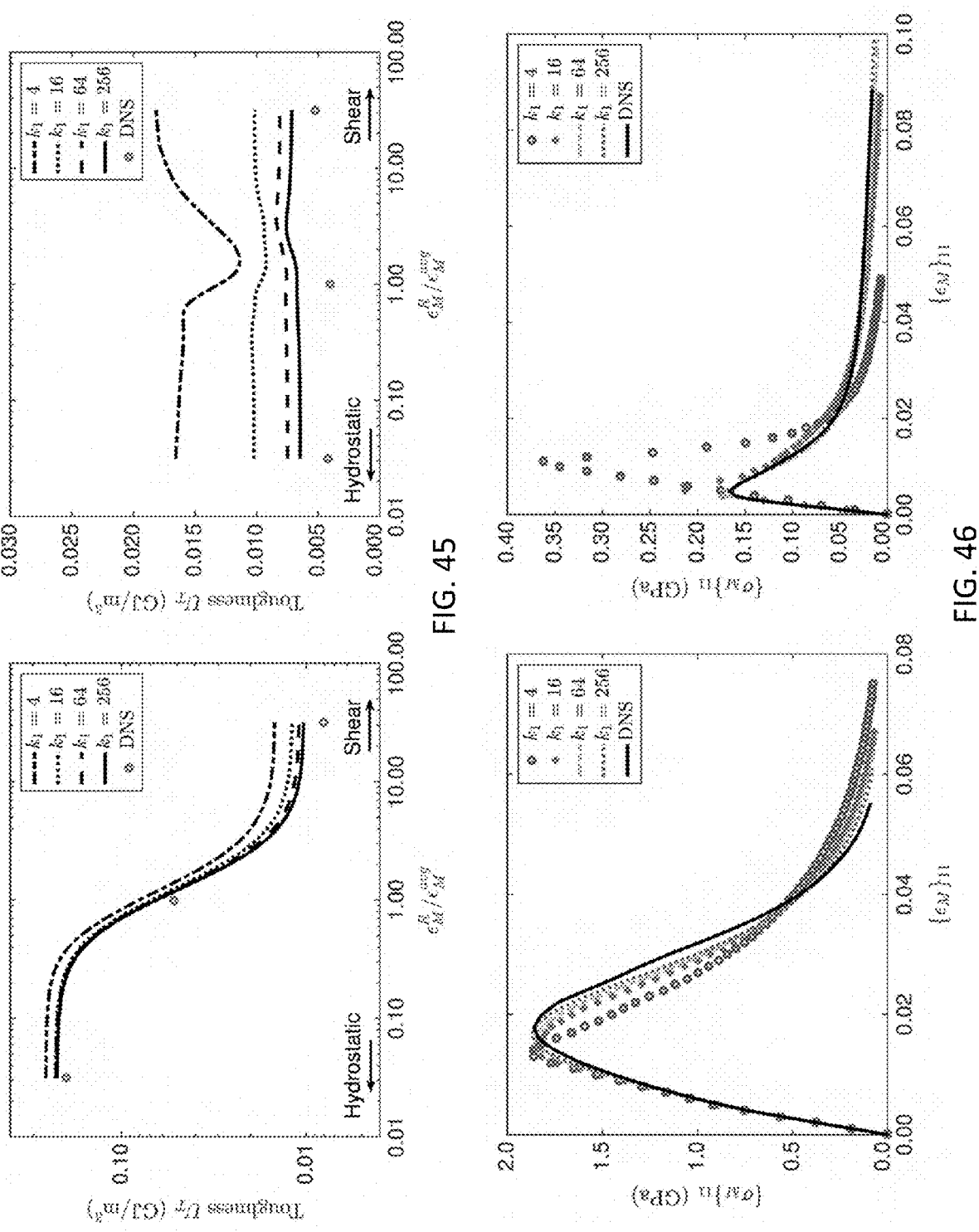
FIG. 45 shows the material toughness calculations for RVEs with hard inclusions (left) and soft inclusions (right) according to embodiments of the invention.
FIG. 46 shows the stress-strain curves of the damaged RVE with hard inclusions (left) and soft inclusions (right) for uniaxial tension loading according to embodiments of the invention. Damage parameters are calibrated using energy regularization.

FIG. 45 shows the material toughness $U_T$ of the RVE as a function of the ratio of $\varepsilon_M^R$ to $\varepsilon_M^R/\varepsilon_M^{avg}$. For hard inclusions, the toughness decreases monotonically with increasing strain ratio $\varepsilon_M^R/\varepsilon_M^{avg}$, and overall effective toughness is higher under the biaxial loading than by pure shearing loading by more than one order of magnitude. Similar to the matrix material, the effective damage evolution of the RVE with hard inclusions is dominated by the deviatoric component of the average stress, resulting in a low toughness under the pure shearing loading. The result for soft inclusions shows that the material toughness is no longer a monotonic function of the strain ratio, and that the material toughnesses does not vary much with the strain ratio. This can be explained by the fact that the soft inclusions undergo volumetric change under hydrostatic loading, which also induces high shear deformation and damage in the surrounding matrix material.

Energy Regularization for Calibrating Damage Parameters

The damage model should correctly reflect the energy dissipation in the macroscale fracture process. As a result, where $U_F$ represents the energy dissipated by fracture per unit volume at a material point. In the paper, the material toughness, $U_T$, is used to approximate the fracture energy, $U_F$, $$G_c \approx l_h U_T(\alpha_0, \bar{\varepsilon}_0^{cr}), \tag{4-69}$$

The fracture energy, $G_c$, is usually measured experimentally, but for demonstration purposes, the DNS results are used as the reference solution for calibrating the damage evolution rate, $\alpha$, and the critical plastic strain, $\bar{\varepsilon}_0^{cr}$, in the SCA model for energy consistency. Since the length parameter, $l_h$, is determined by the macroscale model, one only needs to match the material toughness between the SCA and DNS RVE models:

$$U_T^{SCA,k}(\alpha_0, \bar{\varepsilon}_0^{cr})=U_T^{DNS}(\alpha_0, \bar{\varepsilon}_0^{cr}), \tag{4-70}$$

The damage parameters $\alpha_0$ and $\bar{\varepsilon}_0^{cr}$ used for the DNS calculation are $\alpha_0=100$ and $\bar{\varepsilon}_0^{cr}=0.02$. Additionally, it is important to match the maximum stress, $\sigma_0$, during the loading process, which corresponds to the ultimate strength of the material.

$$\sigma_c^{SCA,k}(\alpha_0, \bar{\varepsilon}_0^{cr})=\sigma_c^{DNS}(\alpha_0, \bar{\varepsilon}_0^{cr}). \tag{4-71}$$

Figure 47:
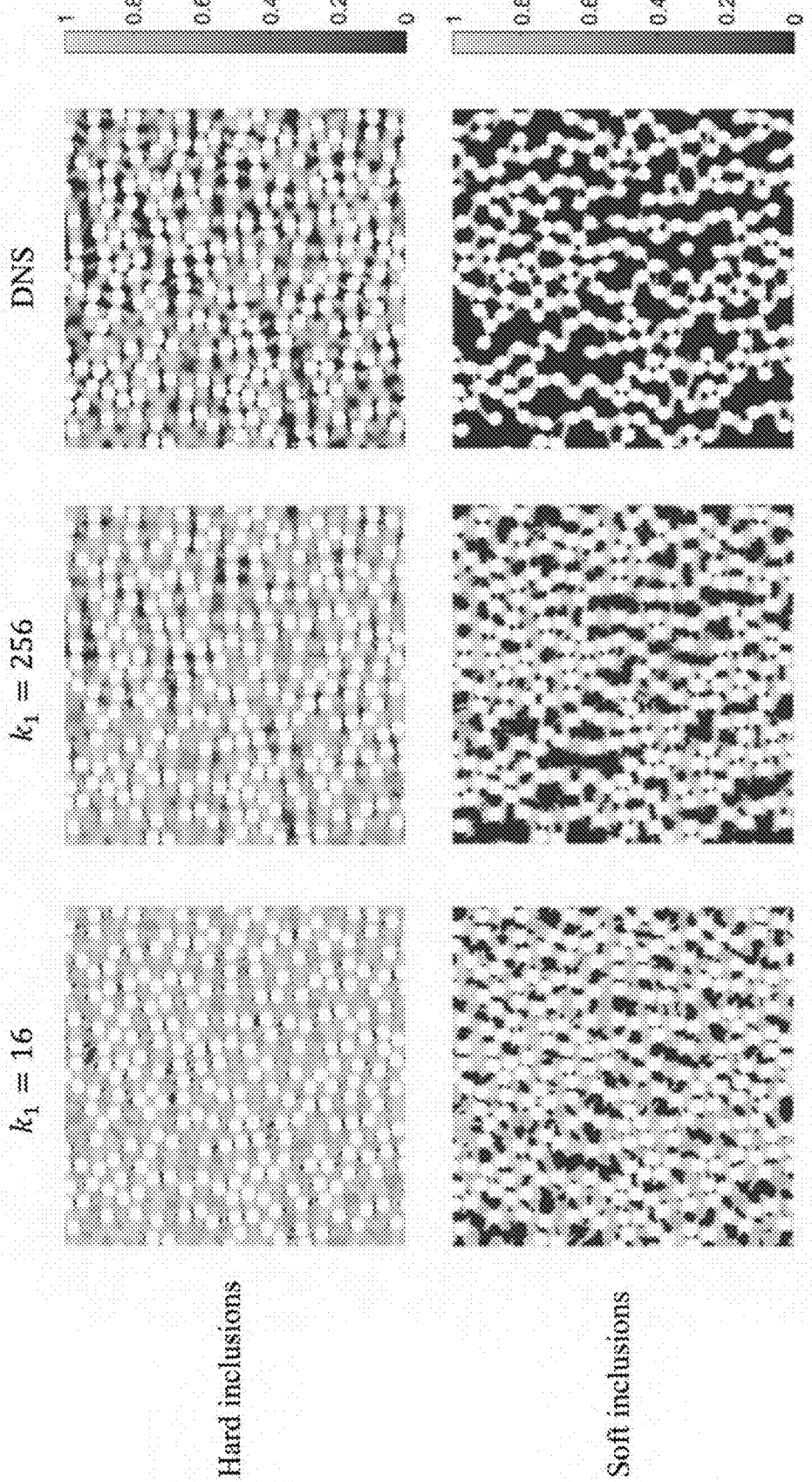
FIG. 47 shows RVE damage fields in the matrix phase at $\{\varepsilon_M\}_{11}$=0.04 predicted by DNS and SCA following energy regularization for hard inclusions and soft inclusions according to embodiments of the invention. No damage is considered in the inclusion phase.
Figures 48, 49:
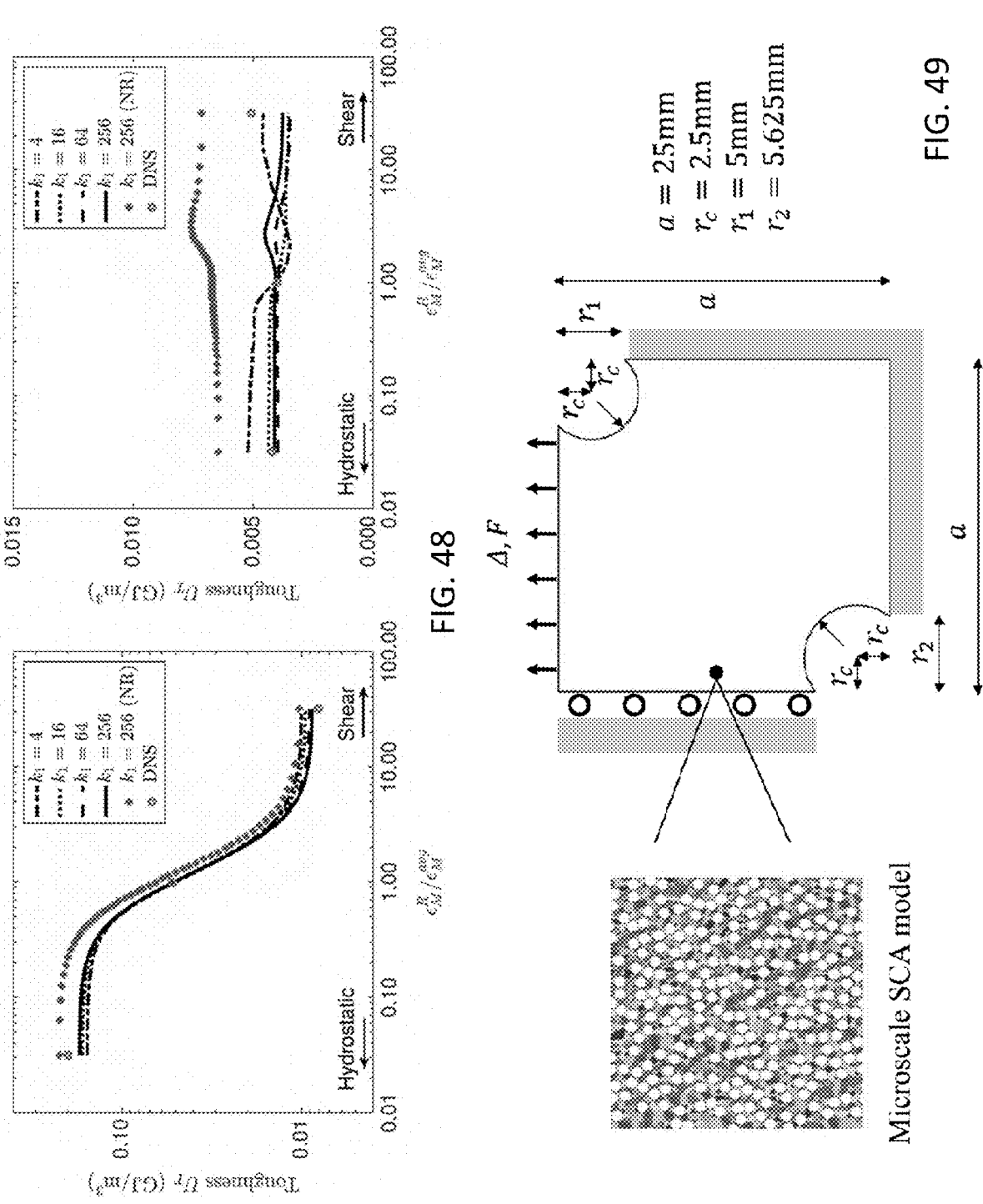
FIG. 48 shows the material toughness calculations following energy regularization for hard inclusions (left) and soft inclusions (right) according to embodiments of the invention. The results without energy regularization are plotted for reference, and are denoted as (NR).
FIG. 49 shows geometry of the double-notched specimen in the 2D plane-strain condition according to embodiments of the invention.

The damage parameters calibrated under uniaxial tension loading are provided in Table 4-8. The homogenized stress-strain curves following energy regularization are shown in FIG. 46. For the material with hard inclusions, it is possible to match the peak stress with very few clusters, but matching the damage evolution curve requires more clusters. For the material with soft inclusions, more clusters are required to match both the peak stress and the damage evolution curve. A comparison is provided in FIG. 47 between the damage fields from DNS and SCA following energy regularization. It can be seen that for both hard inclusions and soft inclusions, additional clusters improve the computation of the localized damage fields. FIG. 48 shows the material toughness calculations following energy regularization for hard inclusions (left) and soft inclusions (right). The results without energy regularization are plotted for reference, and are denoted as (NR).

TABLE 4-7

| Summary of the computational time for the RVE homogenization and concurrent simulations. k denotes the total number of clusters in the SCA database. | | | | | |
|---|---|---|---|---|---|
| | 2D RVE | | 213 concurrent | | 3D |
| | SCA (k = 1536) | DNS | SCA (k = 96) | DNS (est.) | SCA (k = 10) | DNS (est.) |
| Time | 118 s | 7814 s | 1948 min | $4.2 \times 10^5$ min | 56 h | $2.4 \times 10^5$ h |
| Speedup | 66 | NA | 216 | NA | $4.6 \times 10^4$ | NA | parameters in the damage evolution law need to be adjusted according to the measured fracture energy $G_c$ under a given loading direction. Mathematically, the fracture energy should be $$G_c=G_c^{DNS}(\alpha_0, \bar{\varepsilon}_0^{cr})=G_c^{SCA,k}(\alpha, \bar{\varepsilon}^{cr}), \tag{4-67}$$

where k denotes the number of clusters in the SCA reduced-order model. The fracture energy $G_c$ represents the dissipated energy due to fracture per unit crack surface in the macroscale, which serves as a physical material constant and should not depend on the choice of numerical models. The units of $G_c$ is $GJ/m^2$. Given a length parameter $l_h$ from the macroscale model, $G_c$ can be expressed as $$G_c=l_h U_F(\alpha_0, \bar{\varepsilon}_0^{cr}), \tag{4-68}$$

Concurrent Multiscale Results and Discussion

Concurrent multiscale simulations involving strain softening and localization are performed under two-dimensional plane strain conditions and in three-dimensions. The proposed micro-damage homogenization scheme coupled with the SCA method is used. In these examples, the macroscale properties are determined by the microstructural morphologies and the microscale constituents. The SCA material database is compiled during the offline stage, greatly reducing the computational cost of analyzing the microscale RVE model with minimal loss of accuracy, and making the concurrent simulation computationally feasible. The homogenized material can predict the macroscale performance while capturing the physical phenomena appearing in the microscale.

2D Double-Notched Plate

A 2D tensile specimen with rounded notches in two corners is depicted in FIG. 49. The notches in the opposite corners cause a geometric stress concentration which will induce localization as the loaded upper edge of the specimen is displaced. The simulations are conducted using the explicit finite element method and 2D plane strain elements with reduced integration (one integration point per element), and the micro-damage algorithm with the SCA model is implemented as a user-defined material at each integration point. Specifically, LU decomposition in the Intel Math Kernel Library (MKL) is utilized for solving the linear systems in the SCA model. A macroscopic element is deleted when the effective damage parameter $d_M$ of its associated RVE reaches 0.99.

Figure 50:
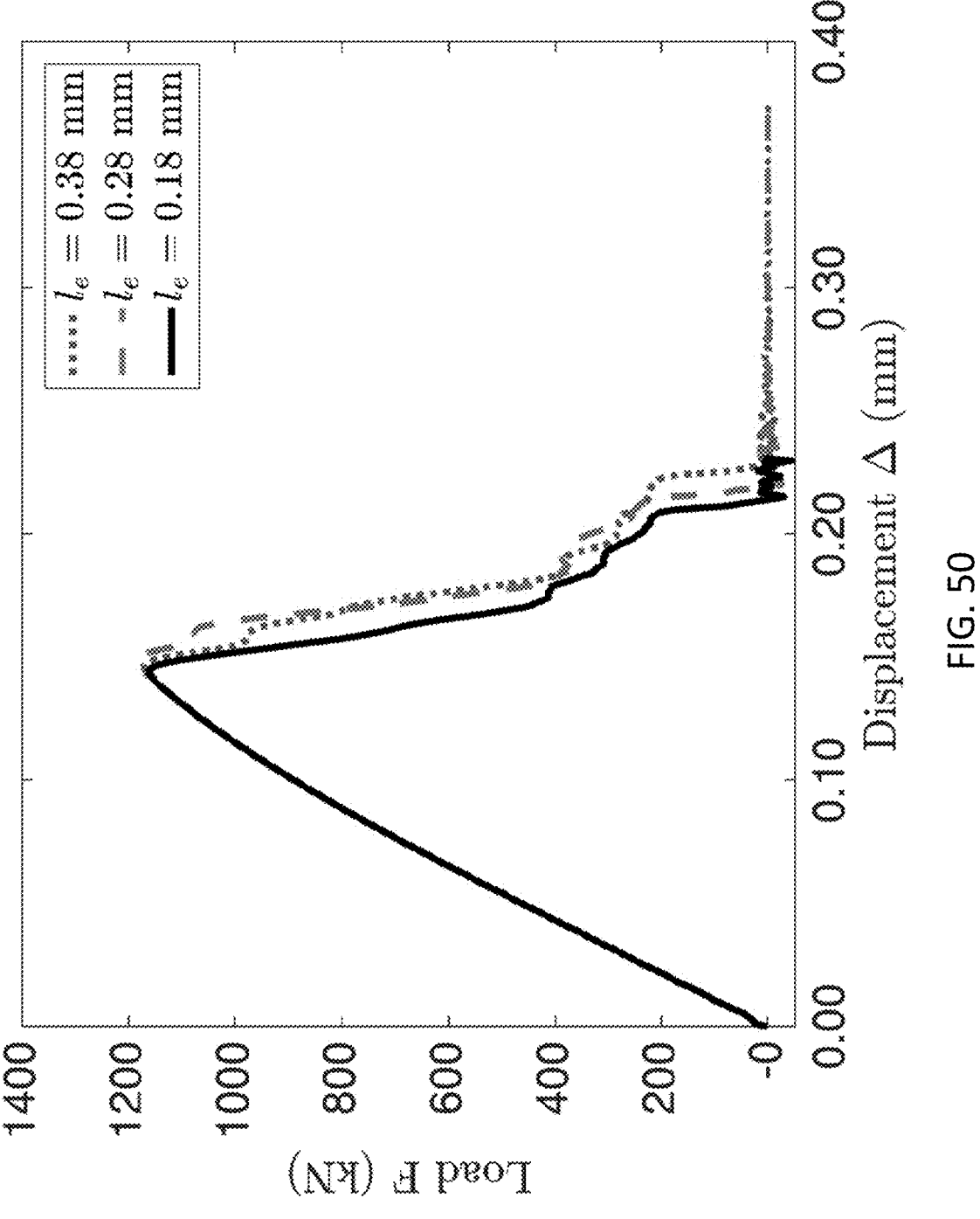
FIG. 50 shows load-displacement curves with different mesh size $l_e$ for hard inclusions according to embodiments of the invention. The non-local length parameter $l_0$ is 2 mm.
Figure 51:
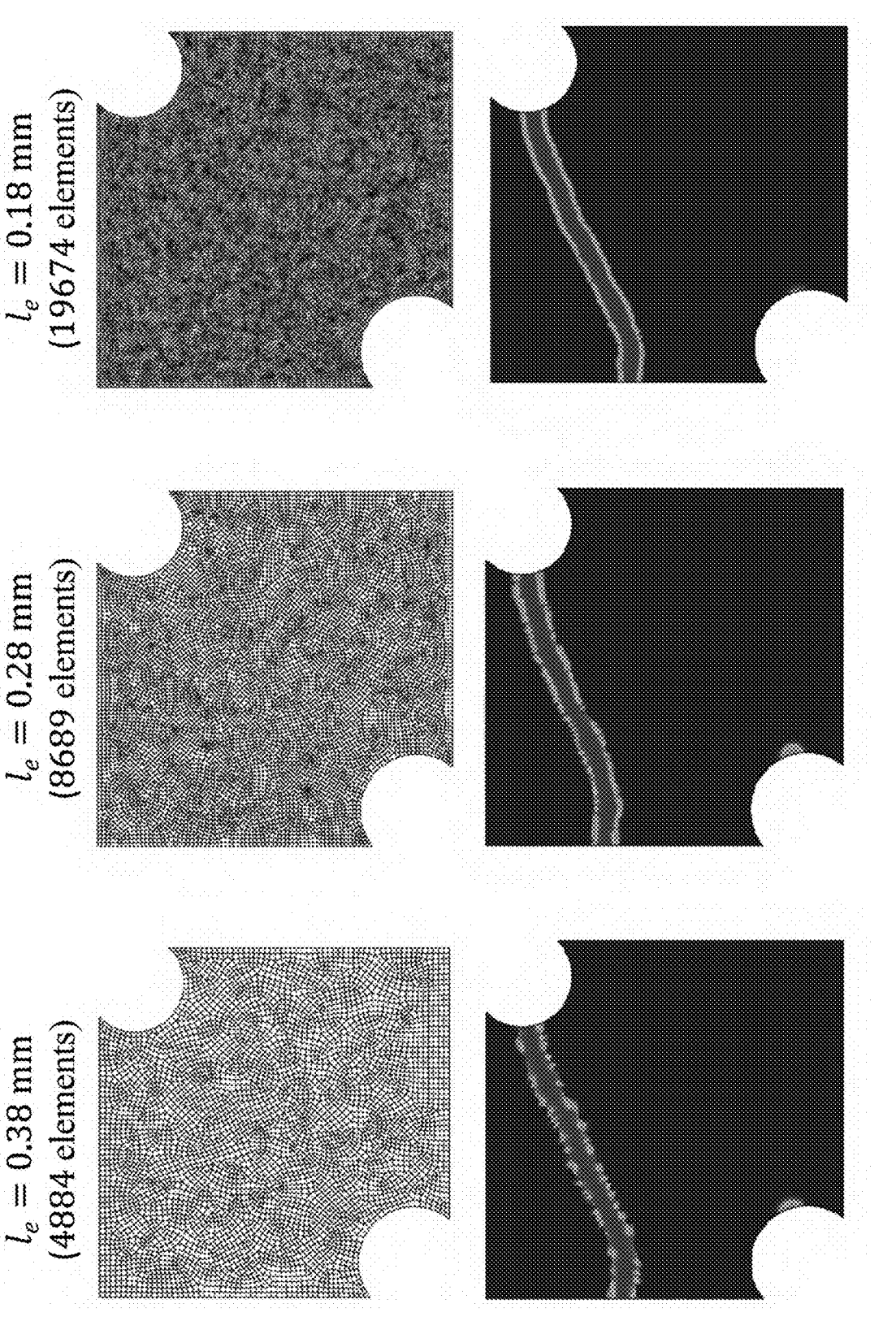
FIG. 51 shows crack patterns with different mesh size $l_e$ for hard inclusions according to embodiments of the invention. The non-local length parameter is $l_0$=2 mm. The SCA model has 32 clusters in the matrix phase ($k_1$=32).

The effectiveness of the non-local formulation is first investigated without considering energy regularization. The microscale is modeled using an RVE with hard inclusions; the SCA database with 32 clusters in the matrix phase is used for the microstructural RVE calculation. FIG. 50 presents the load-displacement curves from the concurrent simulations for three different macroscale FE meshes shown in FIG. 51. A non-local length parameter of $l_0 = 2$ mm is used. Moreover, the crack patterns after the coupon failure for all three mesh sizes are also shown in FIG. 51. It can be concluded that given $l_0 > 4 l_e$, the non-local formulation can effectively diminish the mesh-size dependency, as well as the pathological mesh dependency.

Figures 52, 53:
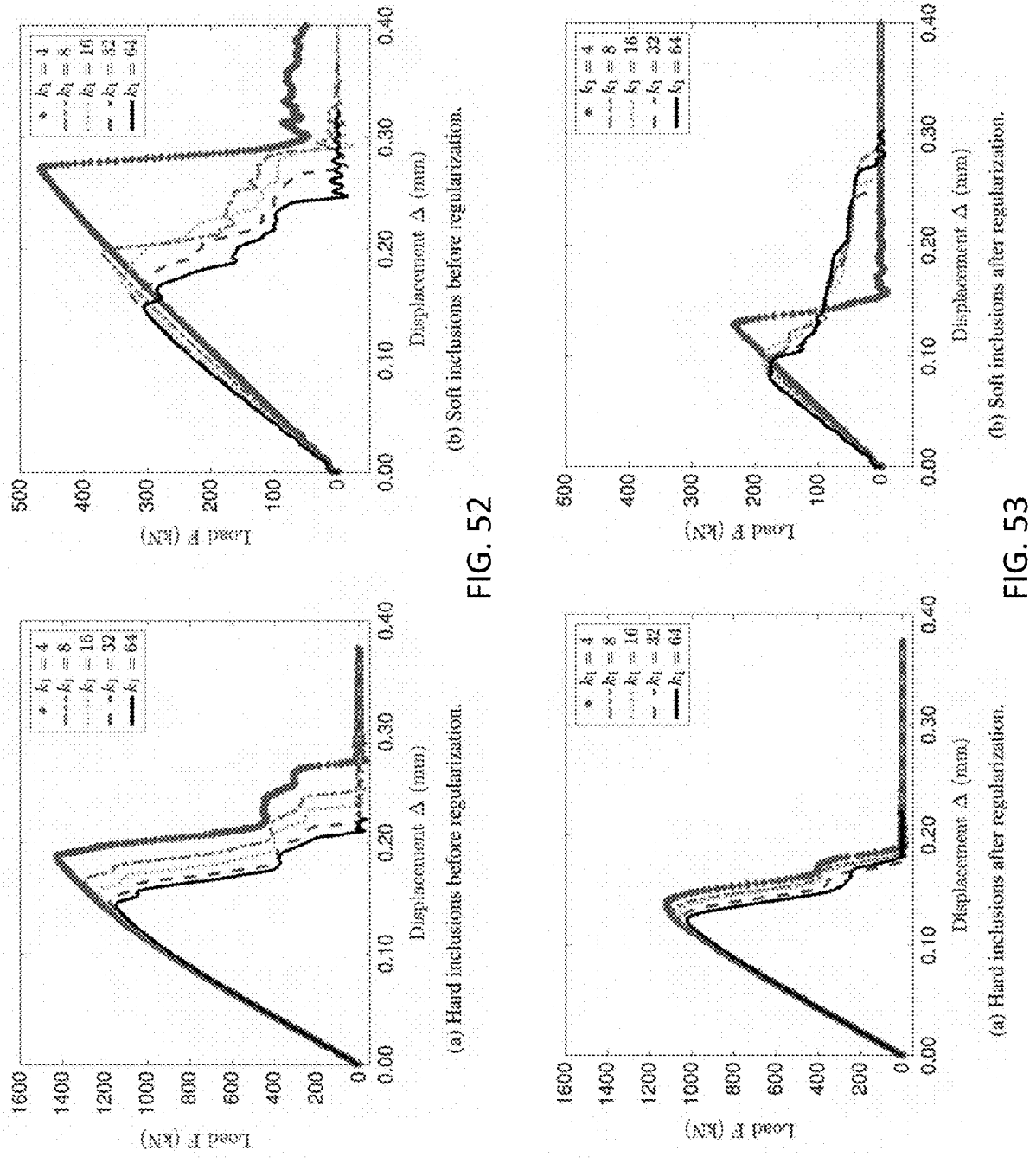
FIG. 52 shows load-displacement curves predicted by SCA databases with different number clusters $k_1$ before energy regularization according to embodiments of the invention.
FIG. 53 shows load-displacement curves predicted by SCA databases with different number clusters $k_1$ after energy regularization according to embodiments of the invention.

FIG. 52 shows the load-displacement curves for RVEs with hard inclusions and soft inclusions predicted using concurrent simulation without energy regularization. The numbers of clusters in phase 1 in the microscale reduced-order model ranges from 4 to 64. Since the concurrent simulation with microscale RVE modeled by DNS is computationally expensive, the multiscale DNS results are not provided for comparison. Faster convergence is observed in models with hard inclusions than those with soft inclusions. In addition, the predictions have a higher fidelity in the elasto-plastic regime than in the strain-softening regime. Increasing the number of clusters in the microscale RVE clearly improves the prediction, but the convergence rate is not satisfactory.

Figure 54:
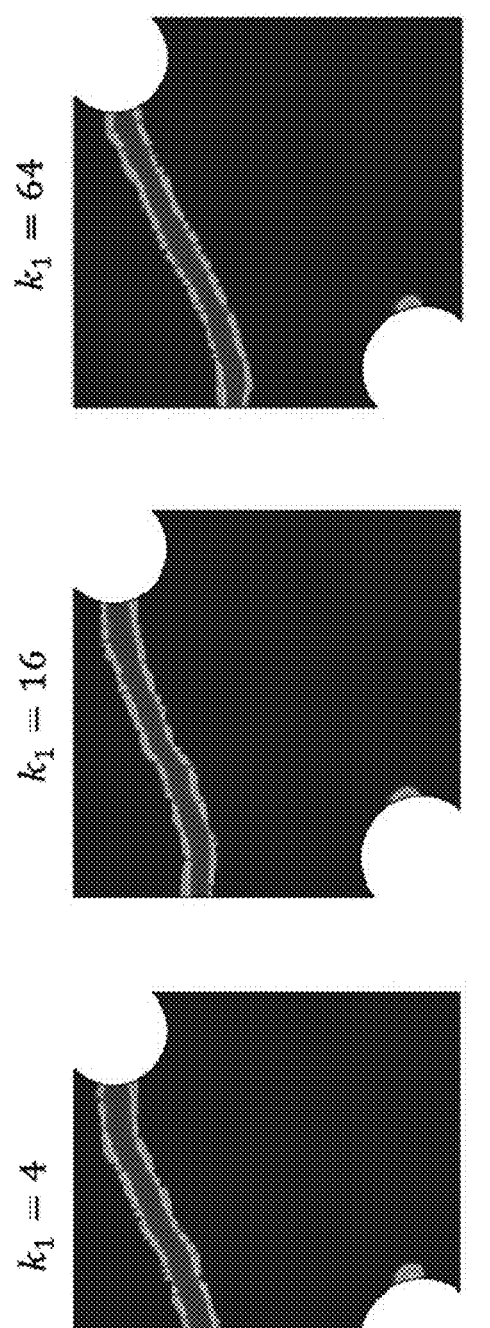
FIG. 54 shows crack patterns predicted by SCA databases with different number clusters $k_1$ after energy regularization. according to embodiments of the invention.
Figure 54:
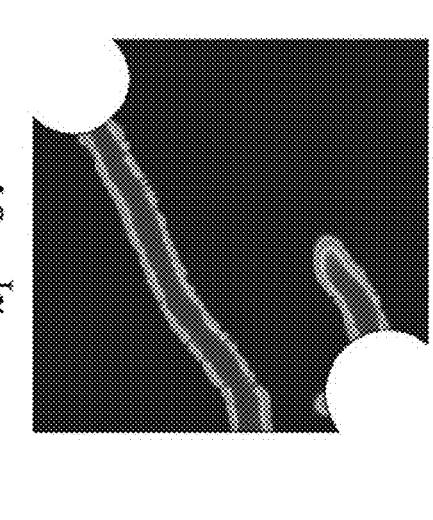
Figure 54:
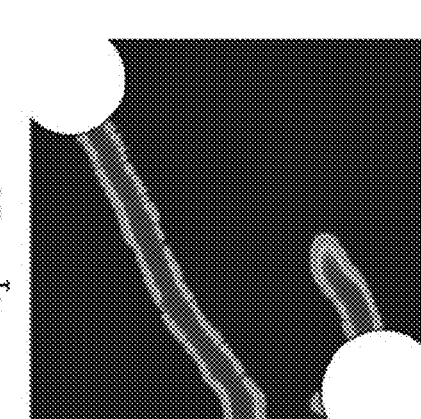
Figure 54:
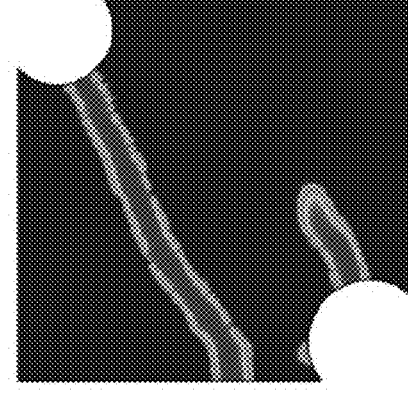
Figure 54:
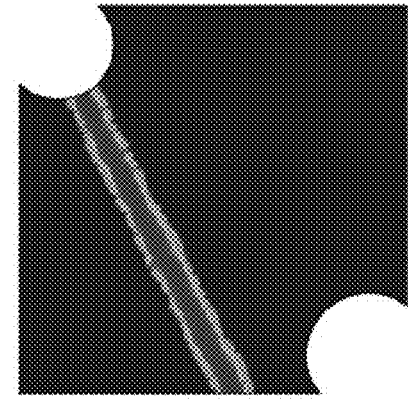

Energy regularization is introduced to increase the fidelity of the calculation. The calibrated damage parameters for different numbers of clusters have been provided in Table 4-4. The load-displacement curves from the concurrent simulations after energy regularization are shown in FIG. 53. It can be seen that the accuracy and convergence rate with respect to the number of clusters have been improved, for both hard and soft inclusions. Meanwhile, FIG. 54 presents the crack patterns from the concurrent simulation with energy regularization, which shows a consistent cracking pattern as the number of cluster is increased. Although the same microstructure and SCA database have been used, the crack patterns for hard and soft inclusions are noticeably different. The influence of micro-constituent on the macro-responses is captured by the concurrent simulation driven by the SCA database.

The computational times for the 2D concurrent simulations and $k_1$ ranging from 4 to 64 are listed in Table 4-5. The macroscale mesh size is $l_e = 0.28$ mm, and there are in total 8689 elements in the model. All the simulations are conducted on 24 cores (in a state-of-the art high performance computing cluster with the following compute nodes: Intel Haswell E5-2680v3 2.5 GHz 12-cores). A linear scalability with the number of cores is observed for small number of clusters. When $k_1 > 16$, the computational time of the concurrent simulation increases approximately as the square of $k_1$. Based on the computational time of SCA ($k_1 = 4$) and DNS for the RVE calculation, the estimated DNS time ($FE^2$) of the concurrent simulation would be 295 days (see Table 4-5).

3D Double-Notched Plate

Figures 55, 56:
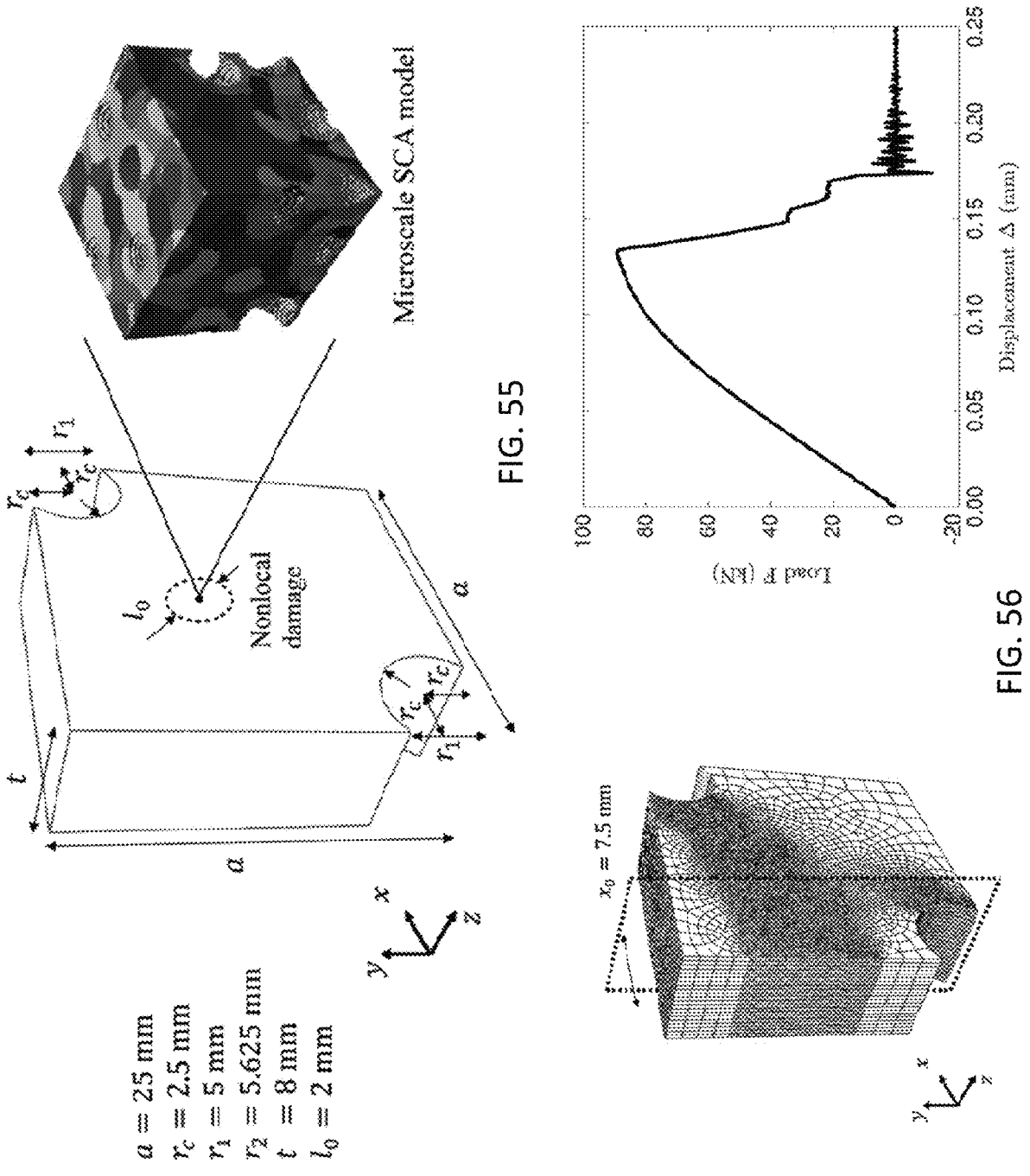
FIG. 55 shows geometry of the 3D double-notched coupon and microscale SCA model with 8 clusters in the matrix phase according to embodiments of the invention. The non-local length parameter $l_0$ is equal to 2 mm.
FIG. 56 shows macroscale FE mesh with local refinement (left) and load-displacement curve of the 3D concurrent simulations with hard inclusions (right) according to embodiments of the invention.

The micro-damage algorithm and the SCA method are further applied to 3D concurrent simulations for the double-notched model shown in FIG. 55. The in-plane shape of the 3D model is identical to the 2D example shown in FIG. 49, and the applied boundary conditions are also identical to the 2D model. The thickness of the FE model is 8 mm. Symmetric boundary conditions are applied on the back face on the X-Y plane (no displacement in the Z-direction), resulting in an effective total thickness of 16 mm. The non-local length parameter is $l_0 = 2$ mm. The mesh is refined in the region containing the crack with the characteristic mesh size $l_e = 0.18$ mm, so there are approximately 10 elements through the thickness of the damage region. For the macroscale FE model, there are in total 154,371 3D hex elements with reduced integration (one Gauss/integration point per element).

The microscale 3D RVE model has identical spherical inclusions embedded in the matrix, and the volume fraction of the inclusion phase is 20%. The corresponding DNS FE mesh for the RVE is 80×80×80. In the microscale SCA model, there are 8 clusters in the matrix phase and 2 clusters in the inclusion phase. An RVE with hard inclusions is considered in the microscale. All the material parameters are the same as before (see Table 4-1). Specifically, the initial damage parameters $\alpha = 100$ and $\bar{\varepsilon}^{cr} = 0.02$ are used. The macroscopic elements will be deleted when the effective damage parameter $d_M$ of the RVE reaches 0.99.

Figure 57:
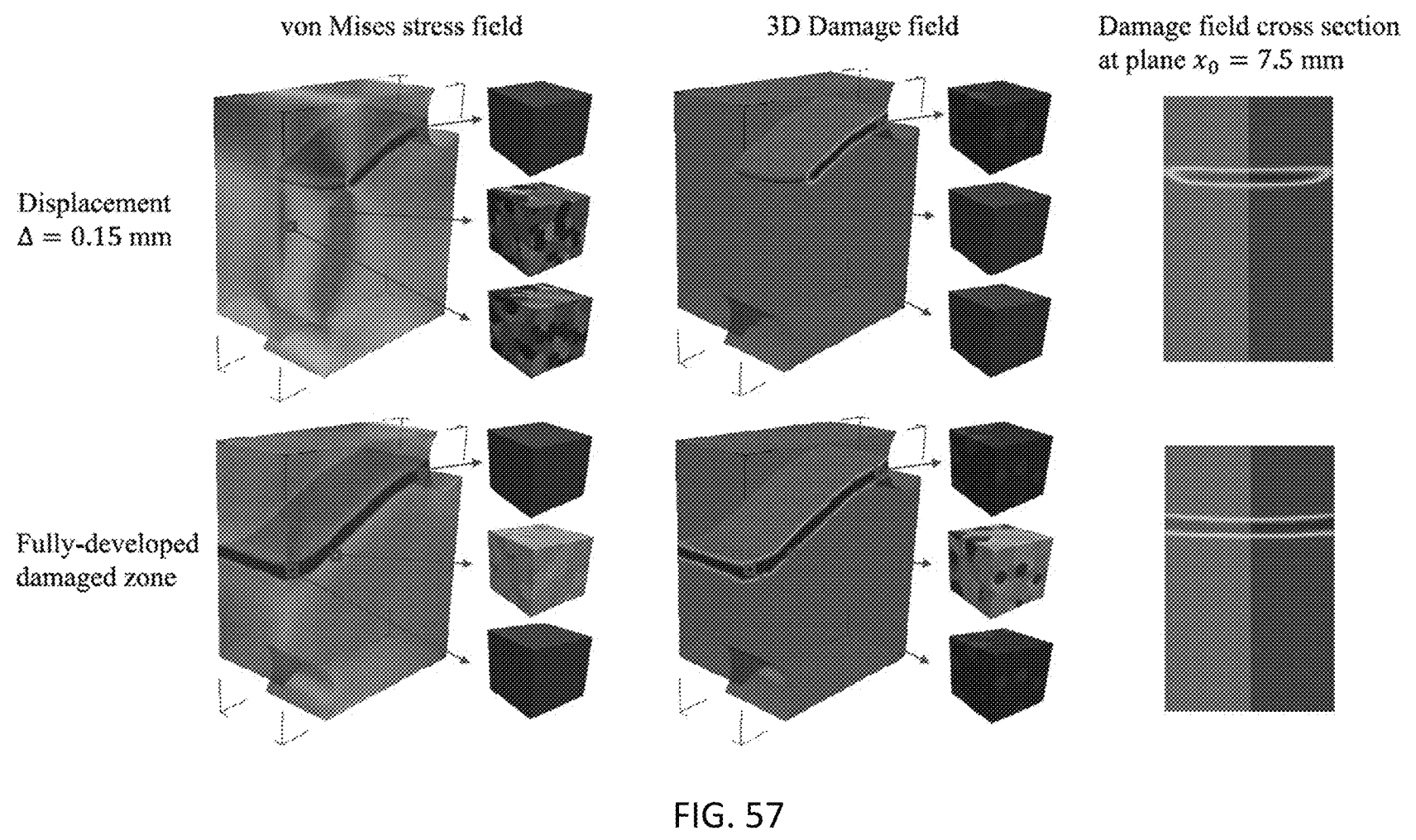

The load-displacement curve from the concurrent simulations with hard inclusions is shown in FIG. 56, and the crack patterns at different loading states are also provided in FIG. 57. In addition, the microscale stress and damage fields are shown for RVEs at different integration points in the macroscale model. In the concurrent coupling, the microscale RVE reduced order model not only provides the overall stress-strain responses for the macroscale FE model, but also stores local quantities such as plastic strain and damage parameter inside the microstructure/clusters. It can be observed that the concurrent simulations are able to demonstrate a non-planar crack through the cross-section due to the constraint effects of the thick coupon. In addition, the crack front is curved, as one can see from the snapshots at displacement $\Delta = 0.15$ mm. The damaged region initiates at the center of the model cross-section and propagates forward and toward the boundaries.

Due to the limitation of computational resources, convergence tests and energy regularization have not yet been performed for the 3D problem, but these preliminary concurrent simulations demonstrate the capability of the SCA multiscale modeling framework for capturing the microstructural effect. By using 72 cores (Intel Haswell E5-2680v3 2.5 GHz 12-cores), the concurrent simulation with the Intel MKL library required approximately 56 hours. Based on the time comparison for the 3D RVE computation, the estimated DNS time for the same concurrent simulation, with the original 80×80×80 FEM mesh in the microscale and the same computational resources, would be more than 1×10 5 days (see Table 4-6).

In this exemplary example, a stable micro-damage algorithm has been introduced which removes the need for a material length parameter in the microstructural RVE. By matching the effective elastic strains of the undamaged and damaged RVE, strain localization is avoided in the microscale RVE, and the homogenized behavior in the strain-softening regime is independent of the RVE size. No material length parameter is required in the microscale, and the RVE homogenization is able to capture the driving mechanisms of the damage process.

A macroscopic material length parameter is utilized to alleviate the material instability associated with strain softening behavior in the macroscopic calculation. It is demonstrated that the non-local damage model with the length parameter can effectively remove the pathological mesh dependence.

The SCA provides an efficient computational technique for an RVE undergoing nonlinear history-dependent deformation. A good tradeoff between efficiency and accuracy is possible with SCA through the domain decomposition based on k-means clustering of high-fidelity data and the micromechanics-based self-consistent scheme. A new projection-based self-consistent scheme for solving the Lippmann-Schwinger equation is proposed in the SCA online/prediction stage, which is able to handle the RVE problem under complex loadings in a concurrent simulation. With the same SCA database, different macroscale crack paths are predicted for RVEs with different inclusion properties (hard inclusions versus soft inclusions). The proposed method is general and can be applied to various material systems with more complex settings.

A solution comparison with the DNS has shown that the proposed micro-damage methodology coupled with the SCA is capable of achieving accurate solutions at an incredible reduction of computational expense (see Table 4-7). For a 2D plane strain problem, the solution time using the SCA is 1948 minutes using 64 clusters compared with an estimated 295 days required for a DNS calculation. For a 3D problem, the SCA solution time is 56 hours, compared with an estimated $1\times10^5$ days using the DNS.

Clustering of the Strain Concentration Tensor

For a 2-dimensional model, the strain concentration tensor $A(x)$ in each material point has 9 independent components. The format of the raw data for a 2D material is shown in Table 4-8.

TABLE 4-8

Format of the raw data for a 2D material

| Data-Index | $A_{11}$ | $A_{22}$ | $A_{33}$ | $A_{12}$ | $A_{21}$ | $A_{23}$ | $A_{32}$ | $A_{13}$ | $A_{31}$ |
|---|---|---|---|---|---|---|---|---|---|
| 1 | — | — | — | — | — | — | — | — | — |
| 2 | — | — | — | — | — | — | — | — | — |
| . | . | . | . | . | . | . | . | . | . |
| . | . | . | . | . | . | . | . | . | . |
| . | . | . | . | . | . | . | . | . | . |
| N | — | — | — | — | — | — | — | — | — | where N is the total number of discretization points in the DNS. For the 1200×1200 mesh used in the paper, N is equal to 1440000. For a 3-dimensional model, $A(x)$ has 36 independent components.

The next step is to perform the domain decomposition by grouping similar data points using k-means clustering. Mathematically, given a set of strain concentration tensors, the objective of k-means clustering is to minimize the within-cluster least squares sum for the k sets $S=\{S^1, S^2, \ldots, S^k\}$ to obtain the shape of the clusters:

$$S = \underset{S'}{\operatorname{argmin}} \sum_{j=1}^k \sum_{n \in S^j} \|A_n - A_J\|^2, \qquad (4\text{-}72)$$

where $A_n$ is the strain concentration tensor of the n-th data point, and $A_J$ is the mean of all the strain concentration tensors at the points within the cluster $S_J$. The above norm is defined as usual, e.g., for a general second-order matrix Z of dimension m×m $$\|Z\| = \sqrt{\sum_{i=1}^m \sum_{j=1}^m z_{ij}^2} = \sqrt{\operatorname{trace}(Z^T Z)}, \qquad (4\text{-}73)$$

and is called the Frobenius norm of matrix Z. In this exemplary example, the standard algorithm is used to solve the k-means clustering problem, which is essentially an optimization process minimizing the sum in Eq. (4-72).

At the initialization step, k data points are randomly selected from the data set and served as the initial means. The algorithm then iterates between the following two steps, 1. Assignment step: Each data point is assigned to the cluster whose mean is nearest to the data point. In other words, within the t-th iteration, $\forall\{A_n\} \in S_I^{(t)}$ $$\|\{A_n\} - A_I^{(t)}\|^2 \leq \|\{A_n\} - A_J^{(t)}\|^2 \forall J, J \neq I \qquad (4\text{-}74)$$

2. Update step: The mean values of the data points in the new cluster are recalculated for iteration t+1, $$A_I^{(t)} = \frac{1}{N_I^{(t)}} \sum_{\{A_n\} \in S_I^{(t)}} \{A_n\}, \qquad (4\text{-}75)$$

where $N_I^{(t)}$ is the number of data points in cluster $S_I^{(t)}$.

When the assignment of data points no longer changes, the algorithm is said to converge to a local optimum. Finally, it should be noted that other clustering methods can also be applied for this problem, such as the density-based spatial clustering of applications with noise (DBSCAN) method.

Computing the Interaction Tensor

In the discretized/reduced Lippmann-Schwinger equation, the piecewise uniform assumption can be utilized to extract the interaction tensor $D^{IJ}$, which represents the influence of the stress in the J-th cluster on the strain in the I-th cluster. In a periodic RVE domain $\Omega$, the interaction tensor can be written as a convolution of the Green's function and the characteristic functions, $$D^{IJ} = \frac{1}{c^I |\Omega|} \int_\Omega \int_\Omega \chi^I(x) \chi^J(x') \Phi^0(x, x') dx' dx, \qquad (4\text{-}76)$$

where $c^I$ is the volume fraction of the I-th cluster and $|\Omega|$ is the volume of the RVE domain. $\Phi^0(x, x')$ is the fourth-order periodic Green's function associated with an isotropic linear elastic reference material and its stiffness tensor is $C^0$. This reference material is introduced in the online stage as a homogeneous media to formulate the Lippmann-Schwinger integral equation. With the periodicity of the RVE, $\Phi^0(x, x')$ takes a simple form for isotropic materials in the Fourier space, $$\hat{\Phi}^0(\xi) = \frac{1}{4\mu^0}\hat{\Phi}^1(\xi) + \frac{\lambda^0 + \mu^0}{\mu^0(\lambda^0 + 2\mu^0)}\hat{\Phi}^2(\xi), \text{ with} \tag{4-77}$$

$$\hat{\Phi}^1_{ijkl}(\xi) = \frac{1}{|\xi|^2}(\delta_{ik}\xi_j\xi_l + \delta_{il}\xi_j\xi_k + \delta_{jl}\xi_i\xi_k + \delta_{jk}\xi_i\xi_l) \tag{4-78}$$

$$\hat{\Phi}^2_{ijkl}(\xi) = -\frac{\xi_i\xi_j\xi_k\xi_l}{|\xi|^4}, \tag{4-79}$$

where $\xi$ is the coordinate in Fourier space corresponding to x in real space, and $\delta_{ij}$ is the Kronecker delta function. $\lambda^0$ and $\mu^0$ are Lamé constants of the reference material. The expression of $\hat{\Phi}_{ijkl}^0(\xi)$ is not well defined at frequency point $\xi=0$. However, imposing by the boundary conditions for deriving the Green's function, a uniformly distributed polarization stress field will not induce any strain field inside the RVE, which indicates $$\hat{\Phi}_{ijkl}^0(\xi=0)=0. \tag{4-80}$$

Based on Eq. (77), the convolution term in the spatial domain in Eq. (4-76) can be translated into a direct multiplication at each point $\xi$ in the frequency domain using a Fourier transformation, $$\bar{\Phi}_j^0(x)=\int_\Omega \chi'(x')\Phi^0(x,x')dx'=\mathcal{F}^{-1}(\hat{\chi}(\xi)\hat{\Phi}^0(\xi)). \tag{4-81}$$

It can see from Eq. (4-78) and (4-79) that $\hat{\Phi}^0(\xi)$ and $\hat{\Phi}^2(\xi)$ are independent of the material properties, meaning that they can be computed one time only in the offline stage. If the reference material is changed in the self-consistent scheme at the online stage, only the coefficients relating to its Lamé constants in Eq. (4-77) need to be updated.

Newton'S Iteration in the Online Stage

In the implicit scheme, the residual $\{r\}=\{r^1; \dots, r^k; r^{k+1}\}$ is linearized with respect to $\{\Delta\varepsilon\}$. Dropping terms of higher order than linear gives $$\{r\} + \{M\}\{d\varepsilon\} = 0 \text{ with } \{M\} = \frac{\partial\{r\}}{\partial\{\Delta\varepsilon\}}, \tag{4-82}$$

where $\{M\}$ is called the system Jacobian matrix. For I,J=1, 2, . . . , k, $$M^{IJ}=\delta_{IJ}+D^{IJ}:(C_{alg}{}^J-C^0) \text{ and } M^{I(k+1)}=-I, \tag{4-83}$$

where $\delta_{IJ}$ is the Kronecker delta in terms of indices I and J, and I is the fourth-order identity tensor. $C_{alg}{}^J$ is the so-called algorithmic stiffness tensor of the material in the J-th cluster and is an output of the local constitutive law for the current strain increment in that cluster $\Delta\varepsilon_n{}^J$, $$C_{alg}^J = \frac{\partial\Delta\sigma^J}{\partial\Delta\varepsilon^J}, \tag{4-84}$$

Although local material damage is decoupled with the equilibrium condition to avoid material instability in this paper, it is still possible to introduce the damage into the local constitutive law and $C_{alg}{}^J$ can be written as $$C_{alg}^J = (1-d^J)\frac{\partial\Delta\sigma_{ud}^J}{\partial\Delta\varepsilon^J}, \tag{4-85}$$

where $\partial\Delta\sigma_{ud}{}^J/\partial\Delta\varepsilon^J$ represents the algorithmic stiffness tensor of the undamaged pure elasto-plastic material. Under the macro-strain constraint, the remaining components in the system Jacobian matrix are $$M^{(k+1)I}=c^I \text{ and } M^{(k+1)(k+1)}=0. \tag{4-86}$$

For macro-stress constraint, $$M^{(k+1)I}=c^I C_{alg}{}^I \text{ and } M^{(k+1)(k+1)}=0. \tag{4-87}$$

Finally, the correction of the incremental strain can be expressed as $$\{d\varepsilon\}=-\{M\}^{-1}\{r\}. \tag{4-88}$$

Based on the updated incremental strain, the constitutive relationship in each cluster can then be used to compute the new incremental stress $\{\Delta\sigma\}=\{\Delta\sigma^1; \dots; \Delta\sigma^k\}$. If $\Delta\sigma^I$ and $\Delta\varepsilon^I$ have a nonlinear relation, several iterations are needed so that the residual $\{r\}$ can vanish.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A computer implemented system for integrated process-structure-property modeling for design optimization and/or performance prediction of a material system, comprising:
   one or more processors;
   a non-transitory computer readable memory storing executable instructions; and
   a database communicatively coupled to the one or more processors,
   wherein execution of the instructions by the one or more processors causes the computer implemented system to perform operations comprising:
   executing a powder spreading model using a discrete element method (DEM) to generate a representation of a powder bed corresponding to a physical additive manufacturing process, the representation being stored in the database as a stereolithography (STL) or voxel surface-mesh file;
   executing a thermal-fluid flow model using the STL or voxel file to simulate a powder melting process to predict voids and temperature profile in each volume of interest, and write information of the voids and the temperature profile to the database in a flat file format;
   executing a cellular automaton (CA) model that retrieves the information of the voids and the temperature profile from the database to simulate grain growth of grains based on the temperature profile, and store grain growth information in the database; and
   executing a reduced-order micromechanics model that retrieves the grain growth and voids information from the database to predict mechanical properties and fatigue resistance of resultant structures by resolving the voids and grains, wherein the models are coupled through the database such that output data of one model automatically serves as input data for a subsequent model, thereby establishing a sequentially coupled simulation of the physical additive manufacturing process; and wherein the computer implemented system outputs material-performance metrics and optimized process parameters that provide a technical improvement in computer implemented simulation accuracy, computational efficiency, and additive manufacturing process design.

2. The system of claim 1, wherein in the CA model, a material region is discretized by a set of cubic cells, and wherein a temperature history of each cell is determined from a thermal-CFD simulation using a linear interpolation.

3. The system of claim 1, wherein each model incorporates basic material information and data provided directly from previous models in the computer implemented system to predict a mechanical response and estimated fatigue life of critical microstructures given machine-relevant processing conditions.

4. The system of claim 1, wherein the database records field data including spatial coordinates, temperature, phase, orientation, and stress or strain tensors for each voxel of a modeled region.

5. The system of claim 1, wherein the powder spreading model represents powder particles as spheres having diameters following a Gaussian distribution and computes particle interactions using user-defined friction and restitution coefficients.

6. The system of claim 1, wherein the CA model applies a heterogeneous nucleation model and a dendrite tip growth algorithm to simulate the grain growth during solidification.

7. The system of claim 1, wherein the reduced-order micromechanics model comprises a self-consistent-clustering-analysis (SCA) engine.

8. The system of claim 1, wherein execution of the instructions by the one or more processors causes the computer implemented system to perform operations further comprising: a fatigue-life prediction module that computes a fatigue-indicating parameter (FIP) from a plastic shear strain field produced by the micromechanics model to estimate crack-initiation or incubation life of the material system.

9. The system of claim 1, wherein the sequential coupling of the models reduces total simulation time relative to direct numerical simulation by at least an order of magnitude.

10. The system of claim 1, wherein the computer implemented system is implemented as an environment for selective electron beam or laser powder bed additive manufacturing of a metallic material.

* * * * *